US008145545B2

(12) United States Patent
Rathod et al.

(10) Patent No.: US 8,145,545 B2
(45) Date of Patent: Mar. 27, 2012

(54) METHOD OF ENABLING A USER TO DRAW A COMPONENT PART AS INPUT FOR SEARCHING COMPONENT PARTS IN A DATABASE

(76) Inventors: Nainesh B Rathod, West Lafayette, IN (US); Jamie Tan, West Lafayette, IN (US); Karthik Ramani, West Lafayette, IN (US)

( * ) Notice: Subject to any disclaimer, the term of this patent is extended or adjusted under 35 U.S.C. 154(b) by 106 days.

(21) Appl. No.: 12/528,230

(22) PCT Filed: Feb. 23, 2007

(86) PCT No.: PCT/US2007/062734
§ 371 (c)(1),
(2), (4) Date: Aug. 21, 2009

(87) PCT Pub. No.: WO2007/101114
PCT Pub. Date: Sep. 7, 2007

(65) Prior Publication Data
US 2010/0100457 A1 Apr. 22, 2010

Related U.S. Application Data

(60) Provisional application No. 60/776,061, filed on Feb. 23, 2006.

(51) Int. Cl.
*G06Q 30/00* (2012.01)
*G06F 17/30* (2006.01)

(52) U.S. Cl. ............. 705/27.1; 705/26.63; 705/26.61; 705/26.1

(58) Field of Classification Search ......... 705/26.1–27.2
See application file for complete search history.

(56) References Cited

U.S. PATENT DOCUMENTS

| 5,701,403 A | 12/1997 | Watanabe et al. |
| 6,704,466 B1 * | 3/2004 | Yamamoto et al. ......... 382/305 |
| 6,865,570 B2 | 3/2005 | Silverbrook et al. |
| 2004/0143516 A1 * | 7/2004 | Hastie et al. .................. 705/27 |
| 2004/0177009 A1 * | 9/2004 | Schrenk ........................ 705/27 |

OTHER PUBLICATIONS

"Web tools, fresh to your desktop. (Engineering News)." Design News. Dec. 16, 2002. vol. 57, No. 24, p. 19 (1) [recovered from Dialog on Jan. 18, 2012].*

* cited by examiner

*Primary Examiner* — Jeffrey A Smith
*Assistant Examiner* — Kathleen G Palavecino
(74) *Attorney, Agent, or Firm* — Taft Stettinius & Hollister LLP; Keith Swedo, Esq.

(57) ABSTRACT

A method of receiving input image data for an image search engine includes providing a two-dimensional input image on a display screen, enabling a user to rotate the input image on the display screen about an axis that is non-perpendicular to a plane of the input image, and enabling the user to electronically draw modifications on the rotated input image.

20 Claims, 76 Drawing Sheets

FIG. 3

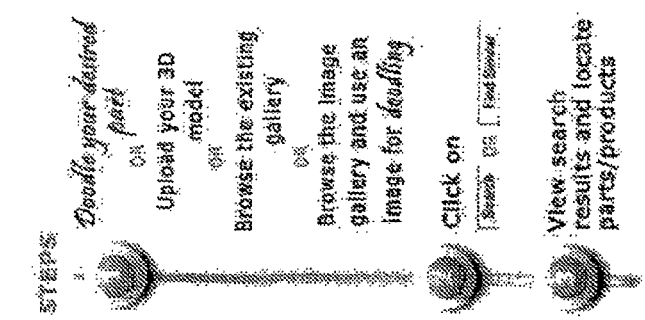
FIG. 14e

FIG. 14f

DOODLE TIPS

About 3DSeek

Important: 3D-Seek.com requires Internet Explorer browser.

Tips

You have doodled in the canvas; however, your results are not very good

Here are some tips to improve your search results using the Doodling feature

1. Doodling is performed by:
   - Drawing with your mouse. If you are one of those lucky ones with a pen device, then your doodling is actually very accurate. You can Doodle something directly onto the canvas provided (grid window)

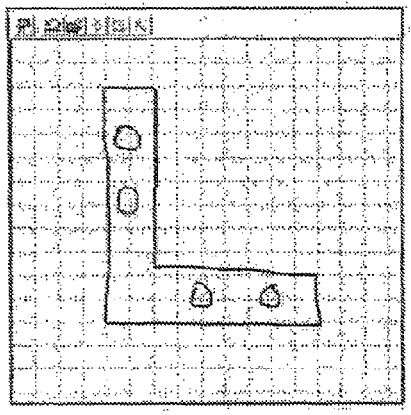

FIG. 16a

- Trace over an image from the image gallery or upload your own image into the canvas by clicking on the [icon] icon located in the upper bar of the doodle box or by tracing on a 3D model inside the 3D model.

- Trace over a 3D model from the existing gallery or upload your own 3D model by clicking on the [Browse...] button in the "Using your part" page. Once the 3D model is displayed, rotate to the desired position and then click on [6] icon to begin doodling

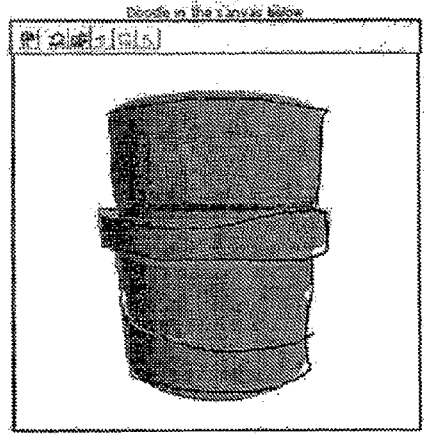

FIG. 16b

2. The more details that you provide, the better the chances of finding what you have Doodled. So, if you are unhappy with your results you desire by drawing in a single canvas view, improve your results by doodling in multiple views. This is done by clicking on the icon - [ ], which is located in the upper bar of the doodling window. This will help you refine your search further.

3. When Doodling by tracing on a 3D model (from the existing gallery or one you've uploaded), or tracing an image (from the Image Gallery or one you've uploaded), it is important to Doodle inner as well as outer features (edges) of the part to optimize your search.

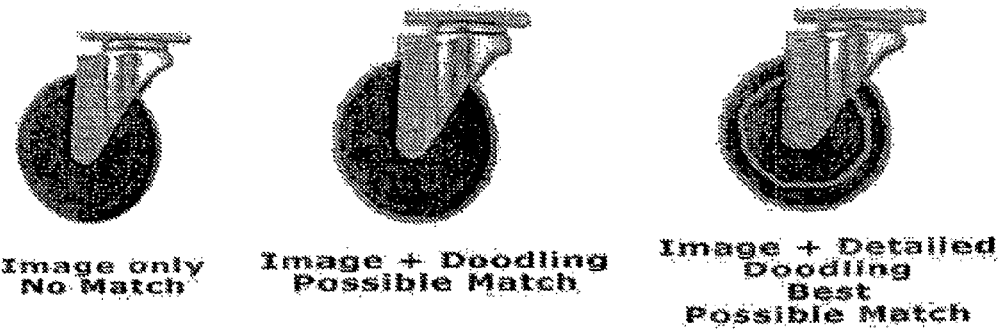
4. To get the best results, trace the Orthogonal view of the part you are searching for as opposed to the Perspective or Isometric view of the part.
ie.
Good:
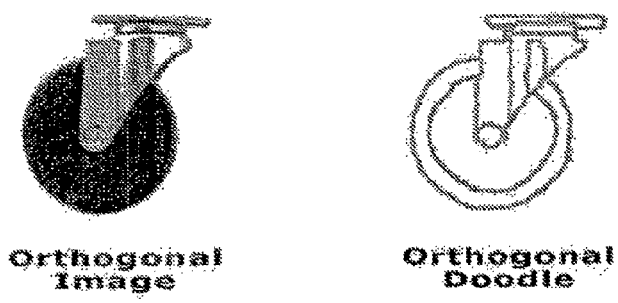
Bad:
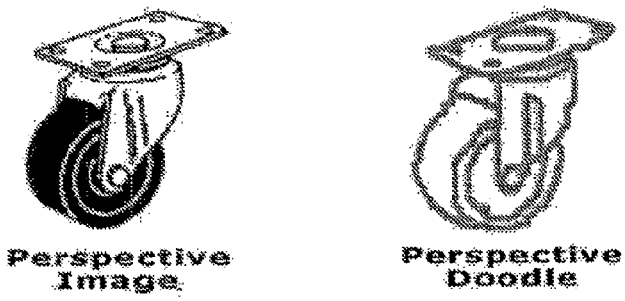
5. In certain instances only a perspective view is available for tracing, so doodle only a side view of the image as shown below.
FIG. 16c

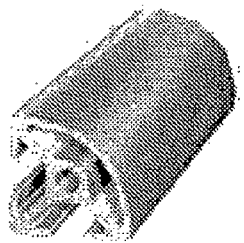
Perspective Image
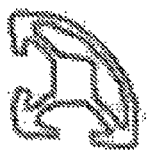
Doodle on one side (profile)
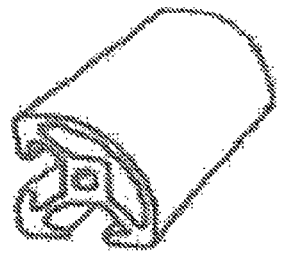
Perspective Doodle
About Imaginestics   Other Imaginestics Products   Give us feedback
©2006 Imaginestics, LLC  Privacy Policy
FIG. 16d

HOW TO ADD MY PARTS/PRODUCTS? — 196

Firm Directory Printout

I have electronic part files  I do not have electronic part files

Step 1. Download and Install i-prowler

Click here to Download Now — 180

It's free and it only takes a few seconds to install

About i-prowler — 182

Frequently Asked Questions about i-prowler — 184

Step 2. Run i-prowler and Register your company information

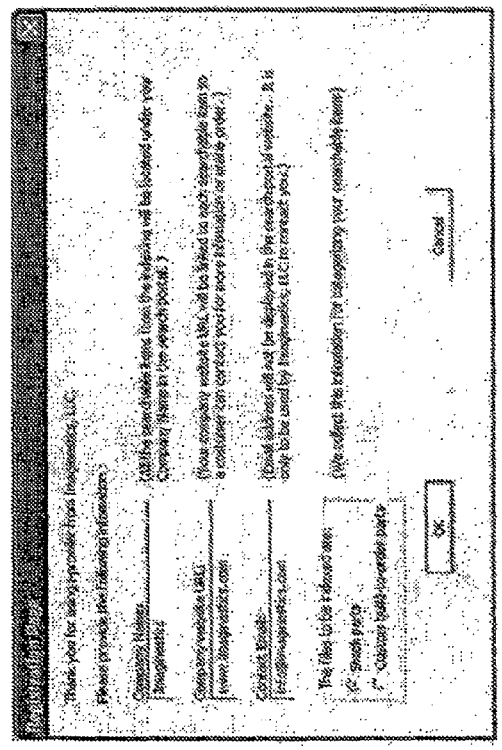

I have 3D models, 2D drawings, images and PDF documents

Index your files using i-prowler software

I wish to upload parts directly — 188

I wish to add my company's URL to 3DSeek's Index — 195

I wish to convert 2D drawings to 3D models for indexing — 202

I have 2D catalog, and would like to create an interactive 3D web catalog — 204

FIG. 17a

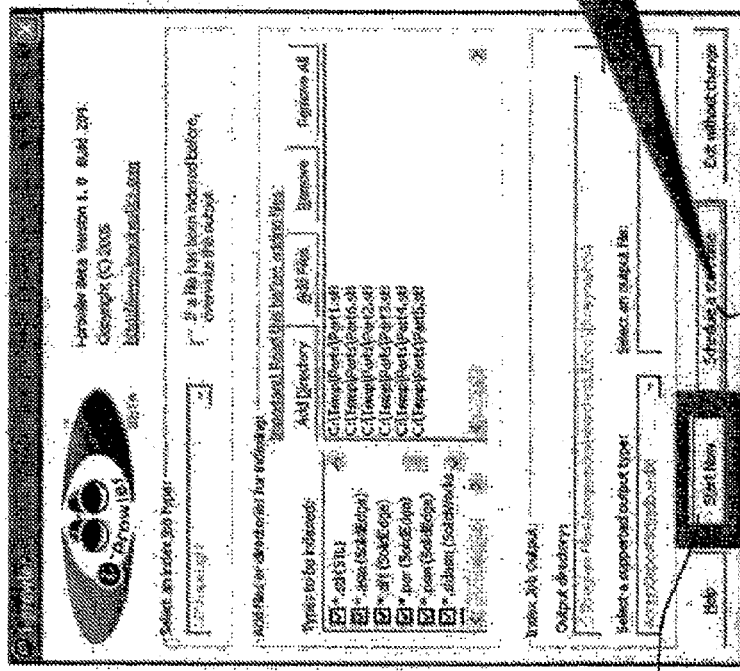
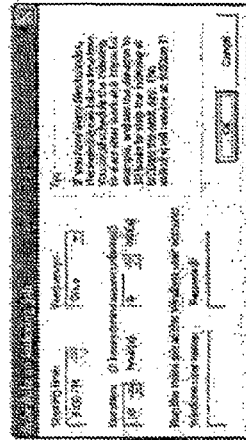

FIG. 17c

Important: V-prowler is smart indexing software that allows you to index your 3D models, 2D Drawings, Images or PDF documents from your company's network in a safe and secure manner. The indexer extracts a shape representation of your 3D model, which does not contain any proprietary 3D information. The shape representation is literally ones and zeros, which are used for comparison by the 3D shape search engine and to enable a viewable 3D image. The person using the 3D-Seek.com site has no way to download any 3D part information from the site. The indexer compresses and copies the shape representations, drawing files, images and PDF documents to the 3D-Seek.com site and extracts the 2D Views from the drawings. The 2D Views are then used for comparison by the 3D shape search engine. The person using the 3D-Seek.com site has no way to download the 3D models, 2D Drawings, Images of PDF documents, unless you give 3DSeek permission.

About Imaginestics   Other Imaginestics Products   Give us feedback

©2006 Imaginestics, LLC   Privacy Policy

Firm Directory Printout

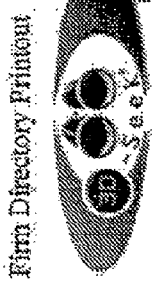

ABOUT I-PROWLER i-prowler is innovative software that puts your products at your buyers' fingertips. i-prowler is smart indexing software that allows you to index your 3D models from your company in a safe and secure manner. The indexer extracts a shape representation of your 3D model, which does not contain any proprietary 3D information. The shape representation is literally ones and zeros, which are used for comparison by the 3D shape search engine and to enable a viewable 3D image. The person using the 3D-Seek.com site has no way to download any 3D part information from the site. After the indexer extracts a shape representation, the compressed file is automatically uploaded to the 3D-Seek portal. The 3D shape representation is then used by potential customers over the web using 3D-Seek.com to find your products using a similar part or 3D-Seek's part gallery. We plan to expand the search capabilities to include "Search using drawing" and "Search by doodling."

By using shape as an input, 3D-Seek.com takes the search for products to the next level in terms of speed and accuracy by overcoming the limitations of text-based searches and database queries that are contextual in nature. Since shape is the lowest common denominator for any part/product, the shape search engine is not hampered by traditional text-based search engines and can successfully address the challenges posed by variations in specifications of products available from suppliers across the globe. Thus using the 3D-Seek.com, designers, engineers, and other technical buyers can accurately and quickly locate your product early in the product development stage, enabling your products to compete on capability rather than on price later in the procurement stage.

About Imaginestics    Other Imaginestics Products    Give us feedback

©2006 Imaginestics, LLC    Privacy Policy

FIG. 18

Firm Directory Printout

FIG. 19a

HOW TO ADD MY PARTS/PRODUCTS?

Frequently Asked Questions

*How do I add my parts to your database of 3D parts?*
After you download and install the i-prowler software, the i-prowler indexer will guide you through the process of identifying directories or files which contain 3D models of the parts you want to index and include in the 3D-Seek.com database and make available for search. Please note that the parts you select should be non-proprietary in nature. You have the flexibility to run the indexer instantly or schedule the index to run at a certain time. — 186

*Are my product designs protected?*
You can review our privacy policy for full detail. The i-prowler indexing process extracts only a shape representation of the 3D model of your part, however, we do copy the drawing file to the 3D-Seek.com database. The key design related proprietary information from the 3D model is not extracted. Imaginestics maintains only the basic information needed to conduct shape match. During the transmission of your files to the server, the files are compressed and encrypted. In addition, we do not allow the user to download any 3D or 2D data from the 3D-Seek site.

*What are the system requirements for i-prowler?*
System Requirements:
Microsoft Windows 2000/XP
Minimum    PC with 300+ MHz processor
            128MB+ RAM
            50 MB+ available hard disk space
CAD application -- Latest version of Solid Edge. If Solid Edge, IGES and STEP files are being indexed.

*My company makes custom parts, how can I benefit from using i-prowler?*
Often buyers are searching for service providers based on their capability. Representative parts are the best way to showcase your capability. So, using i-prowler, you can index the representative 3D parts from your company's database and allow your potential customer's to find you based on your previous designs.

*After I index with i-prowler, when will my parts be available for search?*
Imaginestics reviews all parts submitted to the 3D-Seek portal to maintain quality and integrity. Consequently, your parts will appear in the 3D-Seek portal 24 hours after they are indexed by the i-prowler indexer.

*What file formats does i-prowler recognize for indexing?*
Currently, i-prowler works with the following industry formats -- IGES (*.igs, *.iges), STEP (*.stp, *.step), Stereo lithography (*.stl), Solid Edge (*.asm, *.par), SolidWorks (*.sldasm, *.sldprt) files, AutoCAD (*.dwg, *.dxf) files and Adobe Acrobat (*.pdf). In the near future, i-prowler will support file formats from CAD systems such as NX, Pro/ENGINEER, and Inventor.

*How do I update parts that are currently in the database?*
The i-prowler software has the "overwrite existing files of the same name" feature. Simply run i-prowler on the updated parts files and make sure the "overwrite" box is checked.

Wednesday, February 08, 2006

Firm Directory Printout

What if I don't have 3D models of my parts?
Imaginestics offers several options:

- If you are a standard part manufacturer, then we have a list of parts that you can select from.
- If you are a custom part manufacturer, then we have a list of parts that you can select from
- If you have 2D catalog and would like to create an interactive 3D web catalog, then you can Contact Us for a quote.

For more information on any of the above you can go to "I do not have a 3D model".

About Imaginestics   Other Imaginestics Products   Give us Feedback

©2006 Imaginestics, LLC   Privacy Policy

FIG. 19b

Firm Directory Printout

FIG. 20a    PRIVACY POLICY

Last Updated: September 18th, 2005

Your privacy is important to Imaginestics. This statement discloses the information practices for Imaginestics site, including what type of information is gathered and tracked, how the information is used, and with whom the information is shared.

Personal Information
In general, you can visit 3D-Seek.com site on the Internet without telling us who you are and without giving any personal information about yourself. There are times, however, when we may need information from you. You may choose to give us personal information in a variety of situations. For example, you may want to give us information, such as your name and address or e-mail, to correspond with you, to process an order, place advertisement or to provide you with a subscription. You may give us your credit card details to buy something from us. We intend to let you know how we will use such information before we collect it from you; if you tell us that you do not want us to use this information to make further contact with you beyond fulfilling your requests, we will respect your wishes. If you give us personal information about somebody else, such as a work colleague, we will assume that you have his or her permission to do so.

Using and Sharing Personal Information
The following paragraphs describe in more detail how Imaginestics may use your personal information and with whom we may share it.

*Fulfilling your transaction request*
If you request something from 3D-Seek.com site, for example, a product or service, a callback, or specific marketing materials, we will use the information you provide to fulfill your request. To help us do this, we may share information, with others, for instance, employees of Imaginestics, Imaginestics' Business Partners, financial institutions, shipping companies, postal or government authorities (for example, Customs authorities) involved in fulfillment. In connection with a transaction, we may also contact you as part of our customer satisfaction surveys or for market research purposes.

*Marketing Use*
Imaginestics may also use the information you provide to Imaginestics for marketing purposes. Before we use it, however, we will offer you the opportunity to choose whether or not to have your information used in this way.

*Information for Business Partners*
If you represent an Imaginestics Business Partner, you may visit 3D-Seek.com pages/sites intended specifically for Imaginestics Business Partners. We may use information provided on that site to administer and develop our business relationship with you, the Business Partner you represent, and Imaginestics Business Partners generally. For instance, this may involve using your information to send you details of Imaginestics' Business Partner programs. It may also include sharing certain information with other Business Partners (subject to any confidentiality obligations that may exist), or 3D-Seek.com customers or prospects. In connection with a particular transaction or program, we may also contact you as part of customer satisfaction surveys or for market research purposes.

*Information Security and Quality*
We intend to protect your personal and corporate information and to maintain its quality. We implement appropriate measures and processes, such as using encryption when transmitting certain sensitive information, to help us to keep your information secure and to maintain its quality.

Firm Directory Printout

FIG. 20b

Cookies, Web Beacons, and Other Technologies
We sometimes collect non-identifiable information from visitors to our site to help us provide better customer service. For example, we keep track of the domains from which people visit, and we also measure visitor activity on the 3D-Seek.com site, but we do so in ways that keep the information non-identifiable. This information is sometimes known as "clickstream data." Imaginestics or others on Imaginestics' behalf, may use this data to analyze trends and statistics and to help us provide better customer service.

Also, when we collect personal data from you in a transaction, we may extract some information about that transaction in a non-identifiable format and combine it with other non-identifiable information such as clickstream data. This information is used and analyzed only at an aggregate level to help us understand trends and patterns. This information is not reviewed at an individual level. If you do not want your transaction details used in this manner, you can disable your cookies.

We collect the information we mentioned in the previous paragraphs through the use of various technologies, including "cookies". A cookie is a piece of data that a site can send to your browser, which may then be stored on your computer as an anonymous tag that identifies your computer but not you. Some Imaginestics web pages use cookies, sent by Imaginestics or its third party vendors, or other technologies to better serve you when you return to the site. You can set your browser to notify you before you receive a cookie, giving you the chance to decide whether to accept it. You can also set your browser to turn off cookies. If you do so, however, some sites may not work properly.

3D-Seek.com site may also use Web beacon or other technologies to provide better customer service. These technologies may be in use on a number of pages across Imaginestics' site. When a visitor accesses these pages, a non-identifiable notice of that visit is generated which may be processed by us. These Web beacons usually work in conjunction with cookies. If you don't want your cookie information to be associated with your visits to these pages, you can set your browser to turn off cookies. If you turn off cookies, Web beacon and other technologies will still detect visits to these pages, but the notices they generate cannot be associated with other non-identifiable cookie information and are disregarded.

Service Quality Monitoring
Certain Web transactions may also involve you calling us or our calling you. Please be aware that it is Imaginestics' general practice to monitor and in some cases record such calls for staff training or quality assurance purposes.

Disclosures Required By Law
Please be aware that in certain circumstances, it is possible that personal or corporate information may be subject to disclosure pursuant to judicial or other government subpoenas, warrants, or orders.

Links to Non-Imaginestics Web Sites
3D-Seek site contain links to other Web sites. Imaginestics is not responsible for the privacy practices or the content of those other Web sites.

Privacy Questions & Access
If you have a question about this statement, you can send an email to the Imaginestics Web site coordinator. The address for this is webmaster@imaginestics.com . You can also contact us at this address if you have a question about Imaginestics' handling of your information.

If you wish to obtain a copy of particular information you provided to Imaginestics, or if you become aware the information is incorrect and you would like us to correct it, contact us at webmaster@imaginestics.com Before Imaginestics is able to provide you with any information or correct any inaccuracies, however, we may ask you to verify your identity and to Firm Directory Printout provide other details to help us to respond to your request. We will endeavor to respond within an appropriate timeframe.

If you have questions or concerns regarding the site's privacy statement, you should first contact Imaginestics directly. If you do not receive acknowledgment of your inquiry or your inquiry has not been satisfactorily addressed, you should then contact TRUSTe online at http://www.truste.org/users/users_watchdog.html. TRUSTe will then serve as a liaison with the site to resolve your concerns.

This site is maintained by Imaginestics, LLC.

About Imaginestics   Other Imaginestics Products   Give us feedback

© 2006 Imaginestics, LLC   Privacy Policy

FIG. 20c

Firm Directory Printout

HOW TO ADD MY PARTS/PRODUCTS?

I have electronic part files  I do not have electronic part files

Option 1
Sign-up for your company's own Part Bin ~ 189
     ↙ 191
About Part Bin
Frequently Asked Questions about Part Bin ~ 193

OR.

Option 2
Send us an e-mail at setuppartbin@imaginestics.com

I have 3D models, 2D drawings, images and PDF documents

Index your files using i-prowler software

I wish to upload parts directly

I wish to add my company's URL to 3DSeek's index

I wish to convert 2D drawings to 3D models for indexing

I have 2D catalog and would like to create an interactive 3D web catalog

About Imaginestics   Other Imaginestics Products   Give us feedback
©2006 Imaginestics, LLC  Privacy Policy

FIG. 21

Firm Directory Printout

HOW TO ADD MY PARTS/PRODUCTS?

Part Bin is your company's personal area to upload your company's product information, such as 3D models, drawings, images, and documents. The information stored in this area will be indexed by 3DSeek's i-prowler software to enable search users on 3DSeek to locate your product and company. Think of your Part Bin as an extension of your company's website. You can also setup a link to the Part Bin directly from your company's website. 3DSeek's Part Bin is completely free and it offers several benefits to your company.

About Imaginestics   Other Imaginestics Products   Give us feedback

©2006 Imaginestics, LLC  Privacy Policy

FIG. 23

Firm Directory Printout

HELP CENTER

Part Bin Background

Once you have logged into 3DSeek@'s Part Bin area successfully as an Administrator, you have the ability to customize your company's Part Bin. Part Bin is your company's personal area to upload your company's product information, such as 3D models, drawings, images, and documents. The information stored in this area will be indexed by 3DSeek's i-prowler software to enable search users on 3DSeek to locate your product and company. Think of your Part Bin as an extension of your company's website. You can also setup a link to the Part Bin directly from your company's website. 3DSeek's Part Bin is completely free and it offers several benefits to your company. So, let's answer some questions regarding 3DSeek's Part Bin.

How do I set up my company's Part Bin?

If you have downloaded i-prowler from 3DSeek's "How to add my parts" area, then you have most probably received an e-mail notifying you that your Company's Part Bin area has been setup. If 3DSeek's i-crawler has indexed your company's website and you have made part models/drawings available for general download, then an e-mail was sent to someone in your company notifying them that your Company's Part area was setup and required activation by a company representative. If you have not received any e-mail from 3DSeek, then please send an e-mail to setuppartbin@imaginestics.com and you will receive an e-mail confirming your company's participation and subsequent e-mails with an administrator login/password.

How is my Company's Part Bin accessed by search user?

When a search user on 3DSeek conducts a search via several search inputs, he/she is presented with a list of search results. If your company's part/product is one of the search result candidate and you have granted 3DSeek permission to enable the search user to download your 3D model, 2D drawing or any other relevant document from the Part Bin area, then a Download Files link appears next to your part/product result as seen in figure below.

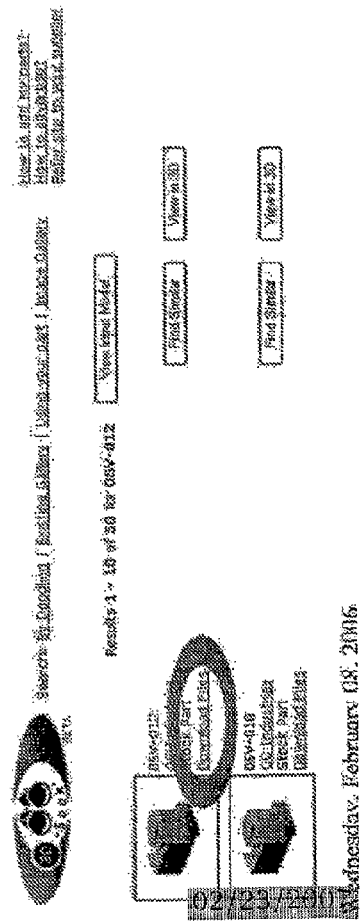

Fig. 24a

Firm Directory Printout

When the search user selects the Download Files link, he/she is directed to the sign-in page. You can also directly link to the sign-in page from your company's website using http://www.3d-seek.com/3DSeek/SignIn.aspx?companyName=YourCompanyName.

What does the Part Bin area look like?

The Part Bin area is split into five sections. *Top section* – Also known as the header has two fixed images, 3DSeek logo and the Part Bin Title. It also has an area for your Company's logo, which can be added in the Edit Profile window. *Title Bar* – This Bar is located right below the top section and consists of your Company Name, which can be added in the Edit Profile window. The Edit Profile button is located in this section and selection of this button invokes the Edit Profile window. *Left Section* – This section consist of your product/part tree. It uses a folder structure to maintain the products parent/child relationship. You can collapse or un- collapse the + or – button before the folders. A check box is seen next to the lowest level, which is part model/drawing/documentation, to allow the search user to download the file. Each folder in the left section can be customized by attaching an image or text description for the parts contained within the folder. This is done in the middle section. *Middle Section* – This section contains the Part Viewer window, but is also used to show the folder description in the left section. By selecting each folder, you can either associate a URL, image or enter a text description, which is shown in the area below the Part Viewer window. *Right Section* – This section contains company links that you may want to appear when a search user is in the Part Bin area. It enables you to provide your prospect or customer with specific product or company links. The links can be added/edited in the Edit Profile window.

Fig. 24b

Firm Directory Printout:

7. Link's Title, which is the title that appears at the top of the Right Section, where the company/product links are provided.
8. There are Ten Links that can be added in the Right Section by entering the Heading, Heading URL (link to the URL when the Heading is selected), description 1, description 2; each is limited to 30 characters and Company or Product URL.

How does the Part Bin appear to the search user?

The picture shown below is the main page of the Part Bin and as seen, when a user selects the model file in the Left Section, the Part Viewer Window in the Middle Section displays the model. The search user has the option of selecting the download button in the Middle Section for a single file or selecting multiple boxes in the Left section and clicking on the Download Selected button for multiple files. At the moment the multiple download files limit is set to five files.

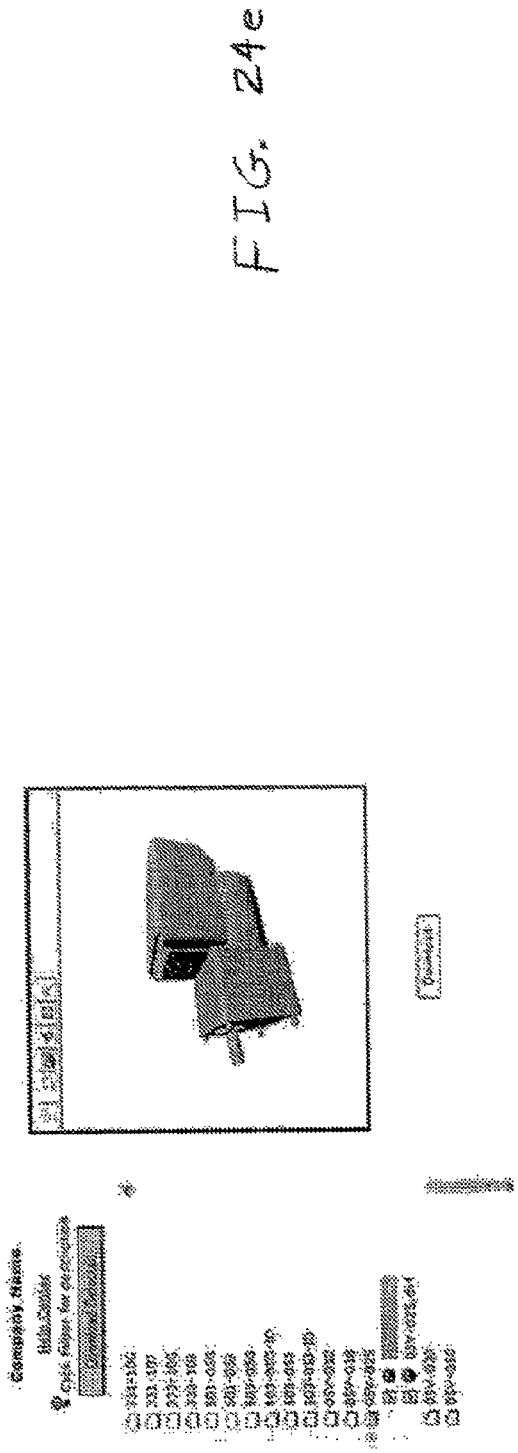

FIG. 24e

Firm Directory Printout

HOW TO ADD MY PARTS/PRODUCTS?

I have electronic part files  I do not have electronic part files

I have 3D models, 2D drawings, Images and PDF documents

We add and update new sites to our index each time we crawl the web, and we invite you to submit your URL here. We only index URLs of manufacturers producing discrete products. We do not add all submitted URLs to our index, and we cannot make any predictions or guarantees about when or if they will appear.

Index your files using i-crawler software

Please enter your full URL, including the http:// prefix. For example: http://www.3D-Seek.com/. You may also add comments that describe your products. These are used to help filter the search. When a broad shape base match has occurred. Once you have added your URL and i-crawler has indexed your URL, you will receive an e-mail with your personal Part Bin account information. You can then manage the information that 3D-Seek's i-crawler has indexed from your website.

I wish to upload parts directly

I wish to add my company's URL to 3DSeek's index

Company URL:
Contact E-mail:
Comments:

I wish to convert 2D drawings to 3D models for indexing

Submit — 197

I have 2D catalog and would like to create an interactive 3D web catalog

Important: Please provide the exact URL where part files are located. If there are multiple pages, please use semi-colon (;) to separate the URLs. 3DSeek updates its index on a regular basis, so updated or outdated link submissions are not necessary. Dead links will be removed from our index on our next crawl when we update our entire index.

About Imaginestics   Other Imaginestics Products   Give us feedback

©2006 Imaginestics, LLC  Privacy Policy

FIG. 25

Item Directory Printout

HOW TO ADD MY PARTS/PRODUCTS?

I have electronic part files. I do not have electronic part files

We will convert 2D drawings from DWG or DXF format to 3D solid models. There are two options to choose from:

Option A – The 2D drawings are converted to 3D solid models but they are not exact detailed conversion of your parts or products, but rather a 3D representation of the overall shape and contain some minor details that are extracted from the 2D drawings. The 3D solid model is then indexed by 3DSeek to enable your potential customer to locate your parts/products. The cost for this conversion is $10.00/drawing. The 3D solid model is also available for you to download.

Option B – The 2D drawings are converted to 3D solid models with all the details available in the drawing. The 3D solid model is then indexed by 3DSeek to enable your potential customer to locate your parts/products. The cost of this conversion is $30.00/drawing. The 3D solid model is also available for you to download.

Step 1. Enter company information and select option ~ 216

Step 2. Download and install i-prowler

It's free and it only takes a few seconds to install

About i-prowler

Frequently Asked Questions about i-prowler

Step 3. Run i-prowler and register your company information

I have 3D models, 2D drawings, Images and PDF documents

Index your files using i-prowler software

I wish to upload parts directly

I wish to add my company's URL to 3DSeek's index

I wish to convert 2D drawings to 3D models for indexing

I have 2D catalog and would like to create an interactive 3D web catalog

FIG. 26a

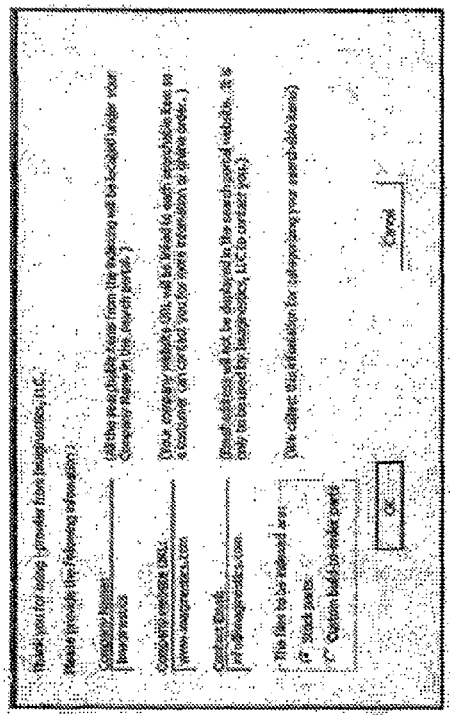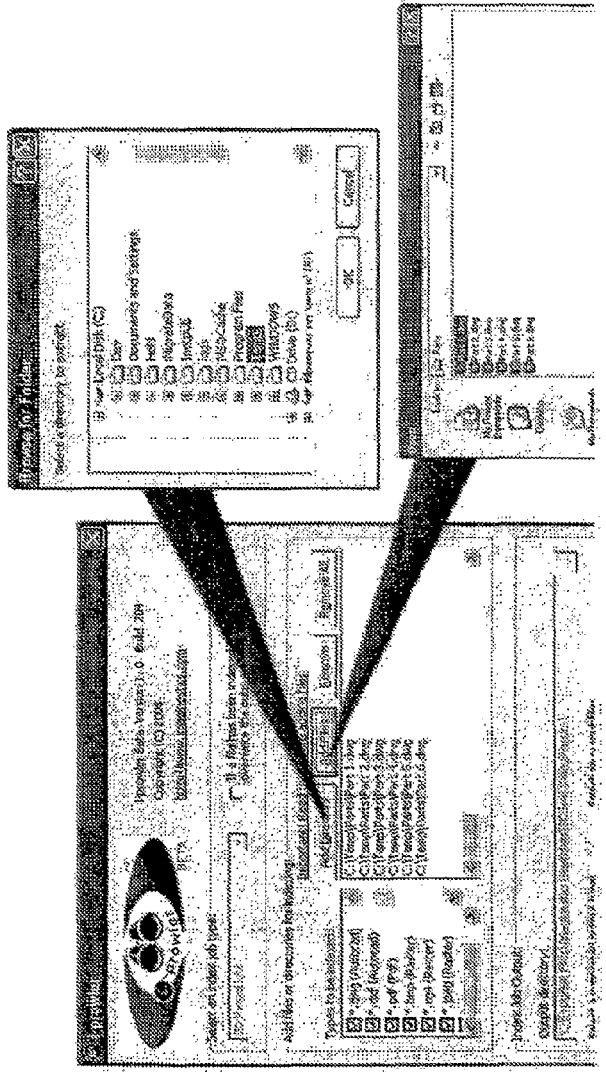
FIG. 26b

FIG. 27

Firm Directory Printout

HOW TO ADD MY PARTS/PRODUCTS?

Company Information

Name
Company
Address 1
Address 2                    Company WebSite
City
Country          State/Province         Zip Code
Phone
Email ○ Option A – The 2D drawings are converted to 3D solid models but they are not an exact detailed conversion of your parts or products, but rather a 3D representation of the overall shape and contain some minor details that are extracted from the 2D drawings. The 3D solid model is then indexed by 3DSeek to enable your potential customers to locate your parts/products. The cost for this conversion is $10.00/drawing. The 3D solid model is also available for you to download.

○ Option B – The 2D drawings are converted to 3D solid models with all the details available in the drawing. The 3D model is then indexed by 3DSeek to enable your potential customers to locate your parts/products. The cost of this conversion is $30.00/drawing. The 3D model is also available for you to download.

Submit —— 218

About Imaginestics   Other Imaginestics Products   Give us feedback

©2006 Imaginestics, LLC   Privacy Policy

Firm Directory Printout

HOW TO ADD MY PARTS/PRODUCTS?

I have electronic part files  I do not have electronic part files

I have 3D models, 2D drawings, images and PDF documents

We will create parametric 3D solid models of your parts/products to enable your customers/prospects to select and dynamically configure your product in 3D, while allowing them to download the configured 3D model to check for fit directly into their designs.

Index your files using i-prowler software

Please use j-prowler and upload your part/product information – 3D models, 2D drawings, or catalog images in PDF format, if available.

I wish to upload parts directly

View the pricing sheet for 3D-Config. —— 220
Contact Us for more information.

I wish to add my company's URL to 3DSeek's index

Step 1. Enter company information —— 222

I wish to convert 2D drawings to 3D models for indexing

Step 2. Download and install i-prowler

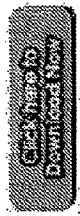

It's free and it only takes a few seconds to install

I have 2D catalog and would like to create an interactive 3D web catalog

About i-prowler

Frequently Asked Questions about i-prowler

Step 3. Run i-prowler and register your company information

FIG. 28a

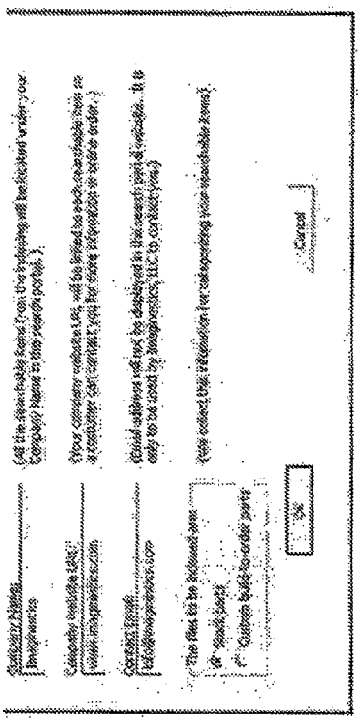
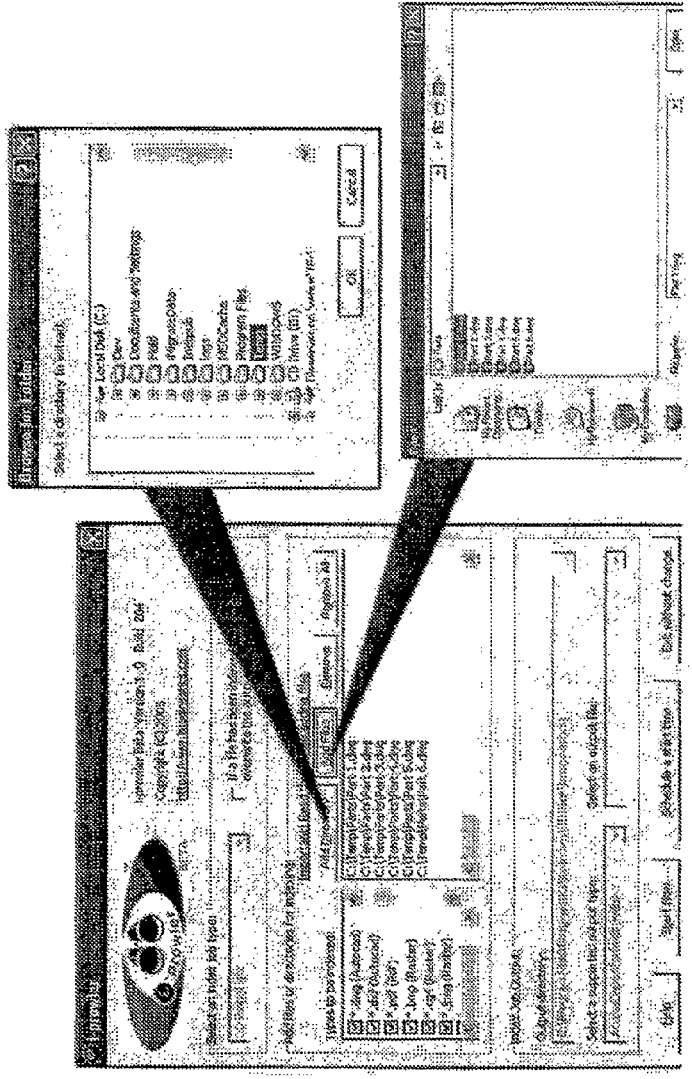
FIG. 28b

 -config    Engineer-to-Order

Pricing Sheet

| Setup (one time) | Price/ Product Line |
|---|---|
| No. of Product Lines <=5 | $1,000 |
| No. of product lines >5 | $500 |
| Setup for RFQ | $500 |

| Option 1: ClickConfig | |
|---|---|
| ClickConfig Plans | Price/ Plan Units |
| Silver | $300 |
| Per Configuration | $3 |
| Per Downloads | $6 |
| Gold | $500 |
| Per Configuration | $2.5 |
| Per Downloads | $5 |
| Platinum | $1,000 |
| Per Configuration | $2 |
| Per Downloads | $4 |

| 3DSeek Benefits Offered |
|---|
| Silver |
| 2 Month Free Sponsored Ads |
| Gold |
| 4 Month Free Sponsored Ads |
| Platinum |
| 6 Month Free Sponsored Ads |
| 2 Month Free Prime Sponsored Ads |

| Option 2: Monthly Subscription | Price/ Product Line/Month |
|---|---|
| Configuration | $500 |

| 3DSeek Benefits Offered |
|---|
| For subscription upto 5 product lines |
| 4 Month Free Sponsored Ads |
| For subscription to more than 5 product lines |
| 6 Month Free Sponsored Ads |
| 2 Month Free Prime Sponsored Ads |

FIG. 29

HOW TO ADD MY PARTS/PRODUCTS?

Firm Directory Printout

I have electronic part files. I do not have electronic part files

Step 1. Select parts from the standard parts list —— 212

Step 2. Enter company information

I am a standard part (fasteners) manufacturer and I wish to select parts from the list I am a custom part manufacturer and I wish to select parts from the list —— 213

Please have someone contact me to help me include my part/product information in 3DSeek About Imaginestics   Other Imaginestics Products   Give us feedback ©2006 Imaginestics, LLC   Privacy Policy

FIG. 31

HOW TO ADD MY PARTS/PRODUCTS?

Firm Directory Printout

Standard Parts List

(CATEGORY – PART TYPE, Size, Standard, Material)

- ☐ BOLTS
- ☐ CAP SCREWS
- ☐ MACHINE SCREWS
- ☐ NUTS
- ☐ PINS
- ☐ RIVETS
- ☐ SHOULDER SCREWS
- ☐ SET SCREWS
- ☐ SCREWS
- ☐ WASHERS
- ☐ RETAINING RINGS

Submit — 208

About Imaginestics  Other Imaginestics Products  Give us feedback

©2006 Imaginestics, LLC  Privacy Policy

Firm Directory Printout

HOW TO ADD MY PARTS/PRODUCTS?

I have electronic part files.  I do not have electronic part files

Step 1.  Select parts from the custom parts list —— 215

Step 2.  Enter company information

I am a standard part manufacturer and I wish to select parts from the list (fasteners)

I am a custom part manufacturer and I wish to select parts from the list

Please have someone contact me to help me include my part/product information in 3DSeek About Imaginestics.  Other Imaginestics Products.  Give us feedback.

©2006 Imaginestics, LLC  Privacy Policy

FIG. 33

HOW TO ADD MY PARTS/PRODUCTS?

Submit ~217

About Imaginestics   Other Imaginestics Products   Give us feedback

©2006 Imaginestics, LLC   Privacy Policy

Firm Directory Printout

Custom Parts List

(CATEGORY - PART TYPE)

☐ Forgings
☐ INJECTION MOLDING

Flash Directory Printout

HOW TO ADD MY ADVERTISEMENT?

Advertising on 3D-Seek.com allows you to connect with potential buyers at the exact time when they are looking for your products. For a low, fixed cost, you can be generating business in as little as 24 hours.

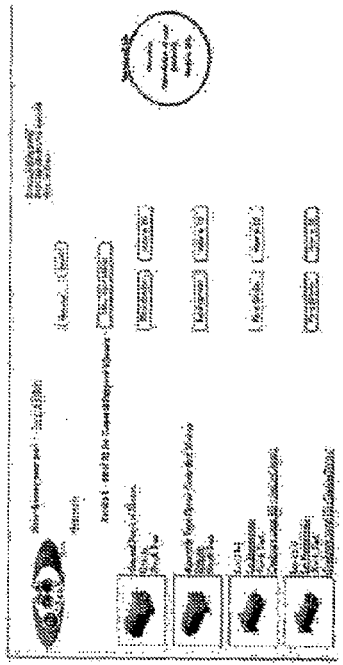

Market your products directly to purchasing agents, design engineers and technical buyers worldwide. Be there at the exact time they are looking for the type of products you provide.

To get started, you create simple three-line text ads and associate them with appropriate product categories. When someone searches on a part in your category, your ad is displayed on the results page. The user can simply click on your ad to go to your website or offer page and view your products.

Step-by-Step Instructions

Step 1: Enter Company name, Billing Address, Create your text ad (The text that will appear on the 3D-Seek.com search result page):

Sample Ad:

> Flow Control Valves
> Fifty years of experience
> Quick turnaround for custom needs
> www.wedoflowcontrol.com Headline: [max 25 characters]
Description Line 1: [max 30 characters]
Description Line 2: [max 30 characters]
Category: [max 15 characters]

FIG. 35a

Firm Directory Printout

Display URL: http://[max 30 characters]
Destination URL: http://[max 1024 characters]

Step 2: Advertising Plan
Special Introductory Plan - $99.00 -- Place ad associated with one category for two months (buy one month and get the other free)

Step 3: Order Now

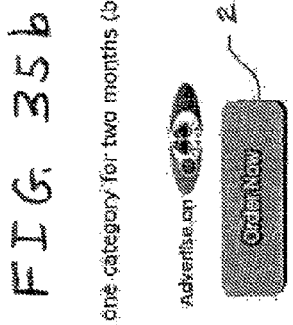
226

FIG. 35b

What do you want to do?

New -- I would like to create a new ad for another category
FAQs -- I have some questions about the program
Contact Us -- I need to contact you

New
Read the steps above and reselect the Order Now button

FAQs

Getting Started
What do I need to create an ad?
How do I pick a category for my ad?
Is this program right for me?
How much does this cost?
Are there rules regarding ad content?

My ad is on the site -- Now what?
Can I make changes to my ad?
How can I tell if it's working?
How can I see my ad on the site?

Getting Started

What do I need to create an ad?
You need an offer or unique aspect of your products that you can highlight and a web site location where they can get more information about your products and contact you. To see examples and the process for creating an ad, go to the Step-by-Step instructions.

Firm Directory Printout

FIG. 35c

How do I pick a category for my ad?
The categories have been defined based on some of the best existing taxonomies for manufactured parts. You should select that category (s) that best describe the parts that you sell as a search on a part in this category will lead to your ad being displayed. If you cannot find a category that is relevant, please recommend a category or contact us and we will evaluate adding a new category.

Is this program right for me?
If you are printing catalogs, going to trade shows, and maintaining a web site to keep yourself available to prospective buyers, then you are a good candidate for this program. These ads are displayed to potential buyers at the precise time they are looking for parts in the categories you select. So, buyers see your ad when they need something you have.

How much does this cost?
The pricing is very simple. To display one ad associated with one category for one month, the cost is $99. At this time we are offering an additional month free. We will be restructuring our pricing to offer more choices, so please stay tuned.

Are there rules regarding ad content?
The ad content must follow certain acceptable guidelines. Therefore, we reserve the right to accept ads relating to certain products or services. We reserve the right to exercise editorial discretion when it comes to the advertising we accept on our site, as noted in our advertising terms and conditions. Please note that the decisions we make concerning advertising in no way affect the search results we deliver.

Trademark Usage
 • Trademarks are important business assets that can diminish in value if they are not used correctly. To learn more about how we handle trademark issues, review our Trademark policy.

Competitive Claims
 • If your ad text contains competitive language regarding other companies, support for this claim must be displayed on the page that your URL is directed to.

Superlatives
 • If your ad contains comparative or subjective phrases such as "best," "lowest," or "#1", verification by a third party must be clearly displayed on your website.

Advertised Prices, Discounts, and Free Offers
 • If your ad includes a price, special discount, or 'free' offer, it must be clearly and accurately displayed on your website. Example: If you mention that you are selling bearing for 10% off in your ad text, your destination URL should link to a page that clearly displays bearing at the discounted price.

No Unacceptable Phrases
 • Your ad cannot contain universal call-to-action phrases such as "click here," "link here," "visit this link," "this site is," or other similar phrases that could apply to any ad, regardless of content.
 • The limited text space should be used for concise, informative language that sets you apart from your competition.

No Inappropriate Language
 • Your ad cannot contain offensive or inappropriate language.

FIG. 35d

Firm Directory Printout

Your URLs must work and accurately reflect your ad and site
- Display URL Must Be Accurate
  - Your Display URL must accurately reflect the URL of your website. If your actual destination URL link is too long for your ad, use a shortened version (such as your homepage) that meets the character limit for this field.
  - The Display URL field cannot be used as another line of ad text.
  - Your Display URL must include the domain extension, for example: .com, .net, or .org.

Example:
Destination URL: http://www.transducercompany.com/transducers/321type.html
Display URL: http://www.transducercompany.com Destination URL Must Work
- Your Destination URL must work properly. Check your spelling and symbols to make sure you entered the correct URL for the page you want users to visit.
- Your Destination URL must link to a working website. You cannot link to an email address or a file (ex: an image, audio, video, or document file that requires an additional program or application to open or run).
- The destination page for your ad cannot be under construction. We require your Destination URL to link to an actual web page with content relevant to your ad. When your site is under construction or down for maintenance, you must promptly inform Imaginestics.

No Pop-ups
- We do not allow links to destination pages that generate pop-ups when users enter or leave your page. We consider a pop-up to be any window, regardless of content, that opens in addition to the original window.

Review our Content Policy for additional information

My ad is on the site -- Now what?

Can I make changes to my ad?
After your ad is approved and up on the 3DSeek site, you can send an e-mail to Imaginestics if you require any changes. This will be totally automated in the near future so you can manage your own ads.

How can I tell it's working?
Imaginestics will send you a monthly report on the activity pertaining to your ad. However, in the near future, this will be automated so you can review the traffic report on your ad online.

How can I see my ad on the site?
You can click on the category your ad is associated with or search on a part from that category. You can search on this part by uploading a 3D model of the part you have or by using the gallery of parts on the 3D-Seek site.

About Imaginestics  Other Imaginestics Products  Give us feedback

©2006 Imaginestics, LLC  Privacy Policy

Firm Directory Printout

FIG. 37a

TERMS AND CONDITIONS

These Imaginestics Advertising Program Terms ("Terms") are entered into by you and Imaginestics, LLC ("Imaginestics") regarding the Imaginestics Advertising Program ("Program") as further described in the Program's frequently asked questions at http://www.3D-seek.com/3DSeek/advertise.aspx (the "FAQs") (collectively, the "Agreement"). "You" or "your" means the party listed in this e-mail message and you represent you have the authority to agree to this Agreement for that party. You represent and warrant that you are authorized to act on behalf of, and bind to this Agreement, any third party for which you generate ads. You hereby agree and acknowledge:

1. Policies. Program use is subject to all applicable Imaginestics and Partner policies, including without limitation the Editorial Guidelines, Imaginestics Privacy Policy (http://www.3D-Seek.com/3DSeek/privacyPolicy.aspx) and Trademark Guidelines (http://www.3D-Seek.com/3DSeek/trademarkPolicy.aspx). Policies may be modified any time. You shall direct only to Imaginestics communications regarding you, ads on Partner Properties. Some Program features are identified as "Beta," or otherwise unsupported ("Beta Features"). Beta Features are provided "as is" and at your option and risk. You shall not disclose to any third party any information from, existence of or access to Beta Features. Imaginestics may modify ads to comply with any Imaginestics Property or Partner Property policies.

2 The Program. You are solely responsible for all: (a) Ad content and Ad URLs (Category-based Ad View or "CADV"), whether generated by or for you; and (b) web sites proximately reachable from CADV URLs and your services and products (collectively "Services"). Ads may be placed on (c) any category provided by Imaginestics ("Imaginestics Property"), and unless opted-out by you (2) any other content or property provided by a third party ("Partner") upon which Imaginestics places ads ("Partner Property"). Imaginestics or Partners may reject or remove any ad for any or no reason. You may cancel any ad subscription at any time (such cancellation is generally effective within 24 hours). Imaginestics may cancel immediately any Ad Program or these Terms at any time with notice. Imaginestics may modify the Program or these Terms at any time without liability and your use of the Program after notice that Terms have changed indicates acceptance of the Terms. Sections 1, 2, 4, 5, 6 and 7 will survive any expiration or termination of this Agreement.

3 Prohibited Uses. You shall not, and shall not authorize any party to: (a) generate automated, fraudulent or otherwise invalid impressions or clicks; or (b) advertise anything illegal or engage in any illegal or fraudulent business practice in any state or country where your ad is displayed. You represent and warrant that (c) all your information is correct and current; (d) you hold and grant Imaginestics and Partners all rights to copy, distribute and display your ads ("Use"); and (e) such Use and websites linked from your ads (including services or products therein) will not violate or encourage violation of any applicable laws. Violation of these policies may result in immediate termination of this Agreement without notice and may subject you to legal penalties and consequences.

4 Disclaimer and Limitation of Liability. IMAGINESTICS DISCLAIMS ALL WARRANTIES, EXPRESS OR IMPLIED, INCLUDING WITHOUT LIMITATION FOR NONINFRINGEMENT, MERCHANTABILITY AND FITNESS FOR ANY PURPOSE. Imaginestics disclaims all guarantees regarding positioning or the levels or timing of: (a) delivery of any impressions on any Partner Property or Imaginestics Property or sections of such properties, (b) conversions for any ads. EXCEPT FOR INDEMNIFICATION AMOUNTS PAYABLE TO THIRD PARTIES HEREUNDER AND YOUR BREACH OF SECTION A, TO THE FULLEST EXTENT PERMITTED BY LAW: (i) NEITHER PARTY WILL BE LIABLE FOR ANY CONSEQUENTIAL, SPECIAL, INDIRECT, EXEMPLARY, PUNITIVE, OR OTHER DAMAGES WHETHER IN CONTRACT, TORT OR ANY OTHER LEGAL THEORY, EVEN IF ADVISED OF THE POSSIBILITY OF SUCH DAMAGES AND NOTWITHSTANDING ANY FAILURE OF ESSENTIAL PURPOSE OF ANY LIMITED REMEDY; AND (ii) EACH PARTY'S AGGREGATE LIABILITY TO THE OTHER IS LIMITED TO AMOUNTS PAID OR PAYABLE TO IMAGINESTICS BY YOU FOR THE AD GIVING RISE TO THE CLAIM. Except for payment, neither party is liable for failure or delay resulting from a condition beyond the reasonable control of the party.

Wednesday, February 08, 2006      Page 1 of 2

Firm Directory Printout including but not limited to acts of God, government, terrorism, natural disaster, labor conditions and power failures.

5 Payment. Upon selecting the Order button on the http://www.3D-Seek.com/3DSeek/orderAd.aspx you have accepted to enroll in the Imaginestics Advertising Program and accepted the charges for the program. You will be billed immediately and payment is due within 15 days. The charges are due in US currency. Charges are exclusive of taxes. You are responsible for paying (a) all taxes and government charges, and (b) reasonable expenses and attorney fees Imaginestics incurs collecting late amounts. Refunds (if any) are at the discretion of Imaginestics and only the form of advertising credit for Imaginestics Properties. You acknowledge and agree that any billing and payment information that you provide to Imaginestics may be shared by Imaginestics with companies who work on Imaginestics' behalf, such as payment processors and/or credit agencies solely for the purposes of checking credit, effecting payment to Imaginestics and servicing your account. Imaginestics may also provide information in response to valid legal process, such as subpoenas, search warrants and court orders, or to establish or exercise its legal rights or defend against legal claims. Imaginestics shall not be liable for any use or disclosure of such information by such third parties.

6 Indemnification. You shall indemnify and defend Imaginestics, its agents, affiliates, and licensors from any third party claim or liability (including without limitation reasonable legal fees) arising out of your Program use, CADV and Services and breach of the Agreement.

7 Miscellaneous. The Agreement must be construed as if both parties jointly wrote it, governed by Indiana law except for its conflicts of laws principles and adjudicated in Tippecanoe County, Indiana. The Agreement constitutes the entire agreement between the parties with respect to the subject matter hereof. You may grant approvals, permissions and consents by email, but any modifications by you to the Agreement must be made in a writing (not including email) executed by both parties. Any notices to Imaginestics must be sent to: Imaginestics, LLC, Advertising Program, 1220 Potter Drive, West Lafayette, IN 47906, USA, with a copy to Legal Department, via first class or air mail or overnight courier, and are deemed given upon receipt. Notice to you may be effected by sending email to the email address specified in your account, or by posting a message to your account interface, and is deemed received when sent (for email) or no more than 15 days after having been posted (for messages in your CADV interface). A waiver of any default is not a waiver of any subsequent default. Unenforceable provisions will be modified to reflect the parties' intention, and remaining provisions of the Agreement will remain in full effect. You may not assign any of your rights hereunder and any such attempt is void. Imaginestics and you and Imaginestics and Partners are not legal partners or agents, but are independent contractors.

About Imaginestics    Other Imaginestics Products    Give us feedback

©2006 Imaginestics, LLC  Privacy Policy

FIG. 37b

REFER THIS SITE TO YOUR SUPPLIER

Firm Directory Printout

Your Name: [ ]
Your Email address: [ ]
Supplier's Name: [ ]
Supplier's Email address: [ ]
Subject: [Take a look at 3D-Seek.com and register your parts]
Your Message (Optional): [ ]

Fixed Message: [Your customer/prospect has referred you to http://www.3D-Seek.com. This site is unique, since it is the first online 3D shape search portal that uses shape as an input. It takes the search for products to the next level in terms of speed and accuracy by overcoming the limitations of text-based searches and database queries that are contextual in nature. Since shape is the lowest common denominator for any part/product, the shape search engine is not hampered by traditional text-based search engines and can successfully address the challenges posed by variations in specifications of products available from suppliers across the globe. Thus using the 3D-Seek.com, designers, engineers, and other technical buyers can accurately and quickly locate your product early in the product development stage, enabling your products to compete on capability rather than on price later in the procurement stage.]

[Send Email] ~234

FIG. 38

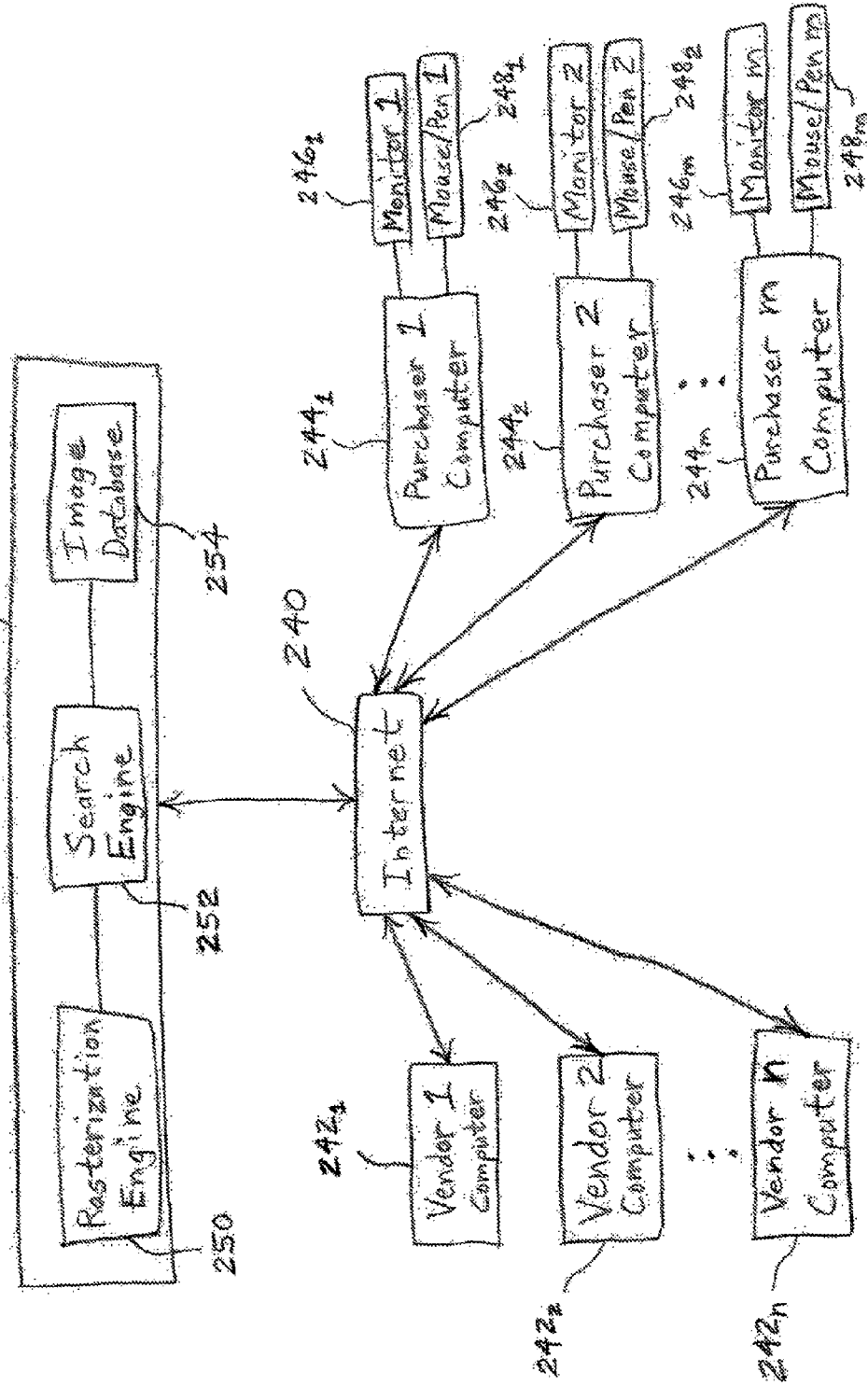

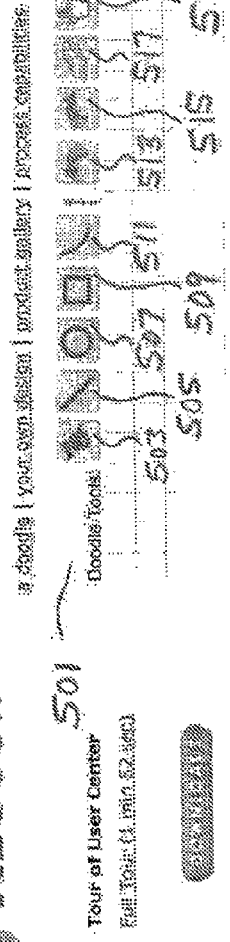
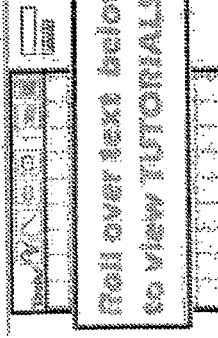
FIG. 48

FIG. 49

METHOD OF ENABLING A USER TO DRAW A COMPONENT PART AS INPUT FOR SEARCHING COMPONENT PARTS IN A DATABASE

CROSS REFERENCES TO RELATED APPLICATIONS

The present application is a National Stage Application of PCT/US2007/062734 filed on Feb. 23, 2007, which claims priority to U.S. Provisional Patent Application No. 60/776,061 filed on Feb. 23, 2006.

BACKGROUND OF THE INVENTION

1. Field of the Invention

The present invention relates to a method of creating a database of component parts and searching the database for a particular component part.

2. Description of the Related Art

Almost all machines, appliances, vehicles, etc. are formed of many component parts such as brackets, fasteners, connectors, frames and other parts that can be characterized by their visual appearance. If a particular part fails on a consumer product, the consumer may seek to replace the component part rather than replace the entire consumer product. In order to locate a source for the replacement part, the consumer may conduct a search on an Internet search engine by entering a keyword or descriptor of the component part.

A problem with conducting an online search for a component is that the consumer may not know the preferred descriptive term for the part he is searching for. This problem is compounded by the fact that there may be several possible terms that can be used to describe a particular component, and the component may not be indexed by any of the terms that the searcher is familiar with. Further compounding the problem is that the searcher's native language may not be the language by which the component parts are indexed. Yet another problem is that even if the searcher enters the best descriptor for the desired part, the search results may include many variations of the component, very few of which would fit the searcher's needs. For example, there are a great many variations of brackets, and thus a searcher would have to examine a large number of brackets provided in a computerized search in order to find a bracket that suits his needs.

Similar problems in locating parts are faced by a product designer. It is often less expensive to purchase existing components than to design and manufacture small quantities of a component from scratch. Although a product designer is more likely to be familiar with part descriptors than a consumer, a product designer must overcome many of the same problems described above in order to find an existing part that fits a particular application.

Still another problem is that each part supplier typically has its own web site. Thus, a searcher may have to search through a great many different web sites in order to find the part that he is looking for.

What is needed in the art is a method of developing a database of parts, and allowing the database to be searched in a way that avoids the problems discussed above, thereby enabling a user to more easily find a part having particular characteristics.

SUMMARY OF THE INVENTION

The present invention provides a method of enabling a user to provide input image data for searching a database of image data. The user may draw, upload, or retrieve from the database an initial view of a part to be found in the database. The user may then modify the input image data for the search by rotating the initial view and doodling modifications on the rotated view to better represent the part being sought. The user may repeat the steps of rotating the image and modifying it by doodling as many times as he desires in order to further refine the input image data for the subsequent search of the database.

The present invention provides a method of creating a database of images of component parts by enabling vendors to upload electronic models of their associated parts including identification data. The electronic part models and associated identification data may be stored in the database for potential purchasers to search through. The potential purchasers may enter input image data, which may include doodled portions, into a search engine for comparison with the electronic part models stored in the database.

The invention comprises, in one form thereof, a method of receiving input image data for an image search engine. A two-dimensional input image is provided on a display screen. A user is enabled to rotate the input image on the display screen about an axis that is non-perpendicular to a plane of the input image. The user is also enabled to electronically draw modifications on the rotated input image.

The invention comprises, in another form thereof, a method of providing an electronic commercial showplace. A database of image data associated with component parts is provided. A plurality of vendors are enabled to upload image data to the database via a web site. The uploaded image data is associated with component parts that are sold by the vendors. A purchaser is enabled to enter image data onto a web site. The image data represents a component that the purchaser would like to buy. The database is searched for vendor image data matching the purchaser image data. A matching vendor image is displayed to the purchaser on the web site. Vendor information is displayed to the purchaser on the web site, the vendor information being associated with the matching vendor image data.

The invention comprises, in yet another form thereof, a method of providing an electronic commercial showplace. A database of image data associated with component parts is provided. Shape representations are extracted from three-dimensional models of vendors' component parts. The shape representations are stored in the database. A purchaser is enabled to enter image data onto a web site, the image data representing a component that the purchaser would like to buy. The database is searched for at least one shape representation matching the purchaser image data. A matching shape representation is displayed to the purchaser on the web site. Vendor information is displayed to the purchaser on the web site. The vendor information is associated with the matching shape representation.

The invention comprises, in still another form thereof, a method of providing an electronic commercial showplace. A database of image data associated with component parts is provided. Two-dimensional images are extracted from two-dimensional drawings of vendors' component parts. The two-dimensional images are stored in the database. A purchaser is enabled to enter image data onto a web site. The image data represents a component that the purchaser would like to buy. A three-dimensional shape search engine is used to search the database for at least one two-dimensional image matching the purchaser image data. A matching image is displayed to the purchaser on the web site. Vendor information is displayed to the purchaser on the web site. The vendor information is associated with the matching two-dimensional image.

The invention comprises, in a further form thereof, a method of providing an electronic commercial showplace. A database of image data associated with component parts is provided. Two-dimensional drawings of vendors' component parts are converted to three-dimensional image data. The three-dimensional image data is stored in the database. A purchaser is enabled to enter image data onto a web site. The image data represents a component that the purchaser would like to buy. The database is searched for three-dimensional vendor image data matching the purchaser image data. A matching three-dimensional vendor image is displayed to the purchaser on the web site. Vendor information is displayed to the purchaser on the web site. The vendor information is associated with the matching three-dimensional vendor image data.

The invention comprises, in a still further form thereof, a method of providing an electronic commercial showplace. A database of image data associated with component parts is provided. An index of part vendor web sites is compiled wherein the part vendors have granted permission to extract image data from the web sites. The image data is extracted from the vendor web sites. The image data is uploaded to the database via a host web site. The uploaded image data is associated with component parts that are sold by the vendors. A purchaser is enabled to enter image data onto a web site. The image data represents a component that the purchaser would like to buy. The database is searched for vendor image data matching the purchaser image data. A matching vendor image is displayed to the purchaser on the web site. Vendor information is displayed to the purchaser on the web site. The vendor information is associated with the matching vendor image data.

The invention comprises, in another form thereof, a method of receiving input image data for an image search engine, including providing a two-dimensional representation of a three-dimensional cubic shape on a display screen. The representation includes three faces oriented substantially perpendicular to each other. A user is enabled to draw a first orthographic view of an object onto a first of the faces, and a second orthographic view of the object onto a second of the faces.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 3 is another page from the web site of FIG. 1 showing exemplary search results;

FIG. 14b is another view of the web page of FIG. 14a;

FIG. 14e is another view of the web page of FIG. 14a;

FIG. 14f is a web page showing uploaded component images;

FIG. 16a is a web page including advice to the user regarding how to doodle on the canvas;

FIG. 16b is another web page including advice to the user regarding how to doodle on the canvas;

FIG. 16c is yet another web page including advice to the user regarding how to doodle on the canvas;

FIG. 16d is still another web page including advice to the user regarding how to doodle on the canvas;

FIG. 17a is a web page advising the user about how he can add his parts to the database if he has electronic part files;

FIG. 17c is yet another web page advising the user about how he can add his parts to the database if he has electronic part files;

FIG. 18 is a web page describing the i-prowler software employed in the present invention for enabling a user to upload his own component images to the web site;

FIG. 19a is a web page listing questions about i-prowler software that may be frequently asked by users and their answers;

FIG. 19b is another web page listing questions about i-prowler software that may be frequently asked by users and their answers;

FIG. 20a is a web page displaying privacy policies that may be employed in conjunction with the present invention;

FIG. 20b is another web page displaying privacy policies that may be employed in conjunction with the present invention;

FIG. 20c is yet another web page displaying privacy policies that may be employed in conjunction with the present invention;

FIG. 21 is a web page advising the user about how he can upload his parts directly to the database if he has electronic part files;

FIG. 23 is a web page explaining how Part Bin may be used in uploading a company's product information to the database;

FIG. 24a is a web page listing questions that may be frequently asked about Part Bin and the corresponding answers;

FIG. 24b is another web page listing questions that may be frequently asked about Part Bin and the corresponding answers;

FIG. 24e is a further web page listing questions that may be frequently asked about Part Bin and the corresponding answers;

FIG. 25 is a web page enabling the supplier to add his company's URL to the web site's index;

FIG. 26a is a web page advising the supplier how to convert two-dimensional drawings to three-dimensional models for indexing;

FIG. 26b is another web page advising the supplier how to convert two-dimensional drawings to three-dimensional models for indexing;

FIG. 27 is a web page enabling the supplier to enter his company information for storage in the database, and to select an option for converting his two-dimensional drawings to three-dimensional solid models;

FIG. 28a is a web page advising the user how to add his parts/products to the database if he has two-dimensional drawings, has a two-dimensional catalog, and wishes to create an interactive three-dimensional web catalog;

FIG. 28b is another web page advising the user how to add his parts/products to the database if he has two-dimensional drawings, has a two-dimensional catalog, and wishes to create an interactive three-dimensional web catalog;

FIG. 29 is a web page displaying a pricing sheet that may be used in conjunction with the present invention;

FIG. 31 is a web page advising a supplier how to add his parts/products to the database if he does not have electronic part files and is a standard part manufacturer;

FIG. 33 is a web page advising a supplier how to add his parts/products to the database if he does not have electronic part files and is a custom part manufacturer;

FIG. 35a is a web page advising a supplier how to advertise on the web site;

FIG. 35b is another web page advising a supplier how to advertise on the web site;

FIG. 35c is yet another web page advising a supplier how to advertise on the web site;

FIG. 35d is still another web page advising a supplier how to advertise on the web site;

FIG. 37a is a web page displaying terms and conditions under which a user may advertise on the web site;

FIG. 37b is another web page displaying terms and conditions under which a user may advertise on the web site;

FIG. 38 is a web page enabling a user to send an email to his supplier in which the user refers the supplier to the web site;

FIG. 39 is a block diagram of one embodiment of a computer system of the present invention;

FIG. 46a shows a cubic with front, right, and top views of a table drawn therein;

FIG. 46b is a perspective view of the table drawn in FIG. 46a;

FIG. 47a shows a cubic with front, right, and top views of a cylinder drawn therein;

FIG. 47b is a perspective view of the cylinder drawn in FIG. 47a;

FIG. 48 is an exemplary page from another web site that may be used to implement another embodiment of the method of the present invention;

FIG. 49 is another page from the web site of FIG. 48 showing exemplary search results.

Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Figure 1:
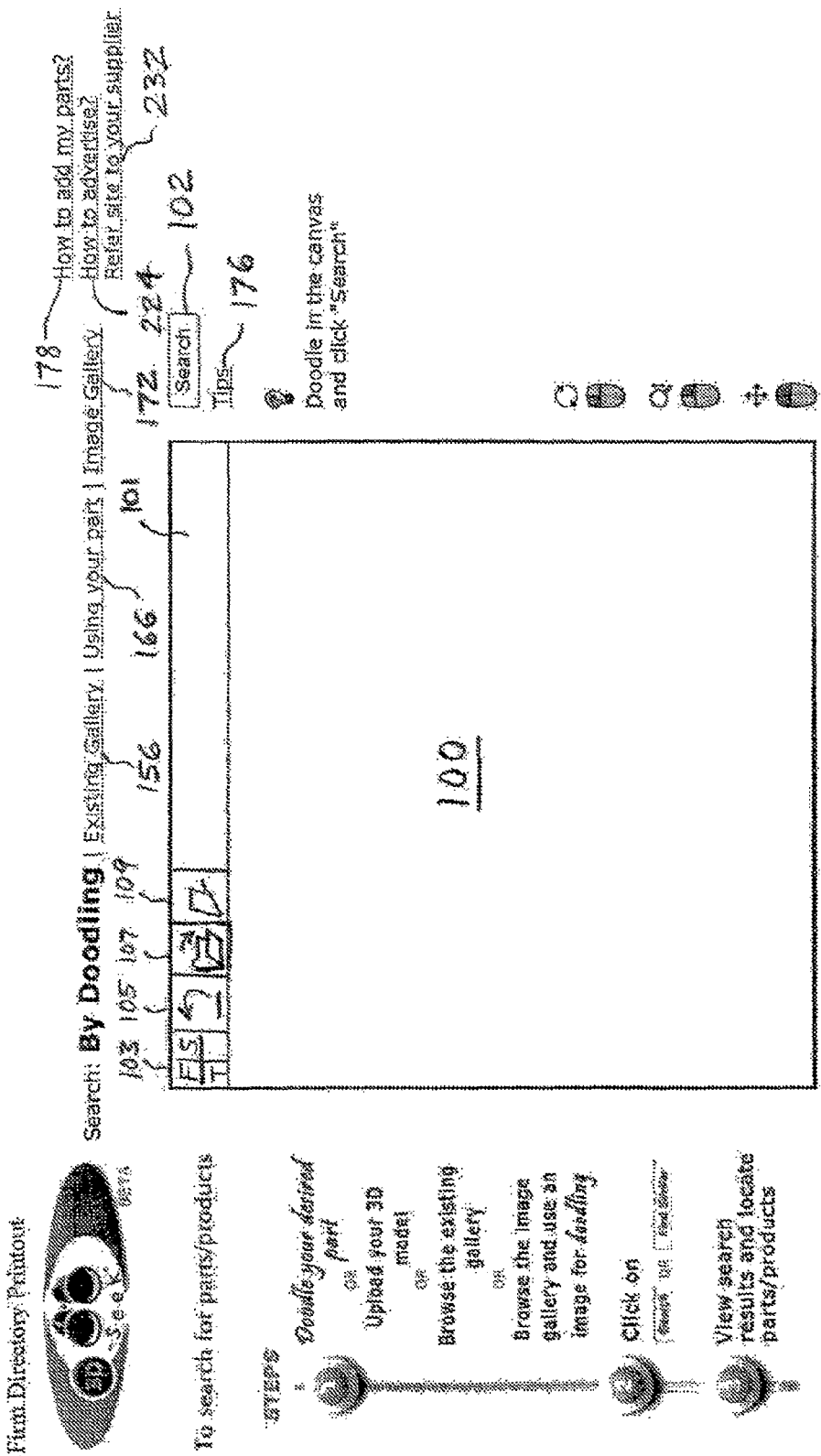
FIG. 1 is an exemplary page from a web site that may be used to implement one embodiment of the method of the present invention.

In general, the invention is directed to a method of creating a database of images of component parts and enabling a user to electronically doodle or draw a component part and search for the drawn component part in the database. FIG. 1 illustrates a page of one embodiment of a web site that may be used to implement the method of the present invention. The web page, which may appear on a user's monitor, includes a canvas 100 in which a user may doodle, sketch or draw a desired component, i.e., "part", that he would like to find, locate, or obtain. The user may draw within canvas 100 by locating a cursor within canvas 100, holding down the left mouse button, and then moving the mouse in order to thereby draw lines that follow the movement of the mouse. Although a drawing tool in the form of a "mouse" is referred to herein, it is to be understood that it is equally possible for another type of drawing tool, such as a pen device, to be used in conjunction with the present invention. After the drawing is complete, the user may use the mouse to click on a search icon 102. In response to search icon 102 being clicked on, the server hosting the web site may search an electronic database of component images for a component image that most closely resembles or matches the image drawn by the user in canvas 100. The components in the database may be components that are commercially available through various vendors. When the matching component is found in the database, the image of the matching component may be displayed on the user's monitor along with the name of the vendor that supplies the part, a link to the vendor's web site, or to a particular page on the vendor's web site on which the matching part may be found, and other information that may be of interest to the user.

For the sake of brevity, the database may be referred to herein as storing images or image data. However, it is to be understood that the database may actually store the shape representations of three-dimensional models and two-dimensional drawings and related data, such as images for thumbnail displays and three-dimensional/two-dimensional light viewable files, e.g., i3D format, which is proprietary to Imaginestics, LLC. "Image data", as used herein, may include not just an image expressed in ones and zeros, which is a static snapshot of an object, or a representation of a component model. Rather, "image data" may incorporate a component model, which may include a plurality of two-dimensional images from different viewpoints in three-dimensional space, i.e., a three-dimensional model, as well as names/descriptors of models/parts, part numbers, and other identification and sourcing information.

The searching of the database may be performed as disclosed in U.S. Patent Application Publication No. 2004/0249809, titled METHODS, SYSTEMS, AND DATA STRUCTURES FOR PERFORMING SEARCHES ON THREE DIMENSIONAL OBJECTS, published Dec. 9, 2004, which is expressly incorporated herein by reference.

Figure 2:
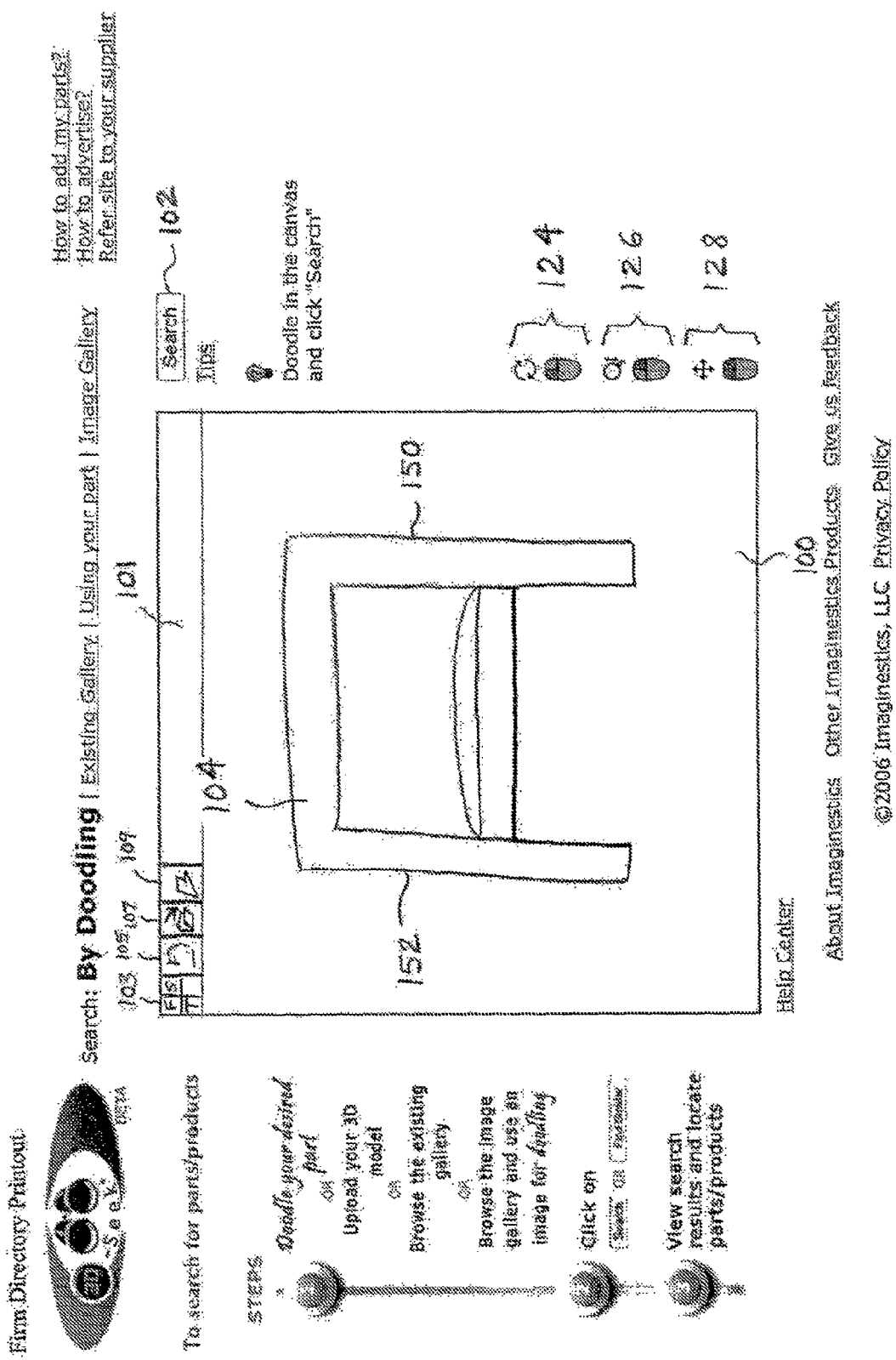
FIG. 2 is the web page of FIG. 1 with a doodled part entered into the canvas.

FIG. 2 illustrates a canvas 100 having a component part image in the form of a chair image 104 drawn therein by a user. In this example, the user sketched or doodled a front view of the desired chair. However, it is also possible for the user to draw a side, top, or any perspective view of the chair. It is not necessary for the user to designate what type of view that he has drawn, as the searching of the component images in the database may accommodate any type of view or viewing angle that the user may enter. Canvas 100 may include a toolbar 101 providing a Front, Side, Top Views icon 103, an Undo Stroke icon 105, an Open Background Image icon 107, and a Start Doodling icon 109. Clicking on Front, Side, Top Views icon 103 results in canvas 100 being divided into four quadrants, enabling the user to draw separate front, side and top views of the part to be searched for, with each of the three views being simultaneously considered by the search engine. Clicking on Undo Stroke icon 105 results in the last stroke doodled by the user being erased or deleted from canvas 100. Clicking on Open Background Image icon 107 enables the user to upload an image onto canvas 100. Clicking on Start Doodling icon 109 after a part found in a search has been displayed on canvas 100 enables the user to add doodling to the displayed search result component and thereby refine a search to be made subsequently.

Figure 3:
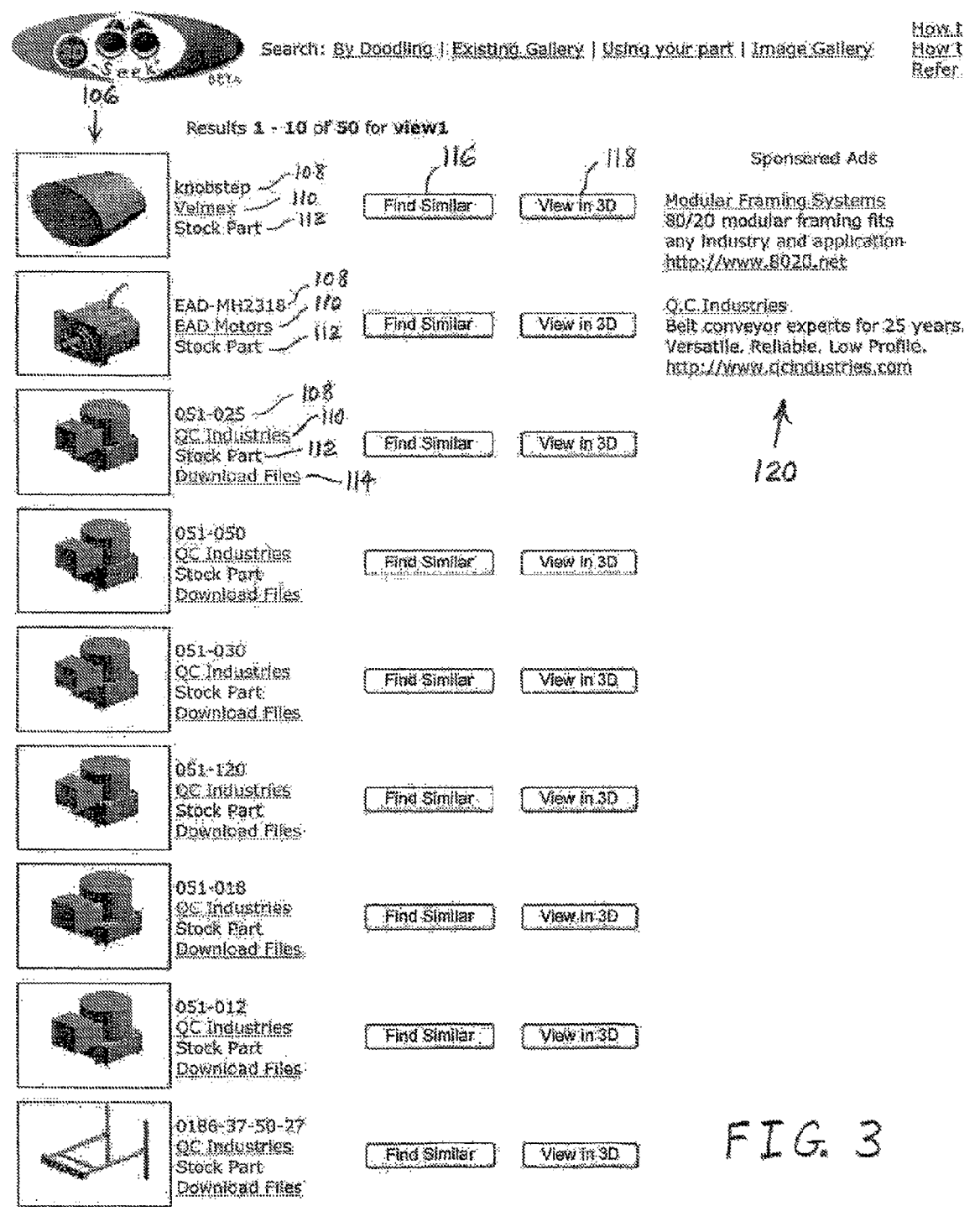

After the user has drawn chair image 104 and clicked on search icon 102, the server may respond with a web page having a format similar to that shown in FIG. 3. The web page may provide a list of search results including component images 106. Images 106 may be listed in order of how closely they match the doodled image for which the search was requested. Beside each image may be a descriptor or model number 108, a link 110 to the part vendor's web site, an indication 112 of whether the vendor keeps the part in stock or whether the part is manufactured upon request, and a link 114 enabling the user to download image files for the part.

The user may decide that one of the images 106 is close to the part that he is looking for, but he may like to look at other database images that are similar to the image 106. The user may then elect to click on a Find Similar icon 116 that may return a web page that is formatted similarly to FIG. 3, but that lists parts that are similar to the image 106 for which the Find Similar request was made. The user may then select one of the resulting images or obtain further information, just as he could from the original search results shown in FIG. 3.

If the user would like to view one of images 106 in three dimensions, then he may click on the image 106 itself, or he may click on a View in 3D icon 118. The web page of FIG. 3 may also include advertisements 120 provided by the vendors whose parts are shown in images 106 on the web page.

In one embodiment, the user's or "purchaser's" e-mail address is forwarded to the vendor in the event of the user indicating interest in a component associated with the vendor. The vendor may then e-mail to the user further or updated information about the component in which the user expressed interest, or about other components that are related to the component in which the user expressed interest. The user may express interest in a component by clicking on an image of the component, clicking on a link 110, 114 associated with the component, clicking on one of icons 116, 118, or clicking on a sponsored ad 120, for example.

The three-dimensional image obtained by clicking on image 106 or by clicking on View in 3D icon 118 may be provided as a perspective view, e.g., an enlargement of image 106, or as an orthographic view, i.e., a front, side, or top view. However, the type of view may be of no consequence to the system, and there may be no designation of the type of view by either the system or the user. In one embodiment, the "three-dimensional image" is provided from the same viewpoint as the original image 104 was doodled from in canvas 100. Thus, the "three-dimensional image" provided by the system may appear very similar to, or substantially identical to, the original image 104, as is the image 122 of FIG. 4, which may be provided by the system in response to clicking on an image 106 or on View in 3D icon 118.

Although image 122 is provided by the system on a two-dimensional screen, the image is referred to herein as being three-dimensional in the sense that the user may use the mouse to turn or rotate image 122 such that the image may be transformed to present the component from any viewpoint desired by the user. More particularly, as indicated at 124 in FIG. 4, a user may hold down the left mouse button and move the mouse to thereby cause image 122 to rotate in selected directions. For example, if the user holds down the left mouse button and moves the mouse upward on canvas 100, it may cause image 122 to rotate about a horizontal axis such that the lower portion of image 122 rotates toward the viewer, and the upper portion of image 122 rotates away from the viewer. If the user holds down the left mouse button and moves the mouse downward on canvas 100, it may cause image 122 to rotate about the horizontal axis such that the lower portion of image 122 rotates away from the viewer, and the upper portion of image 122 rotates toward the viewer. If the user holds down the left mouse button and moves the mouse rightward on canvas 100, it may cause image 122 to rotate about a vertical axis such that the right-hand end of image 122 rotates toward the viewer, and the left-hand end of image 122 rotates away from the viewer. If the user holds down the left mouse button and moves the mouse leftward on canvas 100, it may cause image 122 to rotate about the vertical axis such that the left-hand end of image 122 rotates toward the viewer, and the right-hand end of image 122 rotates away from the viewer. The user may combine directions of movement to cause image 122 to rotate about differently oriented axes. That is, the direction of mouse movement may include both vertical and lateral components to thereby cause image 122 to rotate about a skewed axis.

It is possible for an angular distance that the image has been rotated from an initial reference position to be displayed on the web page so that the user may rotate the image a particular desired distance, such as ninety degrees, for example. The distance of rotation may be expressed in degrees relative to each of three perpendicular axes.

As indicated at 126, the user may magnify image 122, or zoom in and out relative to image 122, by holding down the right mouse button and moving the mouse upward in order to zoom in or downward in order to zoom out. As indicated at 128, the user may shift image 122 upward, downward, rightward, leftward, or in a direction having both vertical and lateral components, by holding down both the left and right mouse buttons and moving the mouse in the desired direction.

Figure 4:
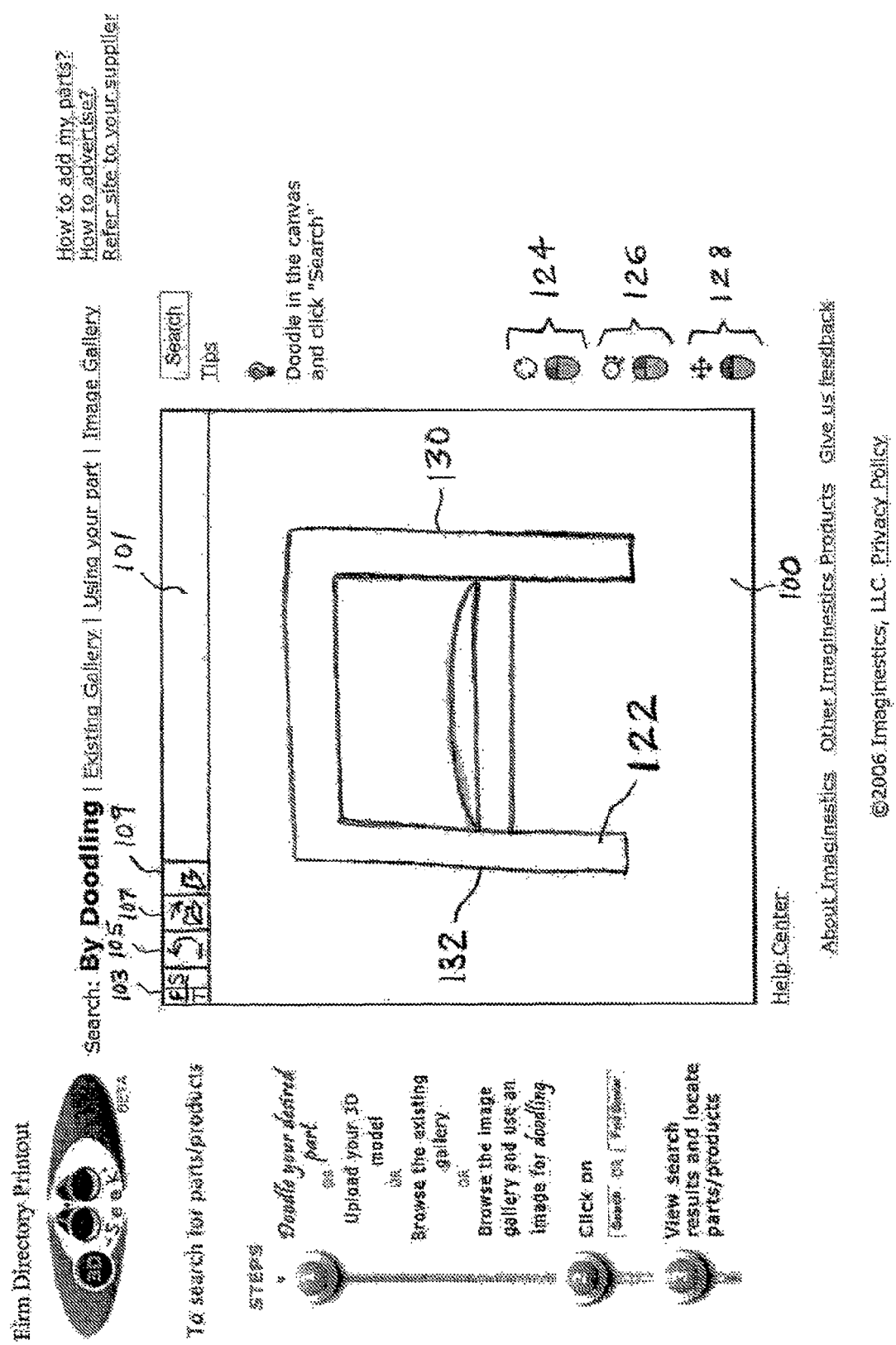
FIG. 4 is another page from the web site of FIG. 1 showing a part found in the database as a result of search based upon the doodled part of FIG. 2.
Figure 5:
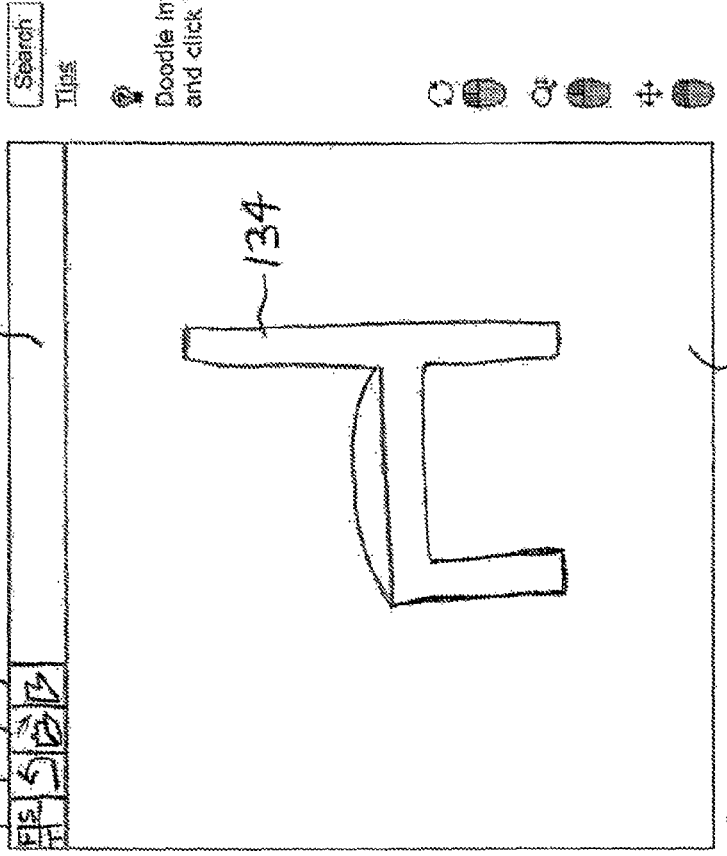
FIG. 5 is the web page of FIG. 4 after the part has been rotated ninety degrees by the user.

After the user has examined the search result image 122 of FIG. 4, he may want to look at the part represented by image 122 from another angle in order to better determine the level of similarity between the part he is seeking and the part represented by image 122. In order to view the part from another angle, the user may hold down the left mouse button, as indicated at 124, and rotate image 122 as desired. For example, the user may hold down the left mouse button and move the mouse rightward to thereby rotate image 122 about a vertical axis such that a right-hand edge 130 of image 122 rotates toward the user and a left-hand edge 132 of image 122 rotates away from the user. The user may watch the image rotate, in what appears to be a continuous rotation, as he moves the mouse rightward. After ninety degrees of such rotation about a vertical axis, the image on canvas 100 may appear similar to image 134 shown in FIG. 5. Because the search result images displayed on canvas 100 may be viewed from different angles, they are referred to herein as "three-dimensional images".

It is to be understood that images 122, 134, as well as all of the intermediate images appearing on canvas 100, may be created by a three-dimensional software rasterization engine within the server that runs the web site. The rasterization engine may create the images based upon image data that is stored in the database within the server.

If image 134 does not suitably match, i.e., substantially differs from, the component that the user is seeking, then the user may click on Start Doodling icon 109 and then doodle on image 134 to thereby improve the resemblance between image 134 and the part being sought. After the image 134 has been thus revised via doodling, then the user may again initiate a search by clicking on Search icon 102. Because the input image is three-dimensional and generally more representative of the part being sought after the user has revised image 134, the search engine may return search results that are more similar to, or a better match for, the part being sought by the user. In addition to doodling, it is also possible that the user may erase portions of image 134 in order revise the input image corresponding to that particular view.

Figure 6:
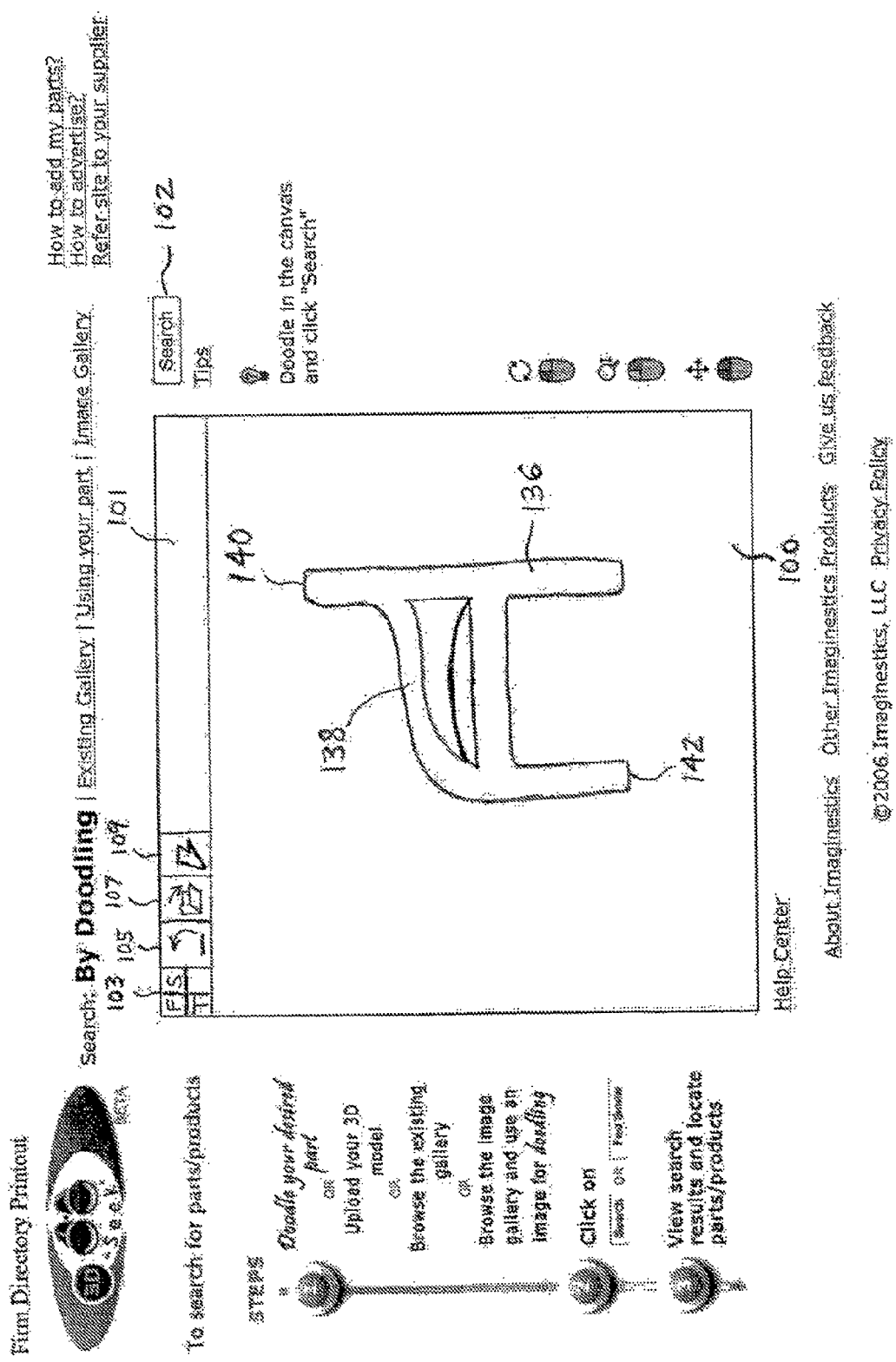
FIG. 6 is the web page of FIG. 5 after being revised by doodling by the user.

FIG. 6 illustrates an example of an input image 136 that may be created by a user doodling upon or otherwise revising image 134. In this particular example, the user may doodle in an arm rest 138 that may have not been visible in the doodled input image 104, and thus may have not been considered by the search engine in retrieving image 122 from the database.

Figure 7:
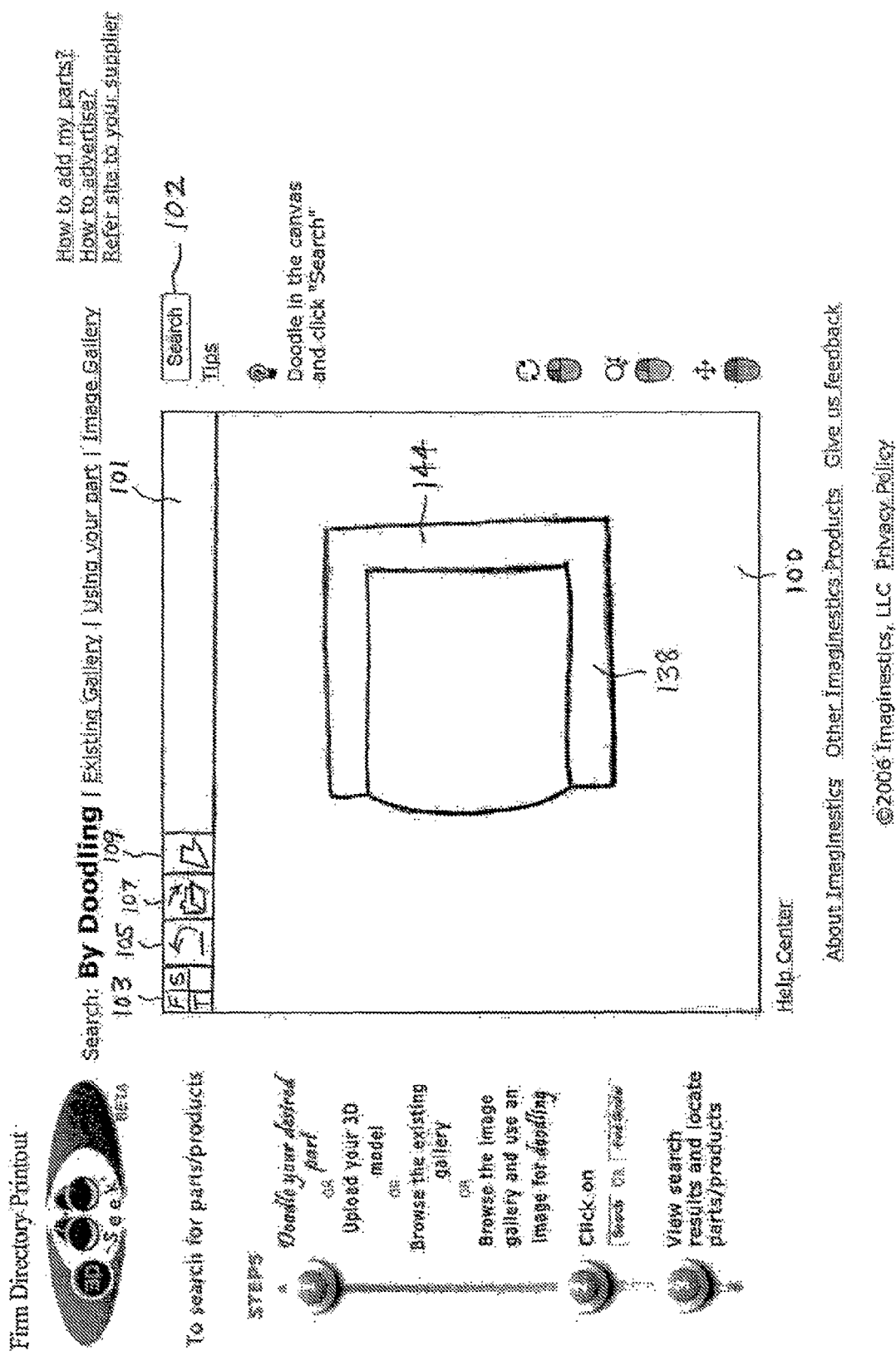
FIG. 7 is the web page of FIG. 6 after the part has been rotated ninety degrees by the user.

After the user has doodled to create image 136 of FIG. 6, he may want to look at and refine the input image from a third angle in order to better define the three-dimensional input image for which the search engine will seek a match in the database. The third angle may be displaced ninety degrees from each of the first two angles or viewpoints. In order to view the input image from the third angle or viewpoint, the user may hold down the left mouse button, as indicated at 124, and rotate image 136 of FIG. 6 as desired. For example, the user may hold down the left mouse button and move the mouse downward to thereby rotate image 136 about a horizontal axis such that an upper edge 140 of image 136 rotates toward the user and a lower edge 142 of image 136 rotates away from the user. The user may watch the image rotate, in what appears to be a continuous rotation, as he moves the mouse downward. After ninety degrees of such rotation about a horizontal axis, the image on canvas 100 may appear similar to image 144 shown in FIG. 7.

It is to be understood that, like images 122, 134, image 144, as well as all of the intermediate images appearing on canvas 100 during the rotation between image 134 and image 144, may be created by a three-dimensional software rasterization engine within the server that runs the web site. The rasterization engine may create the images based upon image data that is stored in the database within the server.

If image 144 does not match, i.e., differs from, the component that the user is seeking, then the user may click on Start Doodling icon 109 and then doodle on image 144 to thereby improve the resemblance between image 144 and the part being sought. After the image 144 has been thus revised via doodling, then the user may again initiate a search by clicking on Search icon 102. Because the input image is three-dimensional and generally more representative of the desired part after the user has revised images 134 and 144, the search engine may return search results that are more similar to, or a better match for, the part being sought by the user. In addition to doodling, it is also possible that the user may erase portions of image 144 in order revise the input image corresponding to that particular view.

Figure 8:
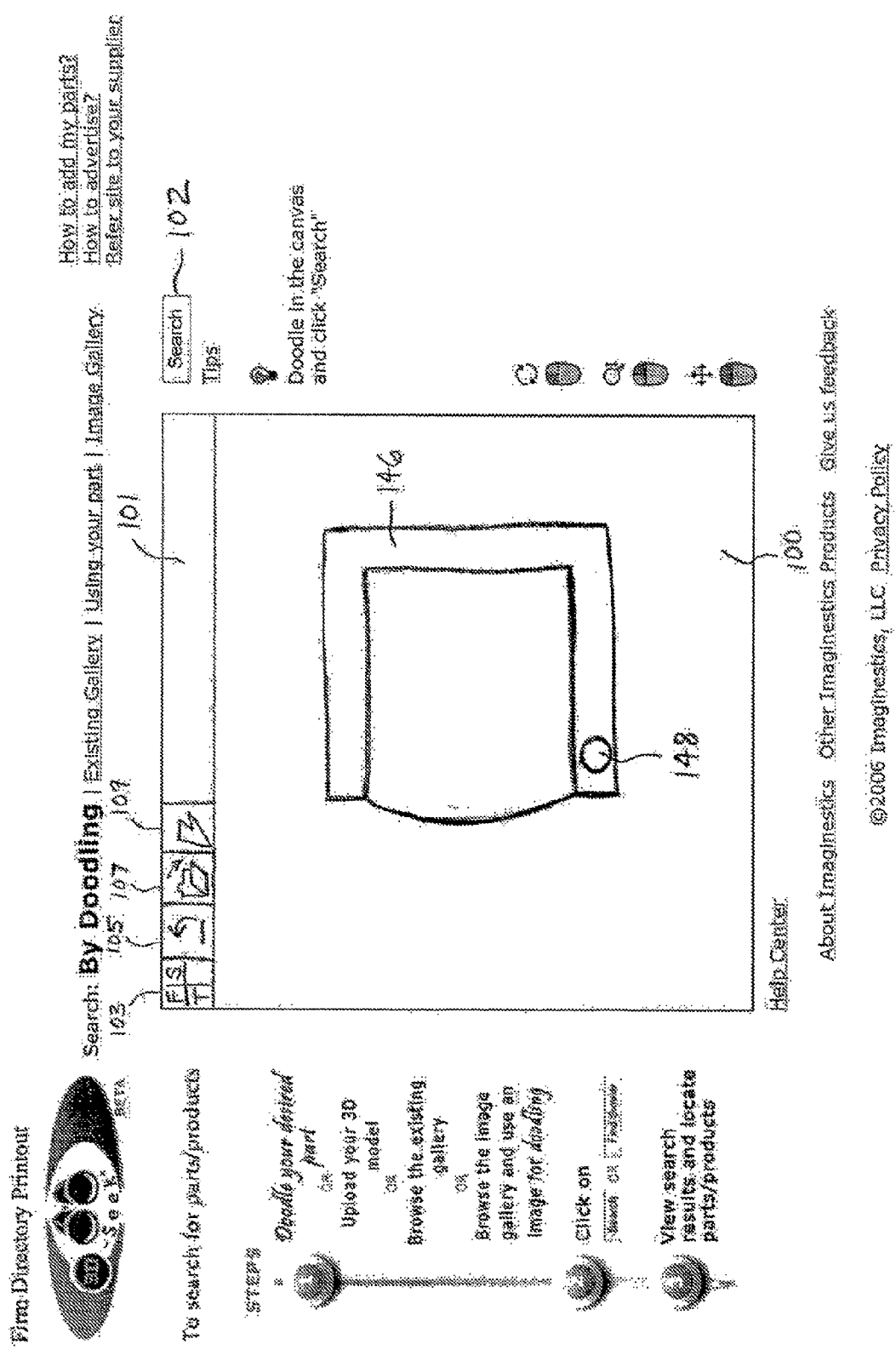
FIG. 8 is the web page of FIG. 7 after being revised by doodling by the user.

FIG. 8 illustrates an example of an input image 146 that may be created by a user doodling upon or otherwise revising image 144. In this particular example, the user may doodle onto image 144 a cup holder 148 that may have not been visible in either of doodled input images 104 and 136. After the user has created at-least-partially-doodled images 104, 136, 146, he may click on Search icon 102 to thereby initiate a search based upon all three images 104, 136, 146. Thus, the present invention enables a user to provide a three-dimensional input image of a component via a two-dimensional medium, i.e., a screen or monitor, to serve as the subject of a database search for a similar or matching component, wherein a three-dimensional image of the similar or matching component is stored in the database.

It is also possible for the user to further refine the three-dimensional input image beyond the features or details shown in the three orthographic images. More particularly, in addition to, or instead of, any or all of the three orthographic images, the user may use the mouse as indicated at 124 to orient a doodled image, uploaded image, or partially doodled and partially uploaded image in any way desired. The user may add doodlings to the images in any viewpoint or orientation. There may be no limit to the number of doodled image viewpoints that may be entered into and considered by the search engine in finding a similar or matching component in the database.

The images shown in FIGS. 2-8 do not show any internal features or internal details of the depicted component. However, it is possible, in another embodiment, for either or both the doodled images or the images returned as search results to include internal features that would not be visible to the naked human eye from the particular viewpoint. That is, either or both the doodled images or the search result images may be presented as though the viewer had "X-ray vision". Further, if included in the doodled images, such internal features may be considered by the search engine in conducting the search for a matching part in the database. In one embodiment, the user may indicate internal or obscured features by doodling them in dashed, dotted, or "phantom" lines. Similarly, the internal features of search result components may be indicated in dashed, dotted, or "phantom" lines.

In the embodiment discussed above, the user initiated a revised search by clicking on Search icon 102 only after both doodling to create image 136 from a second viewpoint and doodling to create image 146 from a third viewpoint, wherein the resulting search considered each of images 104, 136 and 146. Alternatively, the user may initiate a search immediately after creating the doodled image 136 of FIG. 6. After selecting a database component image matched thereto by the search engine, the user may rotate the database image ninety degrees and then doodle or draw a cup holder or some other revision on the database image. The user may then finally click on Search icon 102 to initiate a search based upon image 104, image 136, and the image created by the user doodling upon the search results that were based on image 136.

Thus, in the embodiments discussed above, the search may be conducted based upon three input images that may be associated with respective viewpoints that are orthogonal relative to each other. Moreover, each of the three input images may be at least partially created by the user by doodling. It is to be understood that it is possible within the scope of the invention for the search to be conducted based upon one image, two images, or more than three images. Further, if the search is based upon two or more images, there is no requirement that any of the images be associated with viewpoints that are orthogonal to one another.

Figure 9:
FIG. 9 is another embodiment of the web page of FIG. 4 after the part has been rotated ninety degrees by the user.

In an alternative embodiment, instead of requesting a search immediately after doodling image 104 of FIG. 2, the user may doodle the part from at least one other angle to thereby provide more information on which to base the search. For example, after doodling image 104, the user may hold down the left mouse button as indicated at 124 and move the mouse rightward to thereby cause right-hand edge 150 of image 104 to rotate toward the viewer and left-hand edge 152 to rotate away from the viewer about a vertical axis. Because image 104 by itself may include no depth information in a direction perpendicular to the page of FIG. 2, the rasterization engine may treat the part represented by image 104 as a two-dimensional object. Thus, after ninety degrees of rotation about a vertical axis, an image 154 (FIG. 9) in the form of a vertically oriented line segment may appear on canvas 100. The user may then click on Start Doodling icon 109 and doodle an image similar to image 136 of FIG. 6. It is possible that some erasing or other transformation of image 154 may be performed by the user in order to create an image similar to image 136. At this point, the user is in the same situation as a user who has created image 136 in a previous embodiment. That is, the user may request a search, rotate the search result image and modify it, and then request another search based upon the modified search result image. Alternatively, instead of immediately initiating a search, the user may rotate the image one or more times to add more features before initiating a search.

Figure 10:
FIG. 10 is yet another web page showing component images that are stored in a database.
Figure 11:
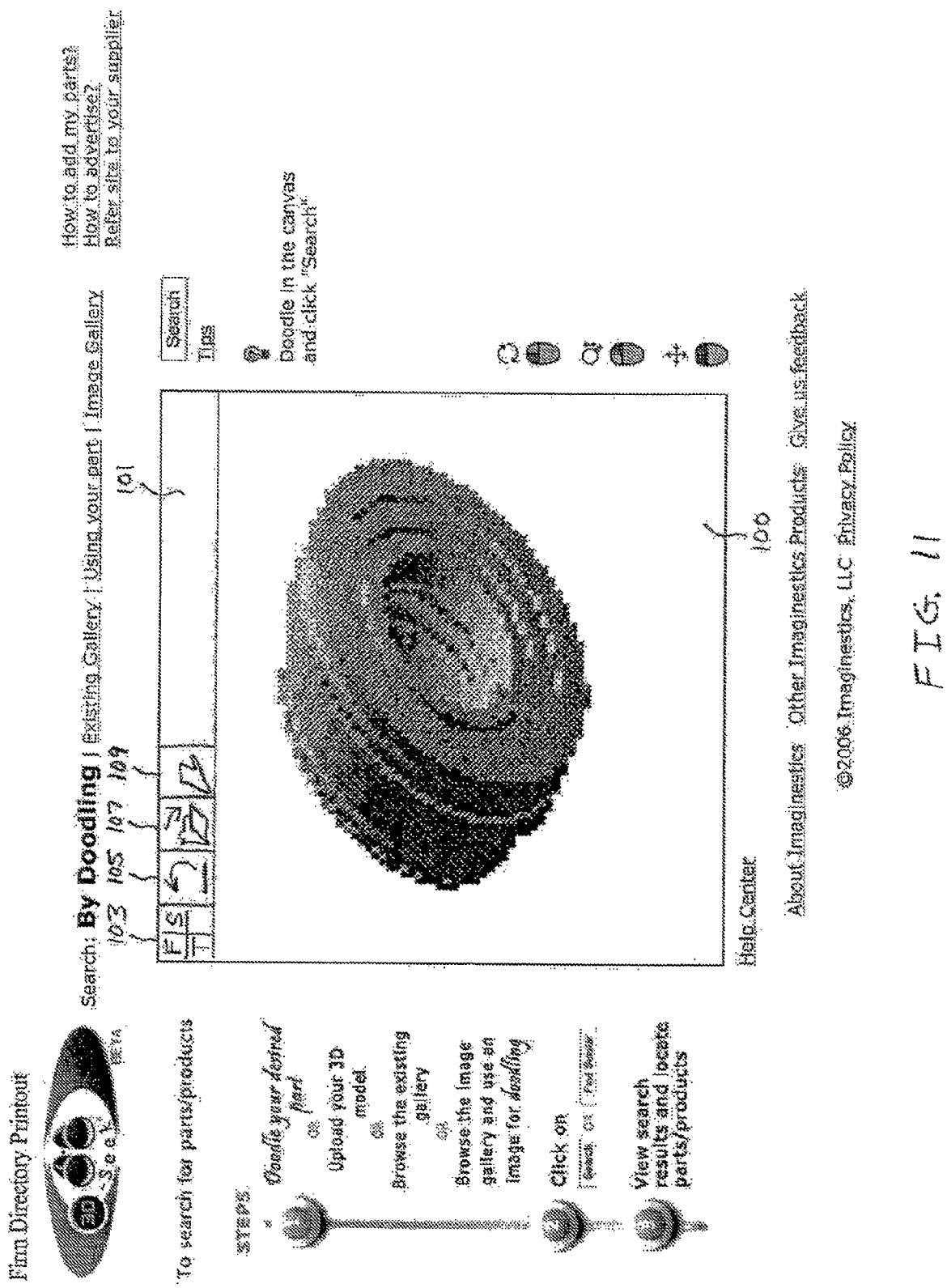
FIG. 11 is a web page having one of the component images of FIG. 10 entered onto a canvas.
Figure 12:
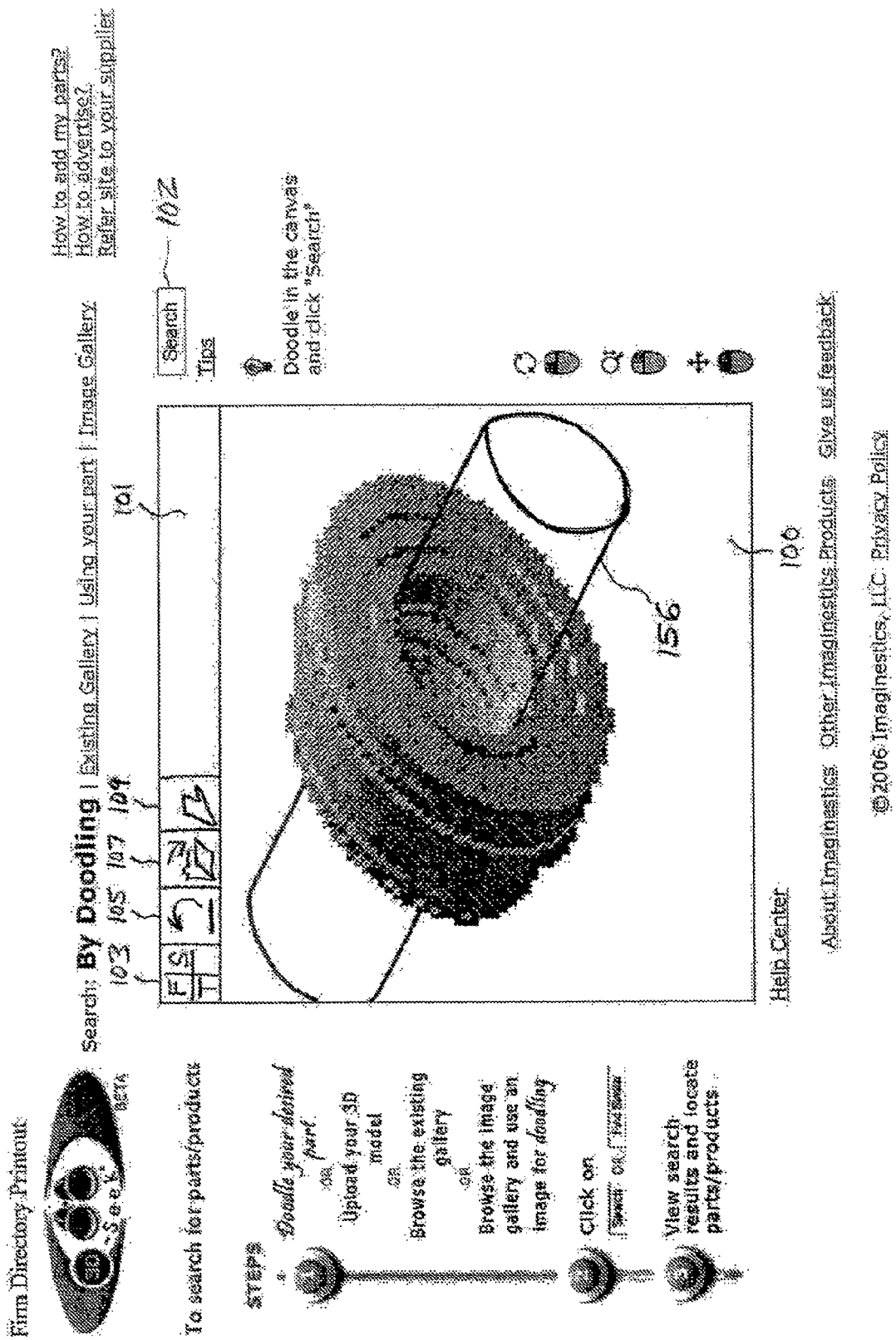
FIG. 12 is the web page of FIG. 11 after being revised by doodling by the user.

Instead of beginning the process of searching for a desired part on an empty canvas 100, the user may click on an Existing Gallery link 156 (FIG. 1) in order to be taken to a web page such as that shown in FIG. 10. The user may select one of the images in order to place that selected image on canvas 100. As shown in FIG. 10, each image may represent a respective category of part that has been frequently selected by other users. For example, the user may click on the image of the bearing at the upper left of FIG. 10 in order to have the image transferred to canvas 100, as shown in FIG. 11. The user may then click on Start Doodling icon 109 and start doodling revisions onto the image in canvas 100 of FIG. 11. For example, the user may doodle a shaft 156 (FIG. 12) extending through the bearing. The user may then click on Search icon 102 in order to initiate a search of the database. Alternatively, the user may rotate the bearing image, before or after doodling shaft 156, and doodle other features that are to be sought in a subsequent search of the parts database. The various possible search procedures may be substantially similar to those discussed above in other embodiments.

Figure 13:
FIG. 13 is still another web page showing component images from one of the categories of FIG. 10.

Alternatively, when presented with the web page of FIG. 10, the user may, instead of clicking on an image, click on one of the categories on the left-hand side of the page, or may click on a Drill Down icon 158 corresponding to that category to thereby achieve the same result. For example, a user may click on a Tooling category link 160, in order to be taken to web page such as FIG. 13 in which a plurality of images of parts that are in the Tooling category are presented. The user may either click on an image that interests him or click on a View in 3D icon 162 in order to place the image on canvas 100, as shown in FIG. 11. The user may then doodle revisions and/or initiate searches as described above and as he sees fit. In either the web page of FIG. 10 or the web page of FIG. 13, the user may click on a Find Similar icon 164 in order to be taken to a web page (not shown) including images of parts similar to the part associated with the particular Find Similar icon 164 that was clicked upon.

Figure 14A:
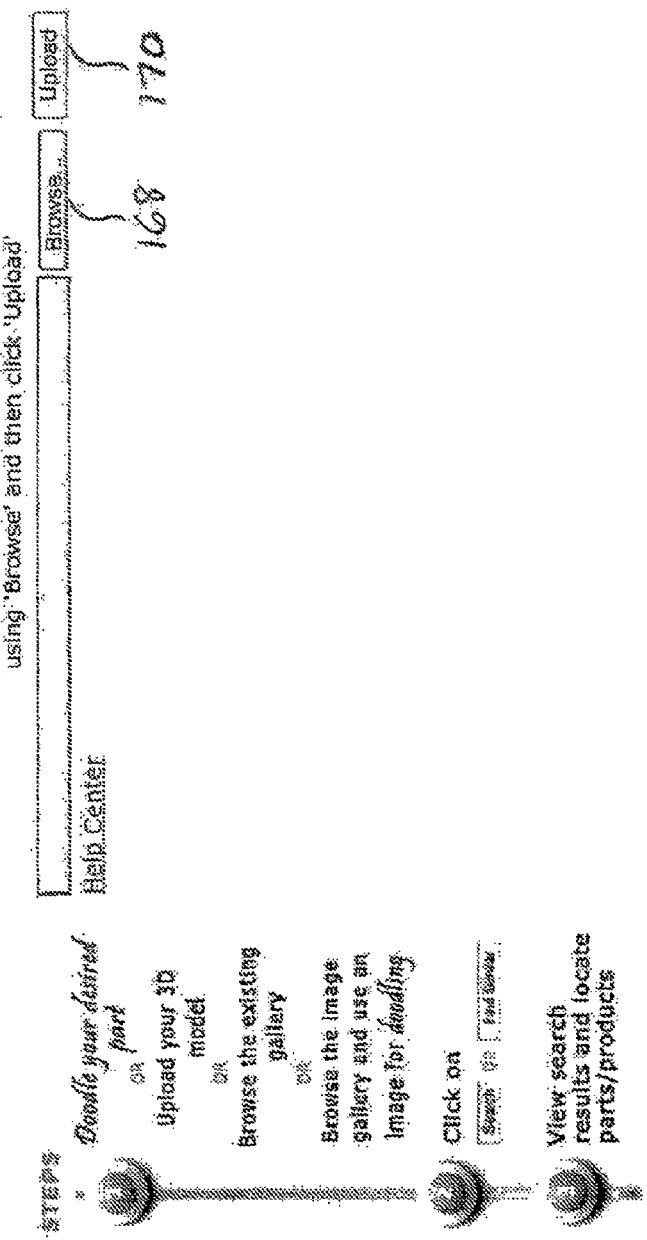
FIG. 14a is another web page for enabling a user to upload his own component image to the web site.
Figure 14B:
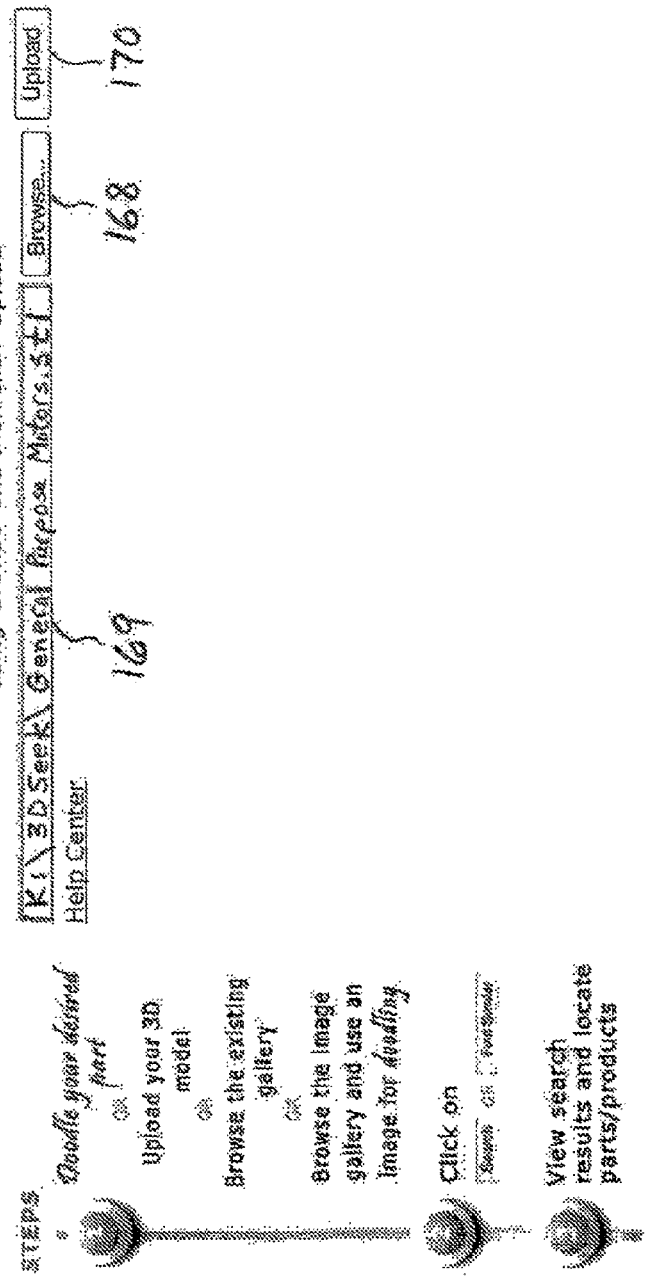

Instead of beginning the process of searching for a desired part on an empty canvas 100, or by clicking on Existing Gallery link 156, the user may click on a Using Your Part link 166 (FIG. 1) in order to be taken to a web page such as that shown in FIG. 14a. By clicking on Browse icon 168, the user may locate a stored file including image data of a part for which he would like to search. The file may be stored on the user's computer, or somewhere on a network that the user's computer may be connected to. As indicated in FIG. 14a, the user may upload files of type stl, stp, step, igs, iges, dxf, dwg, jpg or png. Of course these files types are given merely as examples, and it is possible for other types of files to be uploaded. FIG. 14b shows a stl file path that has been entered into field 169 via browsing. After the image file has been located, the user may click on Upload icon 170 to thereby upload the selected image file onto canvas 100, as shown in the web page of FIG. 14c. The user may then doodle revisions on the uploaded image after clicking on a Start Doodling icon 171. The user may also click on Fit View icon 173 to cause the image to fit canvas 100. If the user would like to use the mouse to rotate the image instead of doodling, he may click on a Mouse Zoom, Rotate or Pan icon 175. When the user is done modifying the image, he may initiate searches as described above and as the user finds appropriate.

Figure 14C:
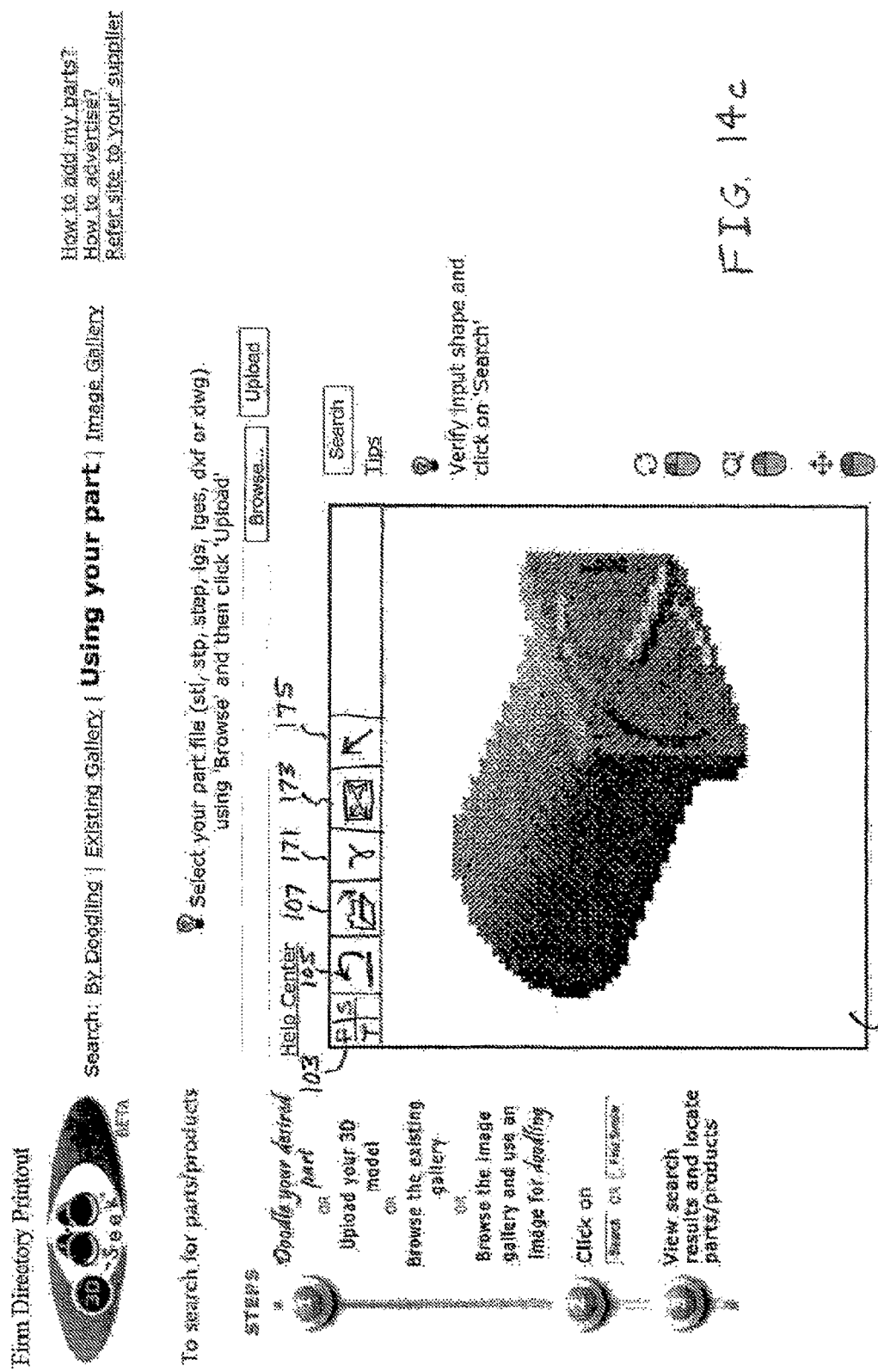
FIG. 14c is a web page showing an uploaded component image.

FIG. 14c is an example illustrating that, as mentioned above, the input image data entered onto canvas 100 may be in the form of a perspective view, rather than an orthographic view. Of course, it is also possible for a user to upload orthographic views onto canvas 100. Although the perspective view image in FIG. 14c has been uploaded by a user, it is to be understood that it is also possible within the scope of the invention for a perspective view to be entered onto canvas 100 by doodling and/or by being retrieved from the database. Regardless of how the perspective view is entered onto canvas 100, the user may iteratively rotate the image and doodle in modifications as described herein before requesting a search.

Figure 14D:
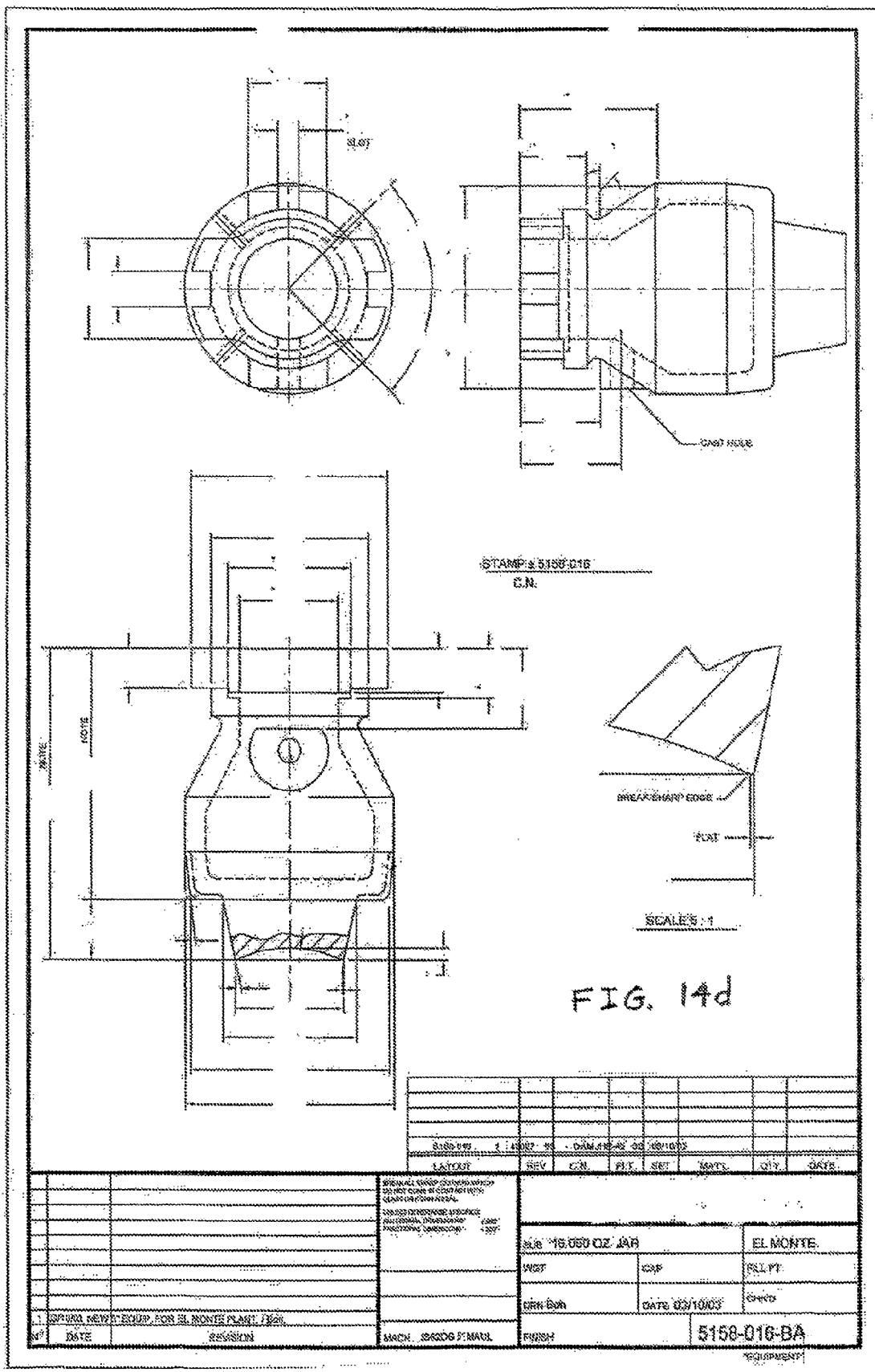
FIG. 14d is an engineering drawing that may be uploaded.
Figure 14F:
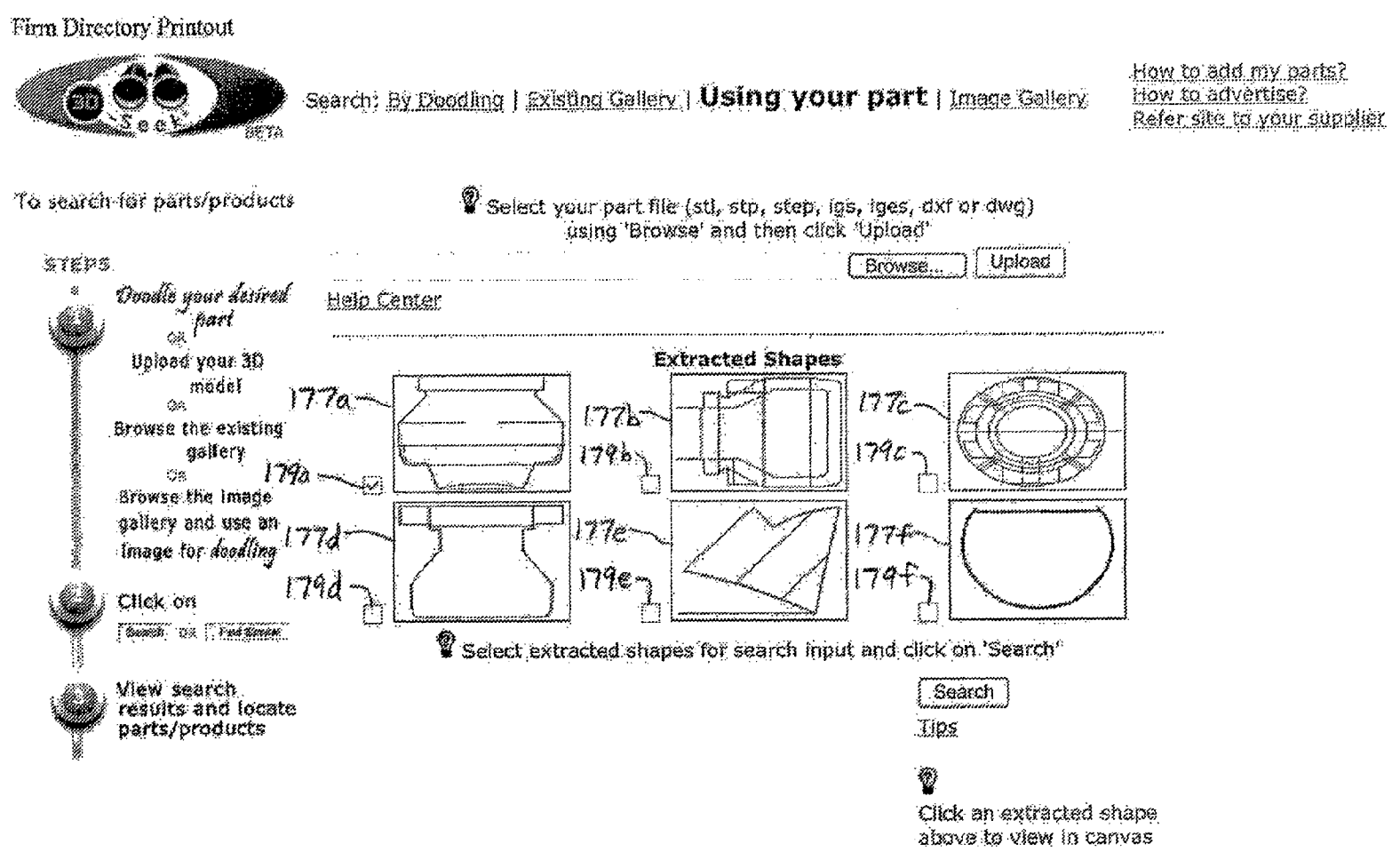
Figure 14G:
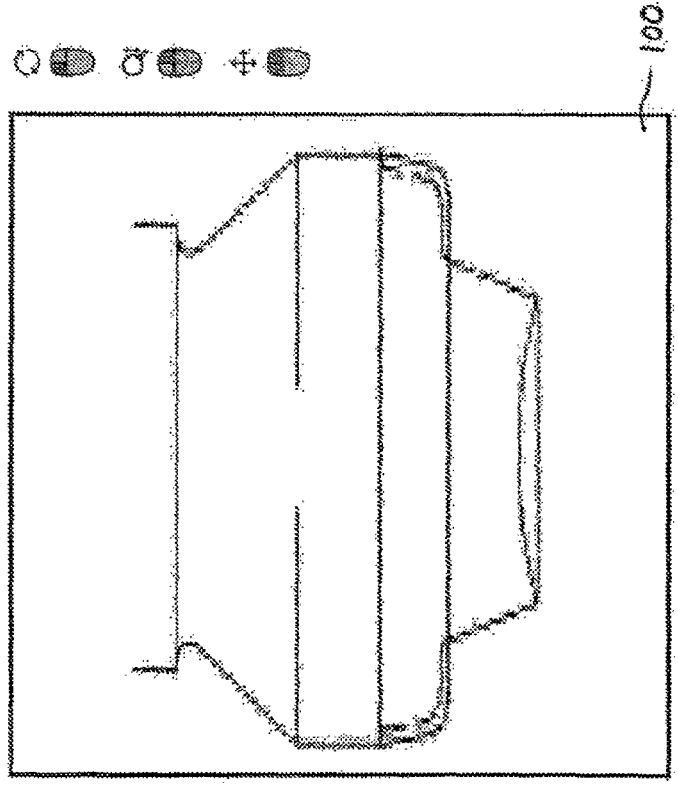
FIG. 14g is a web page showing an enlarged view of one of the component images of FIG. 14f.

FIG. 14d shows a dwg file that may be uploaded to the web site. FIG. 14e shows a dwg file path that has been entered into field 169 via browsing. After the image file has been located, the user may click on Upload icon 170 to thereby upload the selected image file onto canvas 100, as shown in the web page of FIGS. 14*f-g*. Several different extracted shapes 177*a-f* of the dwg file may be selected by the user for display within canvas 100. That is, FIG. 14*f* shows extracted shape 177*a* displayed within canvas 100, but any of the other extracted shapes 177*b-f* may also be displayed within canvas 100 by the user clicking on the extracted shape. The user may click on any combination of boxes 179*a-f* in order to include the associated extracted shapes in the search input image data. That is, the user may select any one, two, three, four, five or six of the extracted shapes to be used as input for the search. In one embodiment, the database does not include cross-sectional image information, and thus, in order to obtain good search results, the user may not want to include in the search input data any extracted shapes that were in the form of cross-sectional views.

Figure 15:
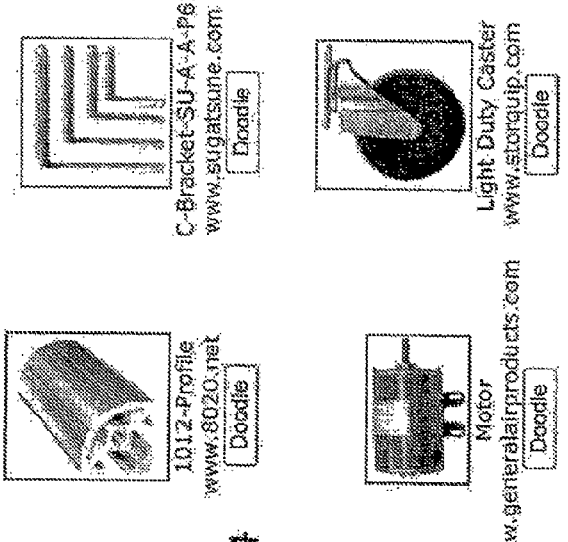
FIG. 15 is yet another web page displaying exemplary component images that are stored in the database.

Another option at the starting point of FIG. 1 is for the user to click on Image Gallery link 172, which takes the user to the web page shown in FIG. 15. This Image Gallery option may introduce the user to the concept of doodling on an existing image in order to search the database for a part incorporating both the image provided by the computer system and the doodled revisions to the image which are provided by the user. In the web page of FIG. 15, the user may click on either one of the provided images or a Doodle icon 174 associated with the image. The selected image is then provided on a canvas 100, similarly to what is shown in FIG. 4. The user may then doodle upon the image, rotate the image, and/or search for the image in the database as discussed in detail above.

In addition to Image Gallery link 172, another tool that may be provided to familiarize the user with the Search By Doodling concept is the Tips link 176 (FIG. 1) that may be located adjacent to each canvas 100. Upon clicking on Tips link 176, the user may be taken to the web page of FIGS. 16*a-d*, which includes tips and advice to the user on what doodling techniques he should use in order to obtain better search results. As FIGS. 16*a-d* make clear, it is possible for a user's doodlings to be in the form of tracing important features of an uploaded or retrieved image. Further, it is possible to conduct a search based exclusively on such traced doodlings without regard to the underlying uploaded or retrieved image.

Discussed above are novel methods of enabling a user to create a detailed three-dimensional input image for use in searching a component image database. Other novel features of the present invention are directed to methods of providing an electronic commercial showplace for component parts. Vendors of parts or products may upload their image data or model data to the database, wherein the image data or model data corresponds to component parts that are associated with the vendors. Parts that are "associated with the vendors" may include parts sold by the vendors, parts included in a vendor's products, parts that the vendor is capable of producing, or parts that are representative of the vendor's design or manufacturing capabilities, for example. Novel features of the present invention may include compiling image data to thereby form the component image database that is searched. Users of the web site may include commercial suppliers of components who would like information regarding their wares to be included in the database. The part information accessible on the database may include image data, part size, part color, purchase prices, links to the supplier's web site, model numbers, whether the part is a part stock, whether the part is in stock, etc.

Figure 17B:
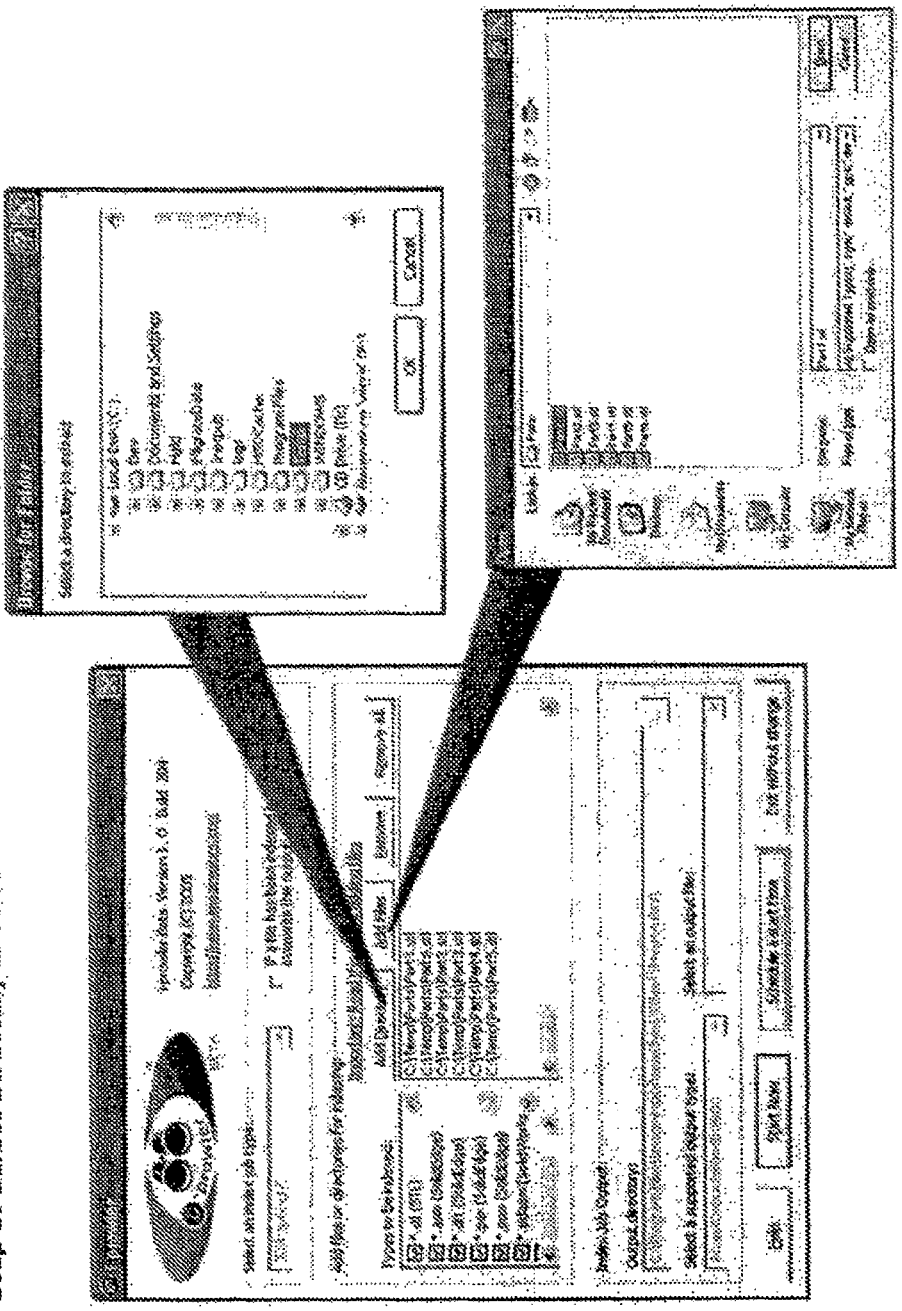
FIG. 17b is another web page advising the user about how he can add his parts to the database if he has electronic part files.

A user who is a part supplier may click on a How to add my parts? link 178 on the web page of FIG. 1, and may then be taken to the web page of FIGS. 17*a-c*. In a first step, a supplier that has electronic part files such as three-dimensional models, two-dimensional drawings, images, and pdf documents of components stored on its web site may click on icon 180 in order to download i-prowler software. The i-prowler software may enable the supplier to transfer the electronic part files from his web site to the database of the host web site so that the electronic part files may be included in searches conducted on the host web site. Before downloading the i-prowler software, the supplier may obtain more information about i-prowler by clicking on an About i-prowler link 182, which takes the supplier to the web page of FIG. 18. By clicking on a "Frequently Asked Questions about i-prowler" link 184, the supplier may be taken to the web page of FIGS. 19*a-b*, which lists questions that may be frequently asked and their respective answers. If the supplier clicks on a privacy policy link 186 in FIG. 19*a*, he is taken to the web page of FIGS. 20*a-c*.

After downloading the i-prowler software from the host web site, the supplier may run i-prowler, register his company information, and select a directory or files to index, as directed in FIGS. 17*a-b*. The supplier may then be directed to select a Start Now icon 192 (FIG. 17*c*) to immediately upload image files to the host 3DSeek server, or to select a Schedule a start time icon 194 to schedule a start time to upload image files to the host 3DSeek server.

Figure 22:
FIG. 22 is a web page enabling the supplier to enter his company information for storage in the database.
Figure 24C:
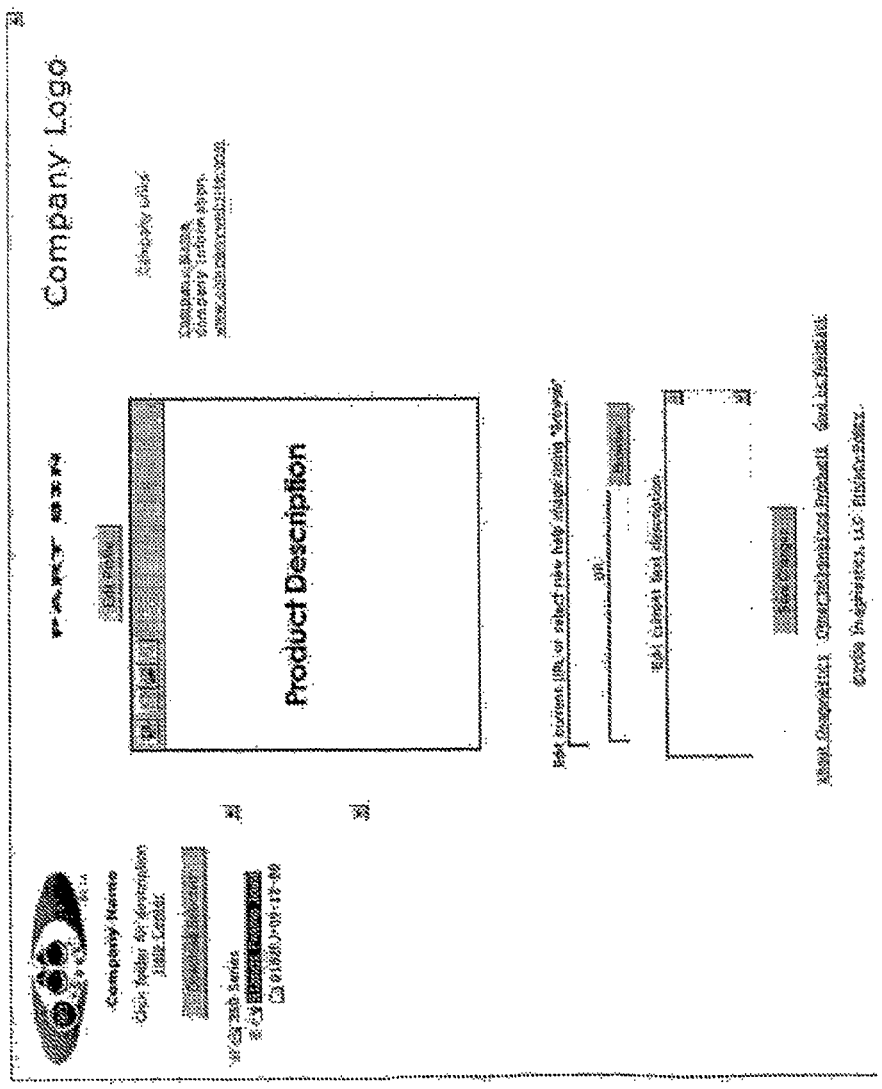
FIG. 24c is yet another web page listing questions that may be frequently asked about Part Bin and the corresponding answers.
Figure 24D:
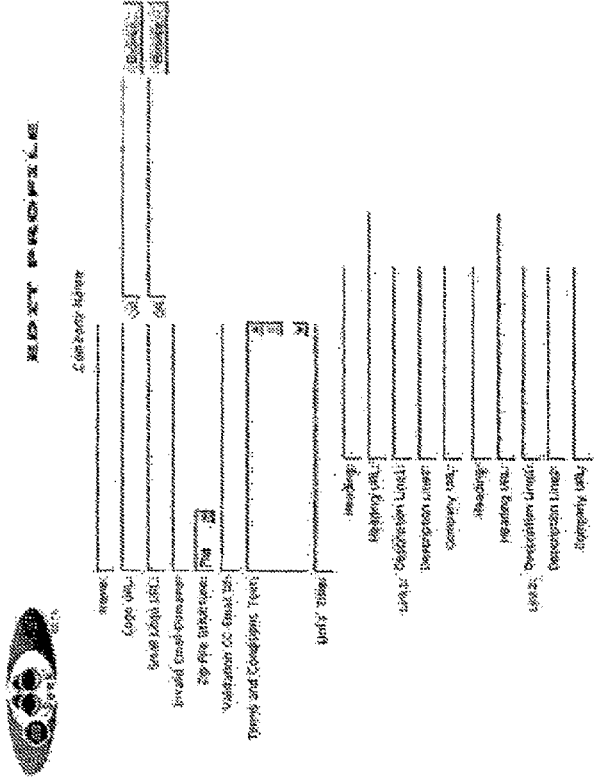
FIG. 24d is still another web page listing questions that may be frequently asked about Part Bin and the corresponding answers.

The user may click on an "I wish to upload parts directly" link 188 (FIG. 17*a*) to be taken to the web page of FIG. 21. Under "Option 1", the supplier may click on a "Sign-up for your company's own Part Bin" link 189 to be taken to the web page of FIG. 22, wherein the supplier may fill in his company's information and click on a Submit icon 190 to complete the registration.

The user may click on an "About Part Bin" link 191 (FIG. 21) to be taken to the web page of FIG. 23 wherein an explanation of Part Bin is provided. The user may also click on a "Frequently Asked Questions about Part Bin" link 193 (FIG. 21) to be taken to the web page of FIGS. 24*a-e* wherein questions about Part Bin that may be frequently asked and the associated answers are provided.

At the web page of FIG. 17*a*, the user may click on an "I wish to add my company's URL to 3DSeek's index" link 195 to be taken to the web page of FIG. 25 wherein, after filling in the URL, email address and comments, the supplier may click on a Submit icon 197 in order to complete the registration of his company's URL. Receiving such URL registrations enables the server to proactively gather component part information from suppliers' web sites without requiring the suppliers to actively submit their component part information. Thus, an index of part vendor web sites may be compiled wherein the part vendors have granted permission to extract image data and other component part information from the web sites. The server may then extract the image data from the vendor web sites, and store the gathered component part information in the database, where it may be searched by purchasers seeking a part with particular characteristics. The image data may be uploaded to the database via a host web site, wherein the uploaded image data is associated with component parts that are sold by the vendors. A purchaser may than enter image data onto the host web site, wherein the image data represents a component that the purchaser would like to buy. The purchaser may request a search of the database for vendor image data matching the purchaser image data. A matching vendor image and vendor information may be displayed to the purchaser on the host web site, wherein the vendor information is associated with the matching vendor image data.

Figure 26C:
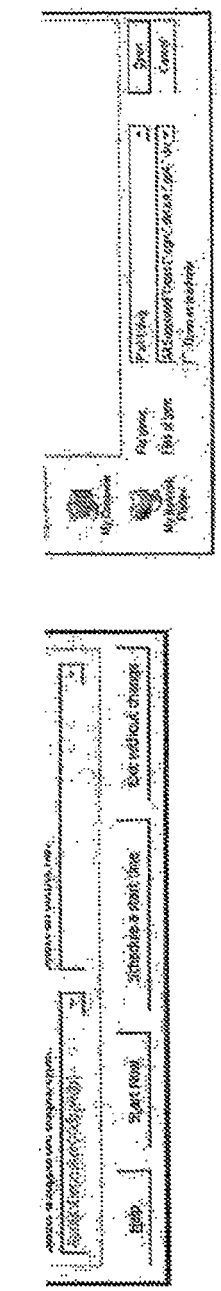
FIG. 26c is yet another web page advising the supplier how to convert two-dimensional drawings to three-dimensional models for indexing.

The user may click on an "I wish to convert 2D drawings to 3D models for indexing" link 202 (FIG. 17a) to be taken to the web page of FIGS. 26a-c. The supplier may then click on the "Enter company information and select option" link 216 to thereby be taken to the web page of FIG. 27. After filling in the company information fields in FIG. 27 and selecting Option A or Option B, the supplier may click on a Submit icon 218 to thereby complete the registration.

Figure 28C:
FIG. 28c is yet another web page advising the user how to add his parts/products to the database if he has two-dimensional drawings, has a two-dimensional catalog, and wishes to create an interactive three-dimensional web catalog.
Figure 30:
FIG. 30 is a web page enabling the supplier to enter his company information for storage in the database.

If the supplier clicks on link 204 in FIG. 17a, he may be taken to the web page of FIGS. 28a-c. The supplier may then click on the View the pricing sheet for 3D-Config. link 220 (FIG. 28a) to thereby be taken to the web page of FIG. 29, which may be a pdf file containing pricing and other information. The supplier may also click on the "Enter company information" link 222 (FIG. 28a) to thereby be taken to the web page of FIG. 30. After filling in the fields in FIG. 30, the supplier may click on a Submit icon 210 to thereby complete the registration. The user may then download and install i-prowler (Step 2; FIG. 28a), run i-prowler and register his company information (Step 3), and Select directory or files (Step 4; FIG. 28b).

Figure 32:
FIG. 32 is a web page enabling a standard part manufacturer to select parts from a standard parts list.

If the supplier does not have electronic part files on his web site, then he may click on a "I do not have electronic part files" link 196 (FIG. 17a), which may take him to the web page of FIG. 31. The supplier may then click on the "Select parts from the standard parts list" link 212 to thereby be taken to the web page of FIG. 32. After selecting one or more of the part categories listed in FIG. 32, the supplier may click on a Submit icon 208, and the supplier may be taken to the web page shown in FIG. 30. After filling in the fields in FIG. 30, the supplier may click on Submit icon 210 to thereby complete the registration.

Figure 34:
FIG. 34 is a web page enabling a custom part manufacturer to select parts from a custom parts list.

At the web page of FIG. 31, the supplier may also click on link 213 to thereby be taken to the web page of FIG. 33. The supplier may then click on the "Select parts from the custom parts list" link 215 to thereby be taken to the web page of FIG. 34. After selecting one or more of the part categories listed in FIG. 34, the supplier may click on a Submit icon 217, and the supplier may be taken to the web page shown in FIG. 30. After filling in the fields in FIG. 30, the supplier may click on Submit icon 210 to thereby complete the registration.

Figure 36:
FIG. 36 is a web page on which a user may order an advertisement on the web site of the present invention.

In addition to, or as an alternative to, adding his parts to the database, a part supplier type of user may also click on a How to advertise? link 224 on the web page of FIG. 1, and may then be taken to the web page of FIGS. 35a-d. The supplier may click on an Order Now icon 226 to be taken to the web page of FIG. 36. The user may click on a Terms and Conditions link 228 to be taken to the web page of FIGS. 37a-b. After the user has returned to the web page of FIG. 36 and has filled in the fields in FIG. 36, he may click on an Order icon 230.

In addition to, or as another alternative to, adding parts to the database, and clicking on How to advertise? link 224, a user may also click on a "Refer site to your supplier" link 232 on the web page of FIG. 1, and may then be taken to the web page of FIG. 38. After filling in the fields of FIG. 38, the user may click on a Send Email icon 234 to thereby send an email to the user's supplier. The email may identify the sender of the email as the supplier's customer/prospect, make the supplier aware of the web site, provide an electronic link to the web site, and explain the advantages to the supplier of registering his parts on the web site.

Shown in FIG. 39 is one embodiment of a networked computer system 236 of the present invention which is suitable for implementing one or more of the methods of the present invention. System 236 includes a server 238 connected to the Internet 240, also known as the world wide web. Also connected to the Internet 240 are vendor computers $242_1, 242_2, \ldots, 242_n$. Further connected to the Internet 240 are purchaser computers $244_1, 244_2, \ldots, 244_m$. Connected to each purchaser computer 244 is a respective monitor 246 and a respective mouse or pen device 248. Server 238 may include a rasterization engine 250, a search engine 252, and an image database 254.

Image database 254 may include a compilation of vendor image data that is received, such as via i-prowler software and Internet 240, from vendors 242. Input image data may be received in search engine 252 from purchaser computers 244 via Internet 240. The purchaser may upload input image data of a component that he is seeking to search engine 252, may draw input image data on monitor 246 by use of a mouse or pen device 248, or some combination of the two. Further, the purchaser may create input image data by drawing on an image retrieved from database 254.

Based upon the input image data, search engine 252 may find matching or at least similar vendor image data in image database 254. Rasterization engine 250 may process the matching vendor image data so that a matching vendor image may be displayed on monitor 246. Rasterization engine 250 may also process three-dimensional image data such that monitor 246 may display images based thereon from any possible viewpoint in three-dimensional space. Further, rasterization engine 250 may enable the image displayed on monitor 246 to be continuously updated as the purchaser rotates the displayed image about any axis he desires. The purchaser may view search result images on monitor 246, modify the search result images with mouse/pen 248, and request new search results based upon the modified images. The purchaser may continue the cycle of receiving search results, modifying the resulting images, and requesting new search results based thereon with as many iterations as he desires.

In another embodiment, shown in FIGS. 40-47, the user is presented with a three-dimensional input canvas, drawing cube tool, input image space or "cubic" 300, which may or may not be provided within a conventional canvas 100 as shown. Cubic 300 is a six-sided canvas, of which a front face 302, a right face 304 and a top face 306 are visible in FIG. 40. Each of the six faces of cubic 300 may present a component part with cubic 300 at a respective orthographic viewpoint. However, it is also possible for each of the six faces of cubic 300 may present a component part with cubic 300 at a respective perspective viewpoint. The user may doodle his desired part in one, two, three, four, five or six of the faces of cubic 300 and then request a search based thereon. Alternatively, the user may upload his own image data into cubic 300 and doodle thereupon in order to create input for the search. As another alternative, the user may retrieve image data from the database for display in cubic 300, and may then doodle upon those images in order to create input for the search.

Figure 41:
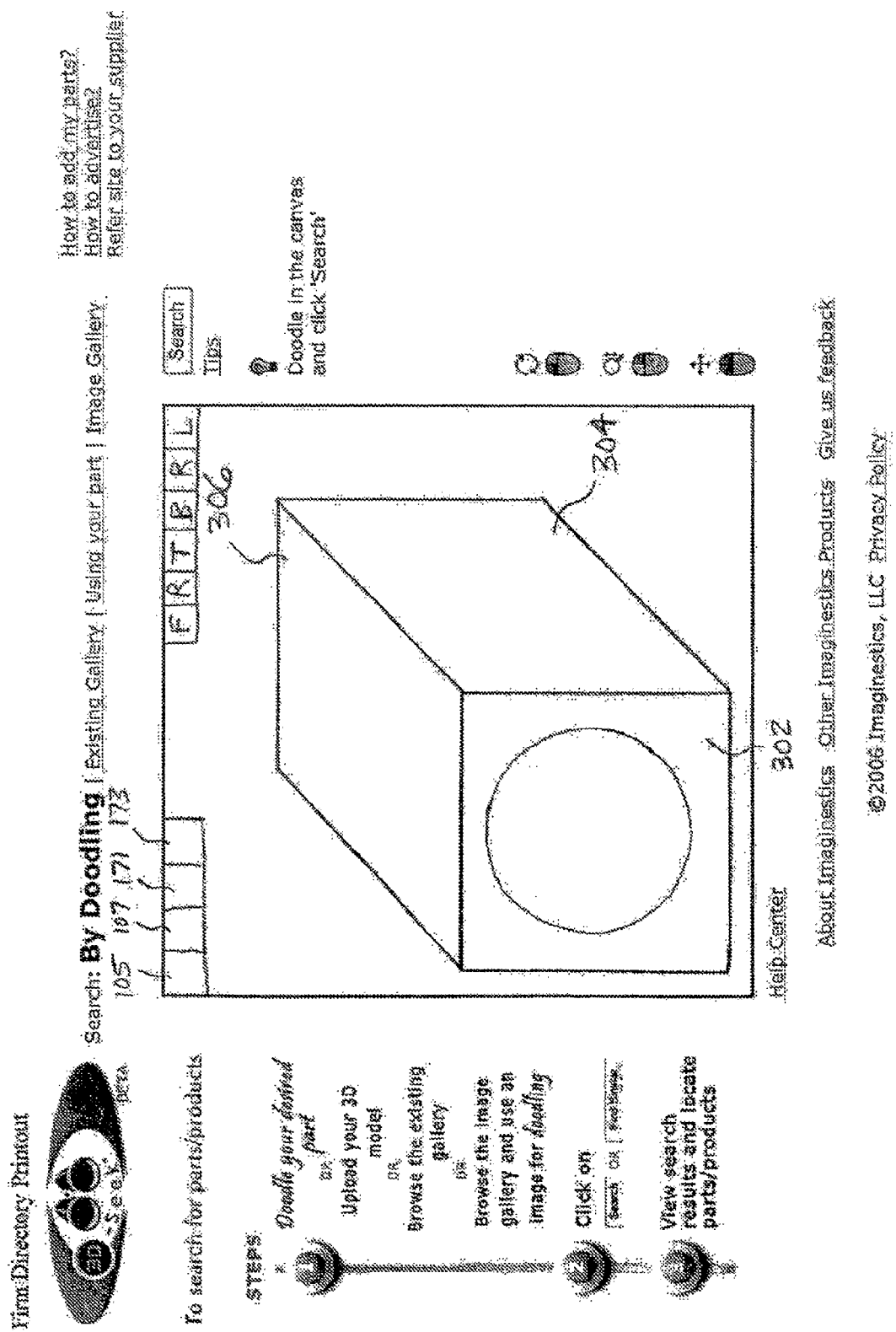
FIG. 41 is the web page of FIG. 40 after a user has entered a front view of an object.
Figure 42:
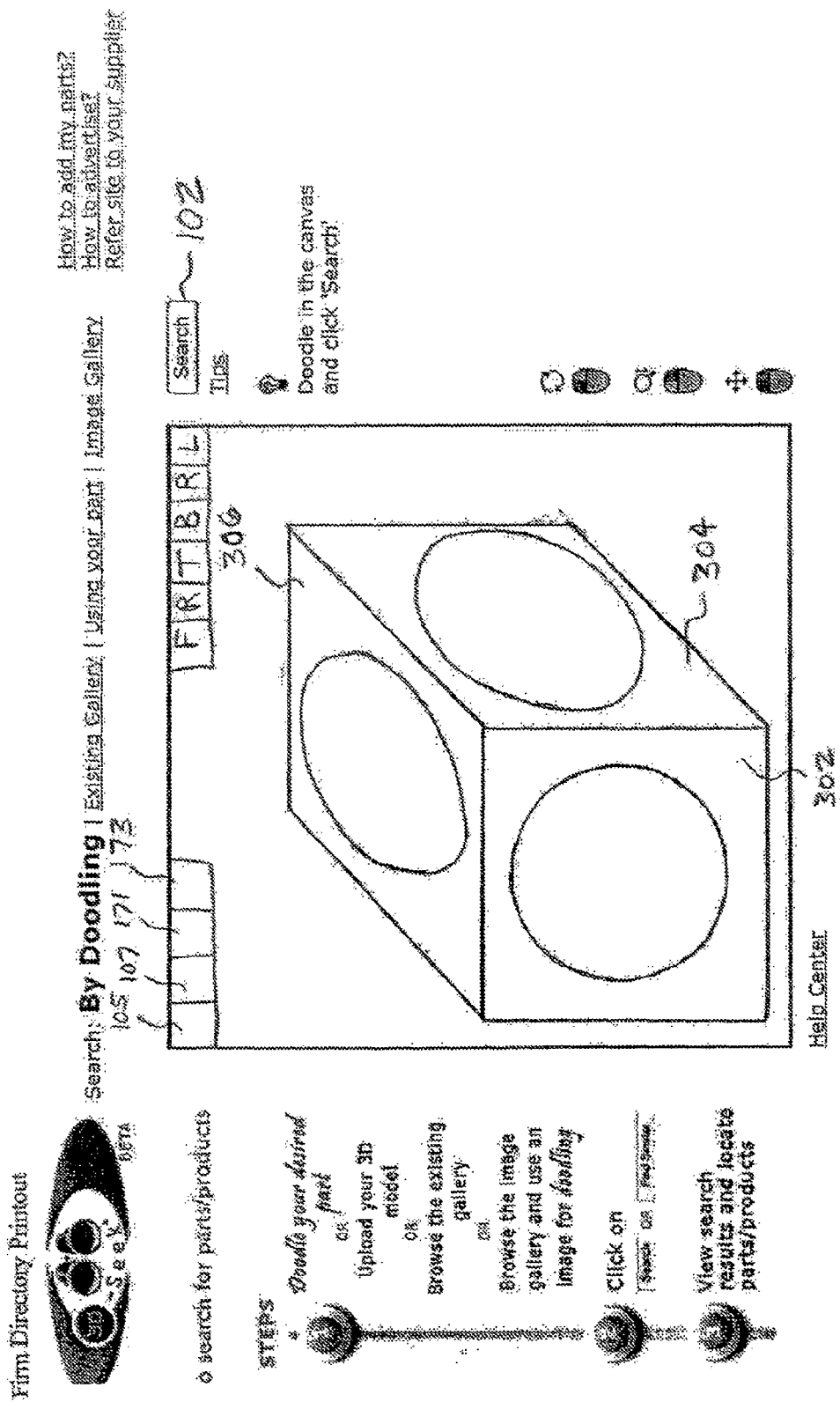
FIG. 42 is the web page of FIG. 41 after a user has added a right side view and a top view.

In the simple example of FIGS. 41-45, the user doodles a part in the shape of a sphere, such as a ball bearing, into cubic 300. In FIG. 41, the user begins by drawing a circle in front face 302. The user may then draw a side view of the sphere in face 304 and a top view of the sphere in face 306, as shown in FIG. 42, wherein the sphere appears as an ellipse from the right and top perspectives. It is possible for the user to request a search based upon one, two, three, four, five or six views entered into cubic 300. Thus, it is possible in FIG. 42 for the user to request a search by clicking on Search icon 102. However, it is also possible for the user to further doodle in any or all of the three remaining faces before requesting a search, as will be clearer after the discussion below.

Figure 40:
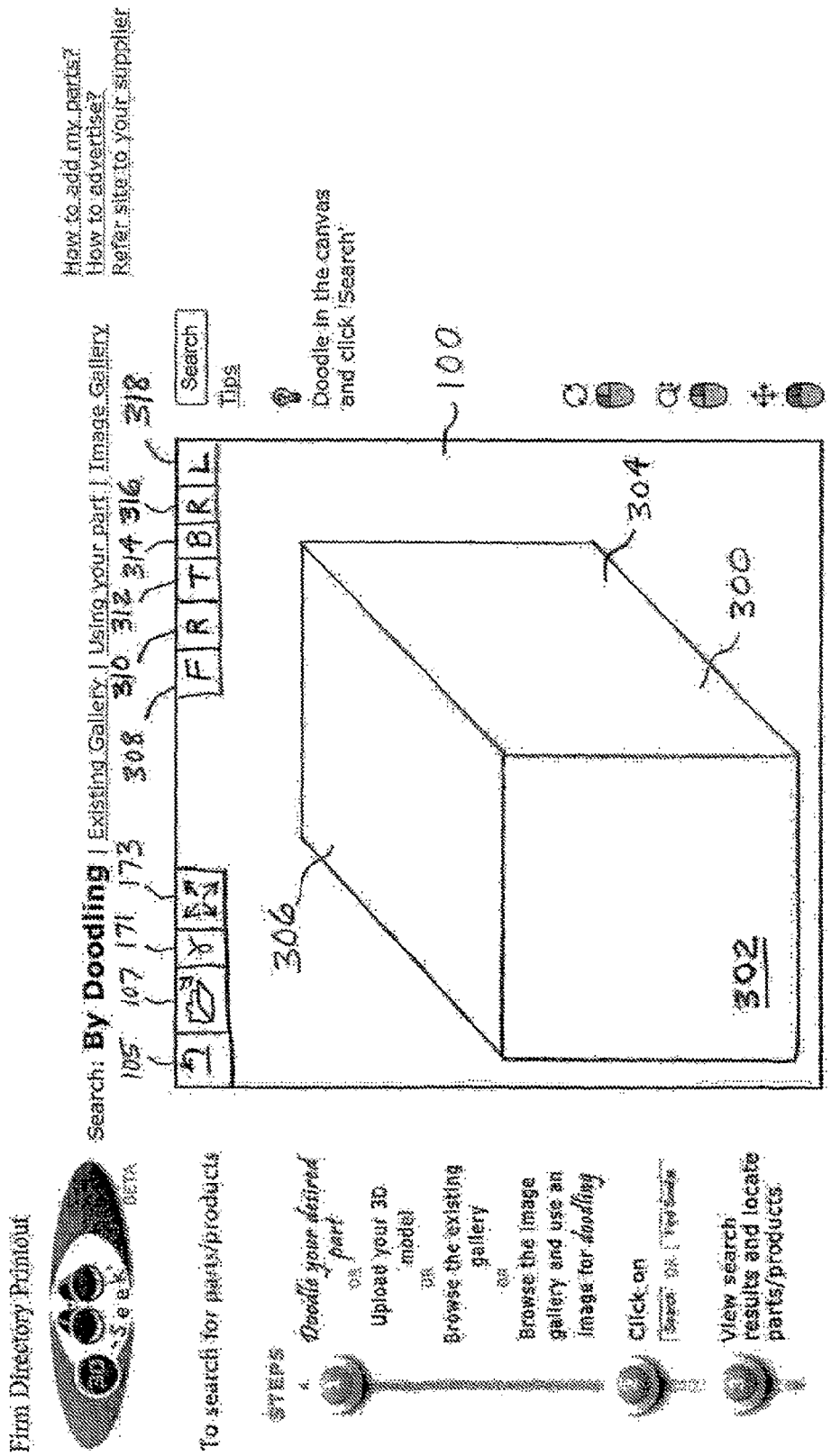
FIG. 40 is a web page showing the use of a cubic to enable a user to input three-dimensional image data.
Figure 43:
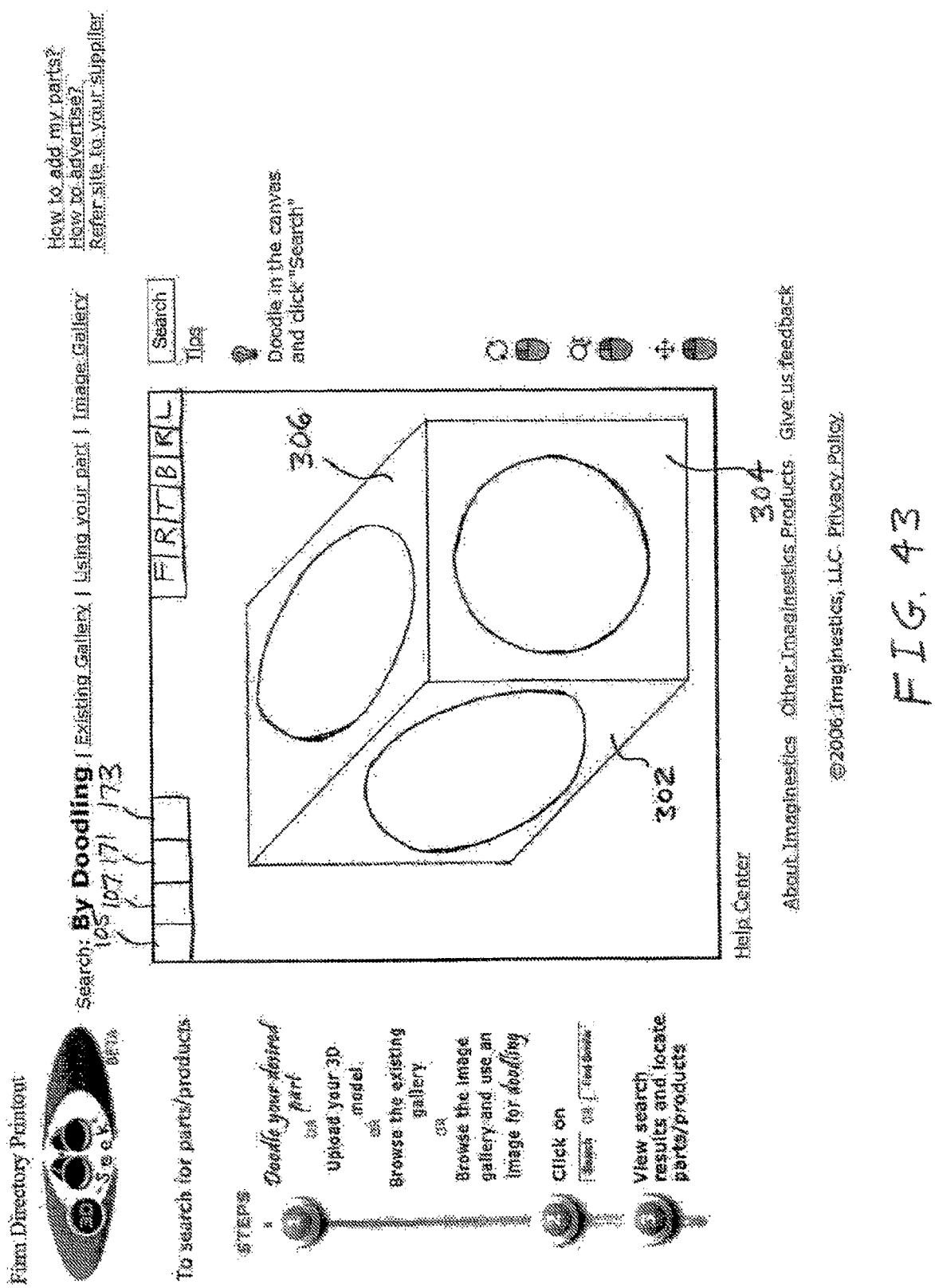
FIG. 43 is the web page of FIG. 42 after the user has rotated the right face toward him.

The user may find it easiest to doodle on a face when he views the face from a perpendicular angle, as he does front face 302 in FIGS. 40-42. Thus, the user may click on any of a front face icon 308, a rear face icon 310, a top face icon 312, a bottom face icon 314, a right face icon 316 or a left face icon 318 in order to cause that particular face to be oriented perpendicularly to the direction of view. For example, after drawing in the circle and two ellipses in FIG. 42, the user may click on right face icon 316 to orient cubic 300 as shown in FIG. 43, wherein the user may more easily doodle any modifications in right face 304. The user may further doodle modifications onto the ellipse in top face 306 as shown in FIG. 43, or the user may click on top face icon 312 so that the top view is presented as a circle, which he may be able to more easily modify.

Figure 44:
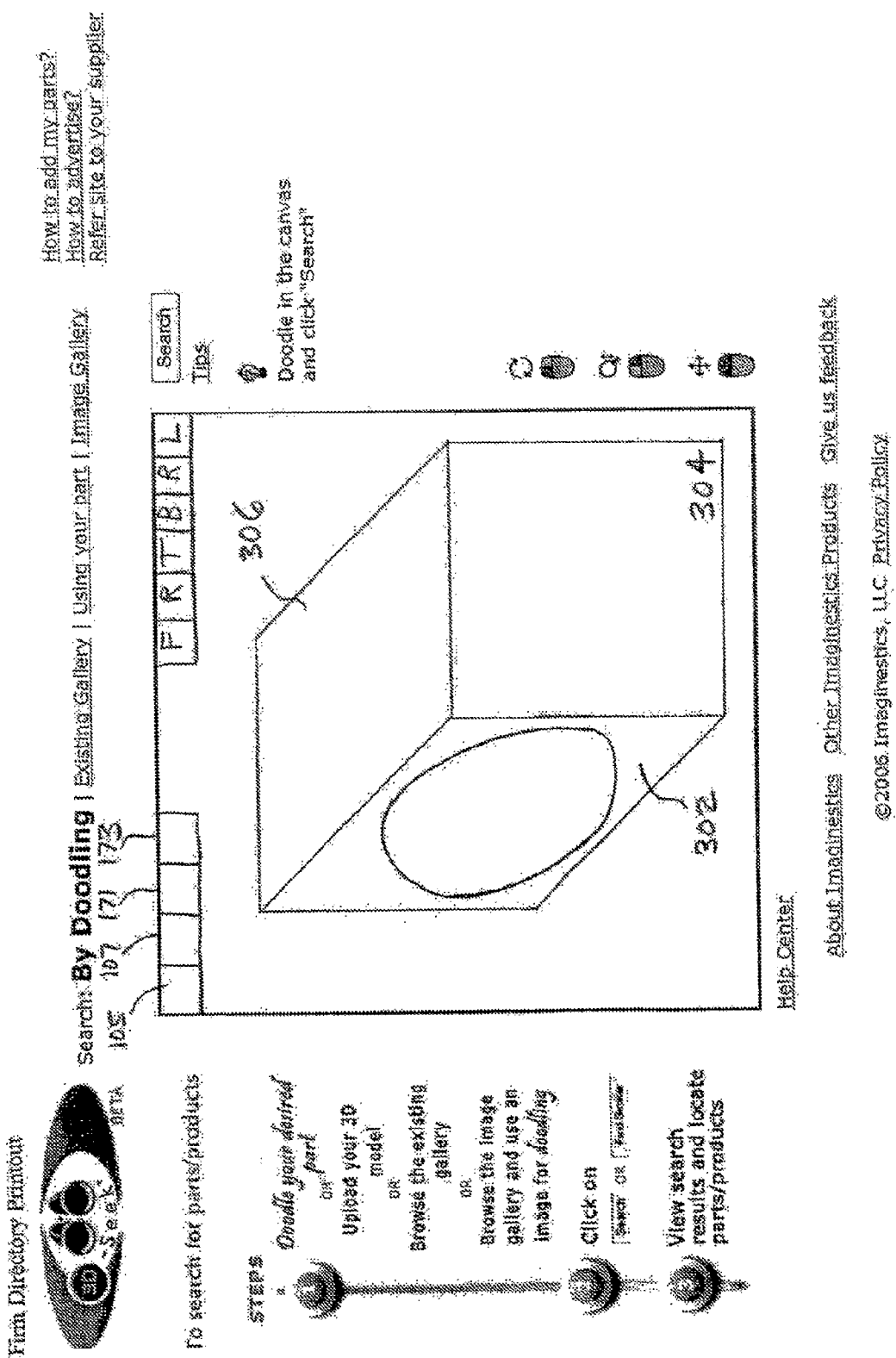
FIG. 44 is the web page of FIG. 41 after the user has rotated the right face toward him.
Figure 45:
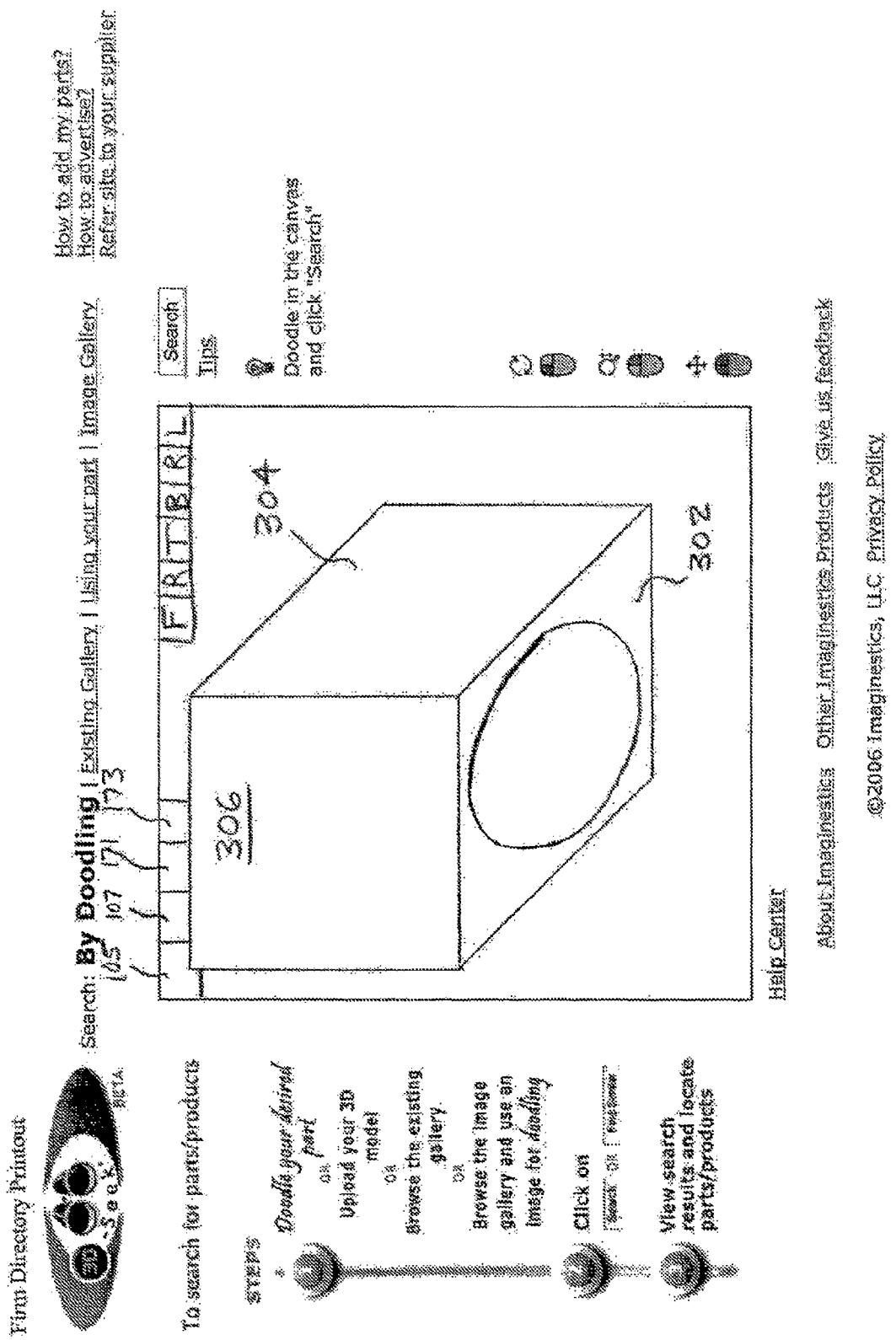
FIG. 45 is the web page of FIG. 41 after the user has rotated the top face toward him.

Instead of drawing ellipses, the user, after drawing the circle in FIG. 41, may immediately click upon right face icon 316 to orient cubic 300 as shown in FIG. 44. The user may then simply doodle a circle in right face 304 before either drawing an ellipse in top face 306 or clicking on top face icon 312 in order to draw a circle in top face 306. Alternatively, the user, after drawing the circle in FIG. 41, may immediately click upon top face icon 312 to orient cubic 300 as shown in FIG. 45. The user may then simply doodle a circle in top face 306 before either drawing an ellipse in right face 304 or clicking on right face icon 316 in order to draw a circle in right face 316. It is to be understood that a search may be requested at any point after doodling one or more views onto cubic 300

The slightly more complex example of a table doodled into cubic 300 is shown in FIG. 46a. A perspective view of the table is provided in FIG. 46b in order to make clear to the reader of this document what the table may look like. However, the perspective view may not be employed in any way in the invention itself.

Another example including a cylinder doodled into cubic 300 is shown in FIG. 47a. Again, a perspective view of the cylinder is provided in FIG. 47b in order to make clear to the reader of this document what the cylinder may look like. However, the perspective view may not be employed in any way in the invention itself.

Figure 46:
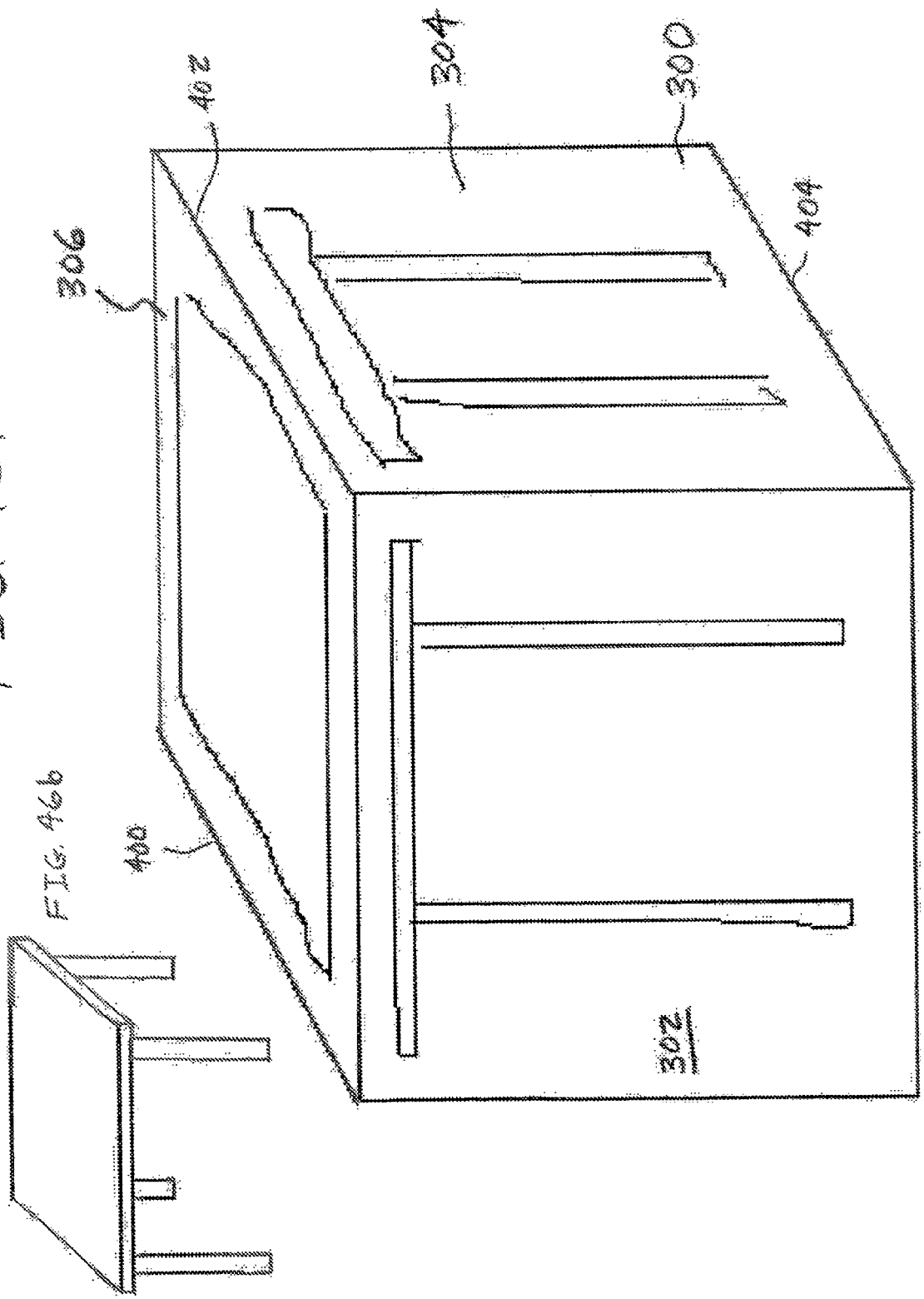
Figure 47:
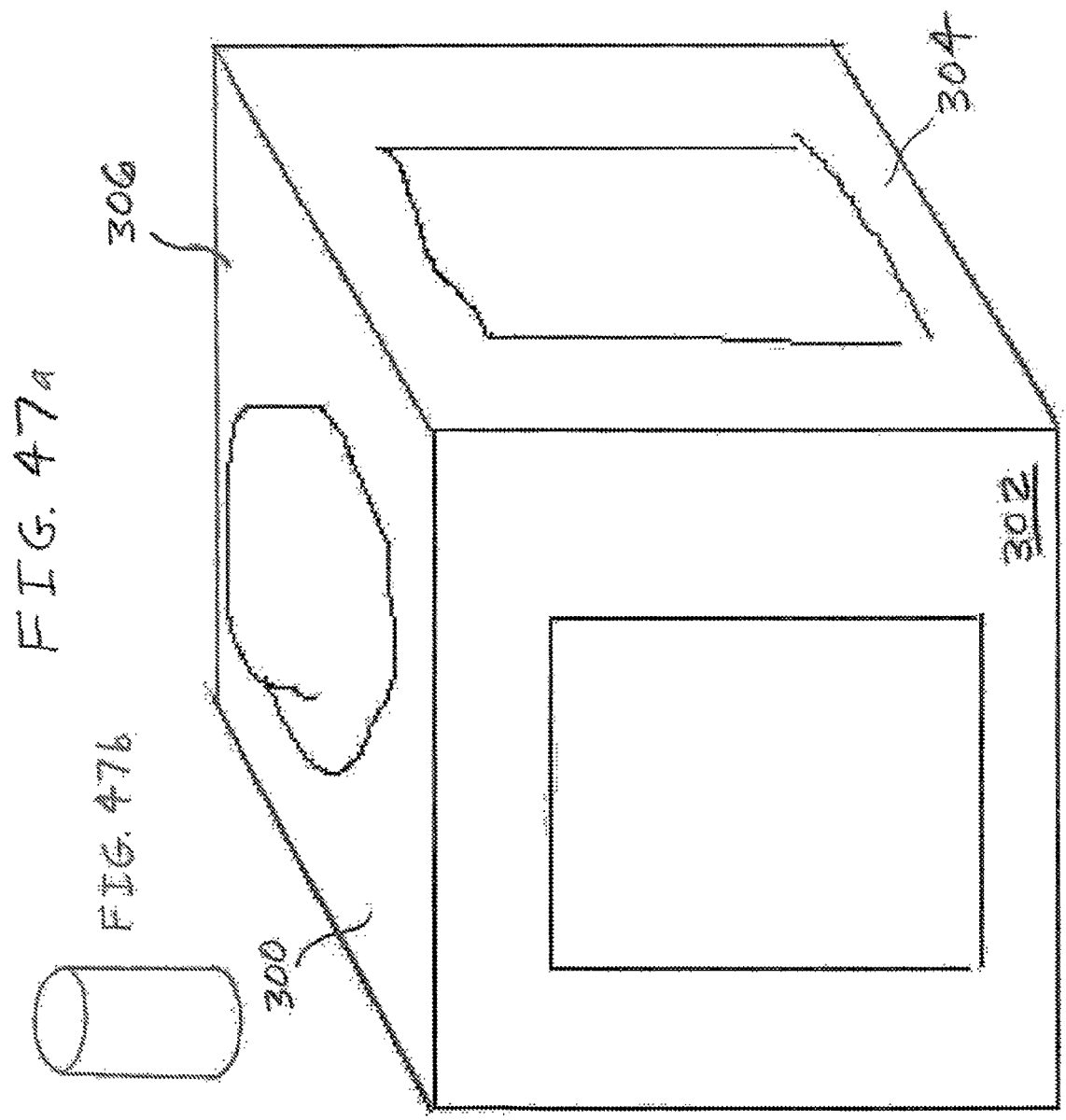

As made clear in FIGS. 46-47, it is possible for all six faces of cubic 300 to be square-shaped. That is, all twelve edges of cubic 300 may be substantially equal in length. Of course, when viewed in perspective, the edges 400, 402, 404 extending away from the viewer may be provided with shorter lengths on the screen because of the viewing angle.

It is also possible for each of the six faces to be color coded so that the user may more easily keep track of which viewpoint he is looking at the part from. For example, the front face may be outlined in red, the right face outlined in green, etc. Further, these respective colors may be included in icons 308-318 for additional user friendliness.

It has been found that the natural inclination of a user is to draw a part as he sees it, i.e., in a perspective view. However, search engines are better able to process orthographic views than perspective views. The embodiment of FIGS. 40-47 has the advantage of forcing the user to think in terms of orthographic views, and to draw orthographic views as input for the search, which may lead to better search results.

FIG. 48 illustrates a page of another embodiment of a web site that may be used to implement the method of the present invention. The web page, which may appear on a user's monitor, includes a canvas 500 having vertical and horizontal gridlines. Within canvas 500, a user may doodle, sketch or draw a desired component, i.e., "part", that he would like to find, locate, or obtain. Toolbar 501 includes a Doodle icon 503, a Straight Line Drawing icon 505, a Circle Drawing icon 507, a Rectangle Drawing icon 509, an Arc Drawing icon 511, an Undo icon 513, a Redo icon 515, an Erase icon 517, and a Select icon 519. Clicking on icons 505, 507, 509 and 511 enables a user to draw a line, circle, rectangle and arc, respectively, by selecting two or three defining points.

Figure 49:
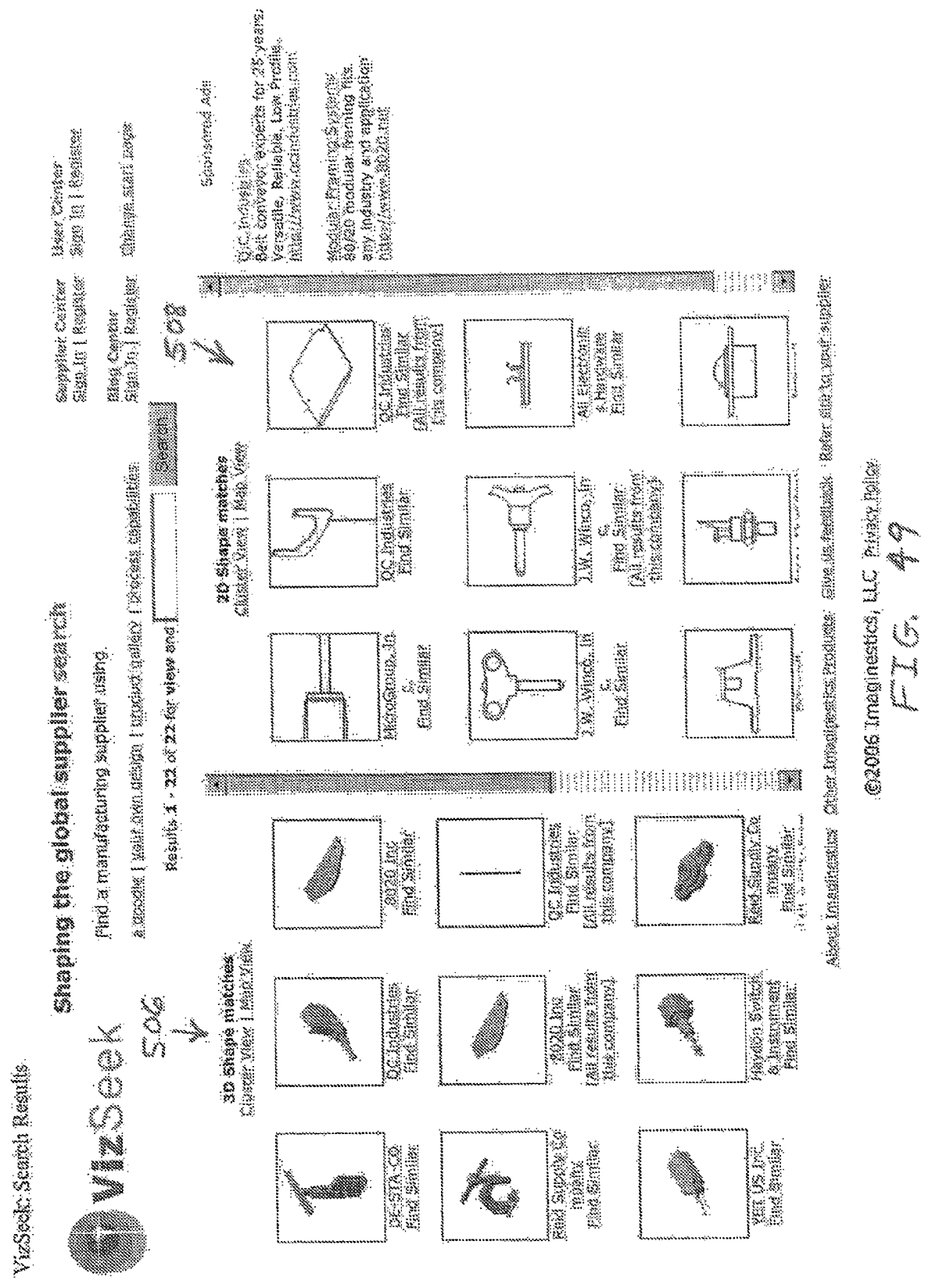

After the user has drawn an image on canvas 500 and clicked on search icon 502, the server may respond with a web page having a format similar to that shown in FIG. 49. The web page may provide a list of search results including component images divided between three-dimensional shapes 506 and two-dimensional shapes 508.

Figure 50:
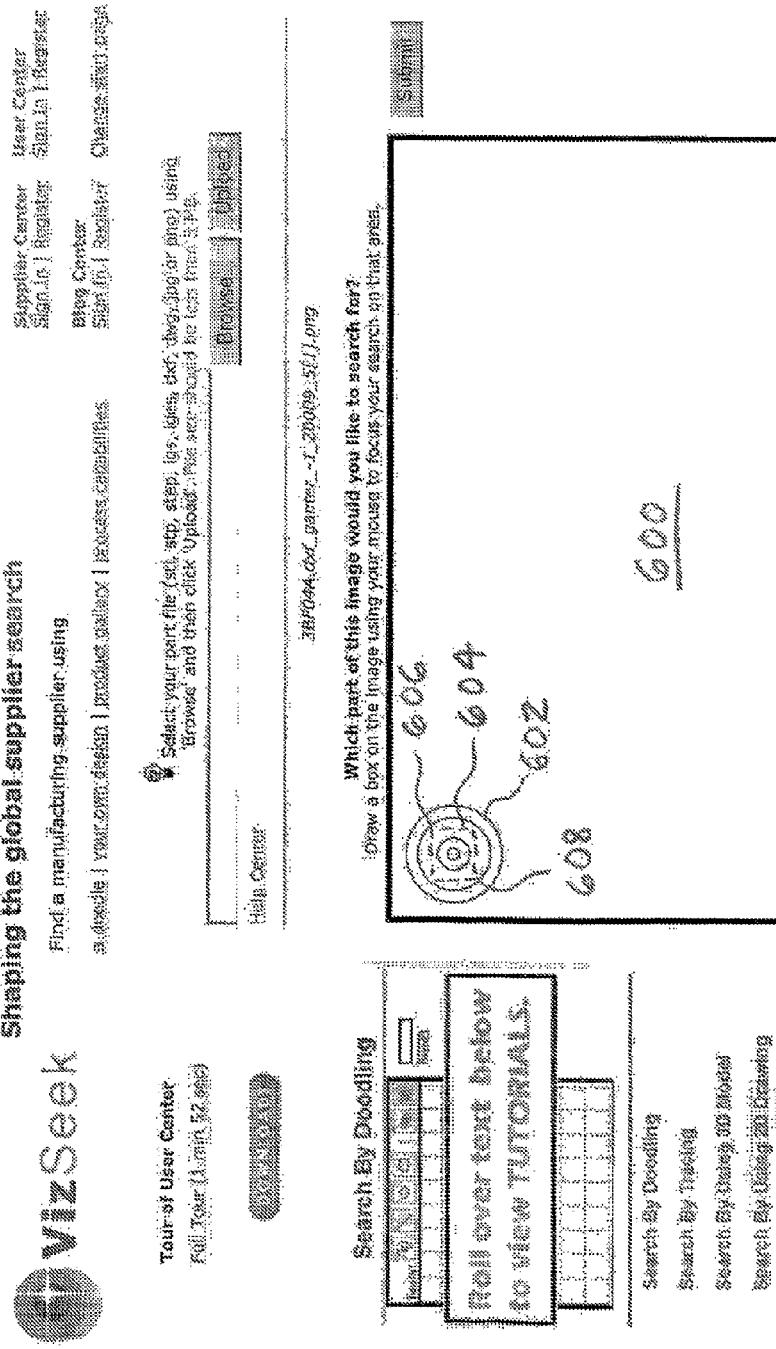
FIG. 50 is another web page for enabling a user to upload his own component image to the web site.

FIG. 50 is a web page similar to the web page of FIG. 14c that enables a user to upload a selected image file onto canvas 600. The web page of FIG. 50 has the additional feature of enabling the user to draw a rectangle or "box" 604 on a particular section of an uploaded image 602 to focus the ensuing search on the boxed area. The box may be any size of the user's choosing, as the user defines the box by selecting two points, such as points 606, 608, as opposite corners of the box. The search that is performed for similar images in the database may give additional weight or consideration to matching the boxed section of the image.

While this invention has been described as having an exemplary design, the present invention may be further modified within the spirit and scope of this disclosure. This application is therefore intended to cover any variations, uses, or adaptations of the invention using its general principles.

What is claimed is:

1. A method of providing an electronic commercial showplace, comprising the steps of:
    providing a database (254) of image data associated with component parts;
    converting two-dimensional drawings of vendors' component parts to three-dimensional image data;
    storing the three-dimensional image data in the database;
    enabling a purchaser to enter image data onto a web site, the image data representing a component that the purchaser would like to buy;
    searching the database for three-dimensional vendor image data matching the purchaser image data;
    displaying a matching three-dimensional vendor image to the purchaser on the web site; and
    displaying vendor information to the purchaser on the web site, the vendor information being associated with the matching three-dimensional vendor image.

2. The method of claim 1 wherein the purchaser image data is at least partially entered by electronic drawing of the component by the purchaser on a display screen (246).

3. The method of claim 1 wherein the vendor information facilitates a sale to the purchaser of a component part associated with the matching three-dimensional vendor image.

4. The method of claim 3 wherein the vendor information includes at least one of:
    an indication (112) of whether the component part is a stock part;
    a text descriptor (108) of a component part associated with the matching three-dimensional vendor image; and
    a model number (108) of the component part.

5. The method of claim 3 wherein the vendor information includes an indication (112) of whether the component part is a stock part.

6. The method of claim 3 wherein the vendor information includes a text descriptor (108) of a component part associated with the matching three-dimensional vendor image.

7. The method of claim 3 wherein the vendor information includes a model number (108) of the component part.

8. The method of claim 1 comprising the further steps of:
enabling the purchaser to electronically sketch modifications onto the displayed matching three-dimensional vendor image;
searching the database for second three-dimensional vendor image data matching the modified three-dimensional vendor image;
displaying a matching second three-dimensional vendor image to the purchaser on the web site; and
displaying second vendor information to the purchaser on the web site, the second vendor information being associated with the matching second three-dimensional vendor image.

9. The method of claim 1 comprising the further steps of:
enabling the purchaser to rotate the displayed matching three-dimensional vendor image on a display screen about an axis that is non-perpendicular to a plane of the displayed matching three-dimensional vendor image;
enabling the purchaser to electronically sketch modifications onto the displayed matching three-dimensional vendor image;
searching the database for second three-dimensional vendor image data matching the modified matching three-dimensional vendor image;
displaying a matching second three-dimensional vendor image to the purchaser on the web site; and
displaying second vendor information to the purchaser on the web site, the second vendor information being associated with the matching second three-dimensional vendor image data.

10. The method of claim 9 wherein the purchaser is enabled to rotate the displayed matching three-dimensional vendor image before sketching the modifications onto the displayed matching three-dimensional vendor image.

11. A method of providing an electronic commercial showplace, comprising the steps of:
providing a database of image data associated with component parts;
converting two-dimensional drawings of vendors' component parts to three-dimensional image data;
storing the three-dimensional image data in the database;
enabling a user to enter image data onto a web site;
searching the database for first three-dimensional vendor image data matching the user image data;
displaying a first matching three-dimensional vendor image to the user on the web site;
enabling the user to electronically sketch modifications onto the displayed first matching three-dimensional vendor image;
searching the database for second three-dimensional vendor image data matching the modified first three-dimensional vendor image;
displaying a matching second three-dimensional vendor image to the user on the web site; and
displaying vendor information to the user on the web site, the second vendor information being associated with the matching second three-dimensional vendor image.

12. The method of claim 11 wherein the user image data is at least partially entered by electronic drawing of the component by the user on a display screen.

13. The method of claim 11 wherein the vendor information facilitates a sale to the user of a component part associated with the matching three-dimensional vendor image.

14. The method of claim 13 wherein the vendor information includes an indication of whether the component part is a stock part.

15. The method of claim 13 wherein the vendor information includes a text descriptor of a component part associated with the matching three-dimensional vendor image.

16. The method of claim 13 wherein the vendor information includes a model number of the component part.

17. A method of providing an electronic commercial showplace, comprising the steps of:
providing a database of image data associated with component parts;
converting two-dimensional drawings of vendors' component parts to three-dimensional image data;
storing the three-dimensional image data in the database;
enabling a user to enter image data onto a web site;
searching the database for first three-dimensional vendor image data matching the user image data;
displaying a first matching three-dimensional vendor image to the user on the web site;
enabling the user to rotate the displayed matching three-dimensional vendor image on a display screen about an axis that is non-perpendicular to a plane of the displayed matching three-dimensional vendor image;
enabling the user to electronically sketch modifications onto the displayed first matching three-dimensional vendor image;
searching the database for second three-dimensional vendor image data matching the modified first three-dimensional vendor image;
displaying a matching second three-dimensional vendor image to the user on the web site; and
displaying vendor information to the user on the web site, the second vendor information being associated with the matching second three-dimensional vendor image.

18. The method of claim 17 wherein the user image data is at least partially entered by electronic drawing of the component by the user on a display screen.

19. The method of claim 17 wherein the vendor information facilitates a sale to the user of a component part associated with the matching three-dimensional vendor image.

20. The method of claim 19 wherein the vendor information includes at least one of:
an indication of whether the component part is a stock part;
a text descriptor of a component part associated with the matching three-dimensional vendor image; and
a model number of the component part.

* * * * *